United States Patent

Hirota et al.

[11] Patent Number: 6,064,494
[45] Date of Patent: May 16, 2000

[54] IMAGE PROCESSOR

[75] Inventors: Yoshihiko Hirota; Hiroyuki Suzuki; Toru Kasamatsu, all of Toyokawa, Japan

[73] Assignee: Minolta Co., Ltd., Osaka, Japan

[21] Appl. No.: 08/578,947

[22] Filed: Dec. 27, 1995

Related U.S. Application Data

[63] Continuation-in-part of application No. 08/859,313, Nov. 15, 1995.

[30] Foreign Application Priority Data

| Nov. 18, 1994 | [JP] | Japan | 6-285144 |
| Dec. 29, 1994 | [JP] | Japan | 6-339794 |
| Dec. 29, 1994 | [JP] | Japan | 6-339810 |
| Dec. 29, 1994 | [JP] | Japan | 6-340417 |

[51] Int. Cl.[7] ............. G05B 15/00; G03F 3/08; G06K 9/40
[52] U.S. Cl. ............. 358/1.9; 358/523; 358/529; 382/266
[58] Field of Search ............. 358/529, 518, 358/515, 520, 521, 523, 527, 532, 1.9, 1.16; 395/109, 115, 117; 382/163, 167, 162, 266, 274

[56] References Cited

U.S. PATENT DOCUMENTS

| 5,408,343 | 4/1995 | Sugiura et al. | 358/520 |
| 5,502,579 | 3/1996 | Kita et al. | 358/529 |
| 5,581,375 | 12/1996 | Ma | 358/518 |
| 5,712,924 | 1/1998 | Fujimoto et al. | 382/165 |
| 5,740,333 | 4/1998 | Yoh et al. | 395/109 |
| 5,771,107 | 6/1998 | Fujimoto et al. | 382/266 |
| 5,777,758 | 7/1998 | Tanabe | 395/117 |
| 5,850,293 | 12/1998 | Suzuki et al. | 358/529 |
| 5,870,531 | 2/1999 | Sakai et al. | 395/109 |

FOREIGN PATENT DOCUMENTS

| 3-85060 | 4/1991 | Japan |
| 4-229765 | 8/1992 | Japan |
| 4-261266 | 9/1992 | Japan |

*Primary Examiner*—Madeleine Nguyen
*Attorney, Agent, or Firm*—Burns, Doane, Swecker & Mathis, LLP

[57] ABSTRACT

In an image forming apparatus, a black edge of a document image is emphasized, and the black edge is detected by deciding an edge from the lightness data and by deciding a black color from the chroma data. The data of cyan, magenta and yellow of a pixel at a black edge are replaced with minima of data of cyan, magenta and yellow of pixels in a prescribed region around the pixel. In order to prevent erroneous decision of a black edge, if a number of isolated pixels is larger than a threshold level, a decision as a pixel at a black edge is invalidated. Automatic exposure can be performed on a color document for correcting a background of the document obtained in a prescan. The background level of the document is determined only on pixels decided to be black. When color balance is adjusted on one of the data of cyan, magenta, yellow and black, the density is kept constant. A part of a color document is reproduced in a sheet of paper with use of different levels of an image forming condition such as edge emphasis. That is, image data on the same part of the color data are supplied repeatedly, while image forming condition on the color data are changed successively. Then, the color data of the part is formed repeatedly in a sheet of paper at different levels of the image forming condition.

10 Claims, 68 Drawing Sheets

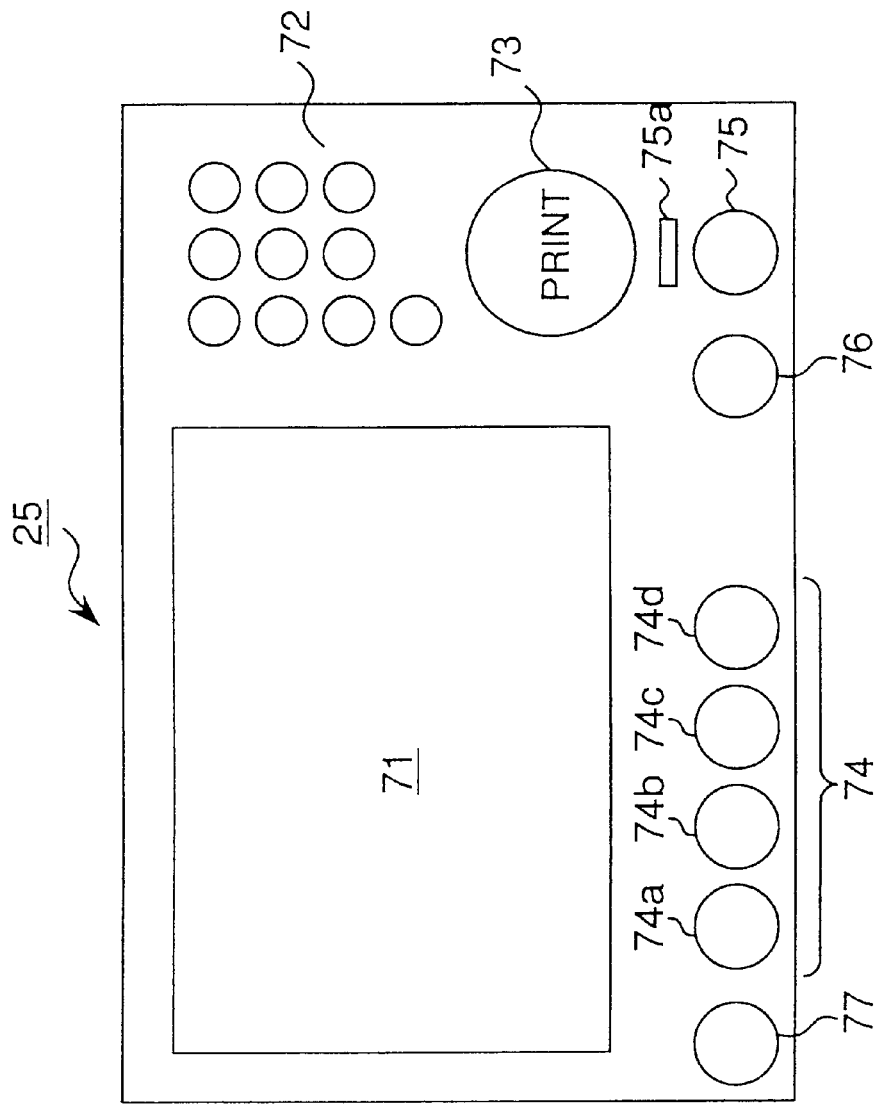

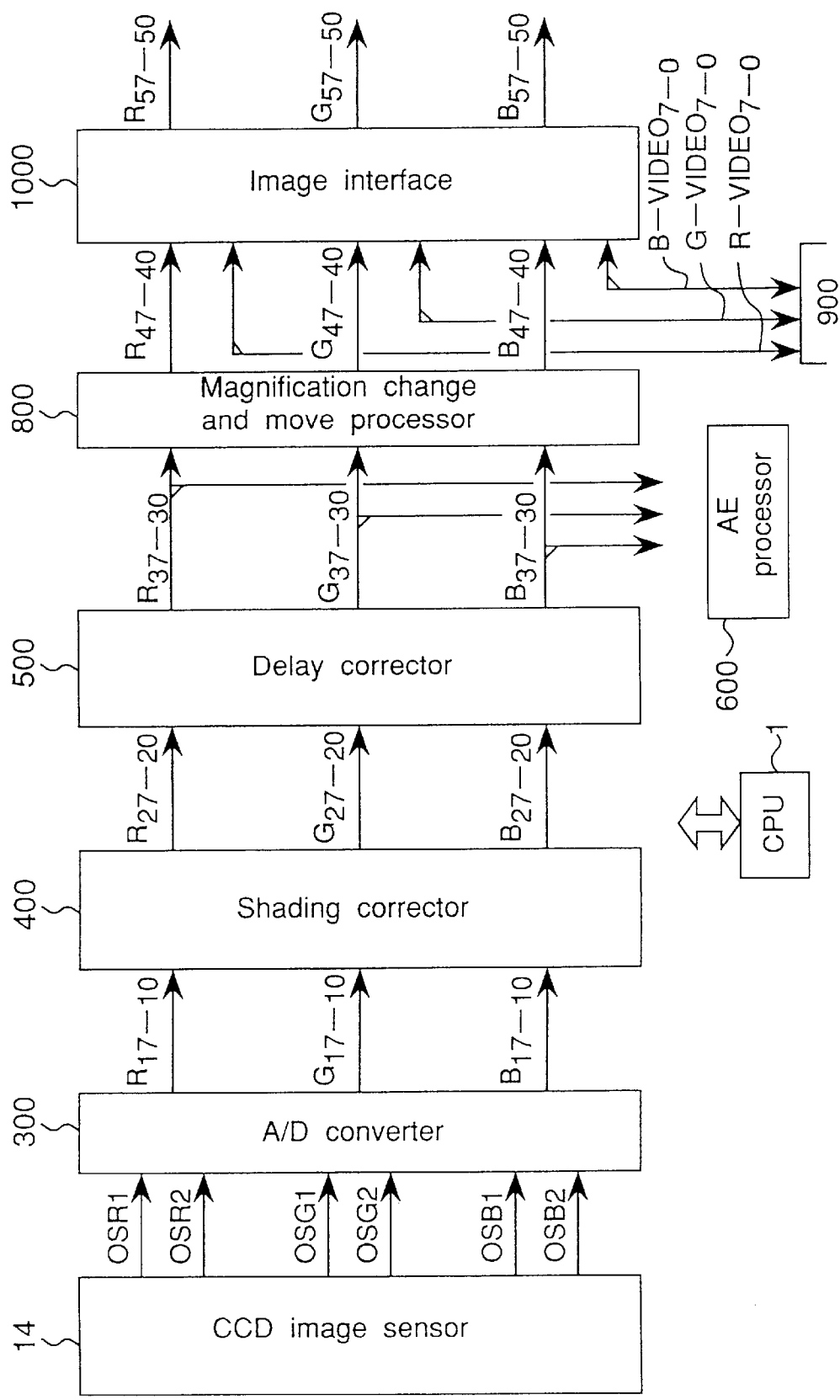

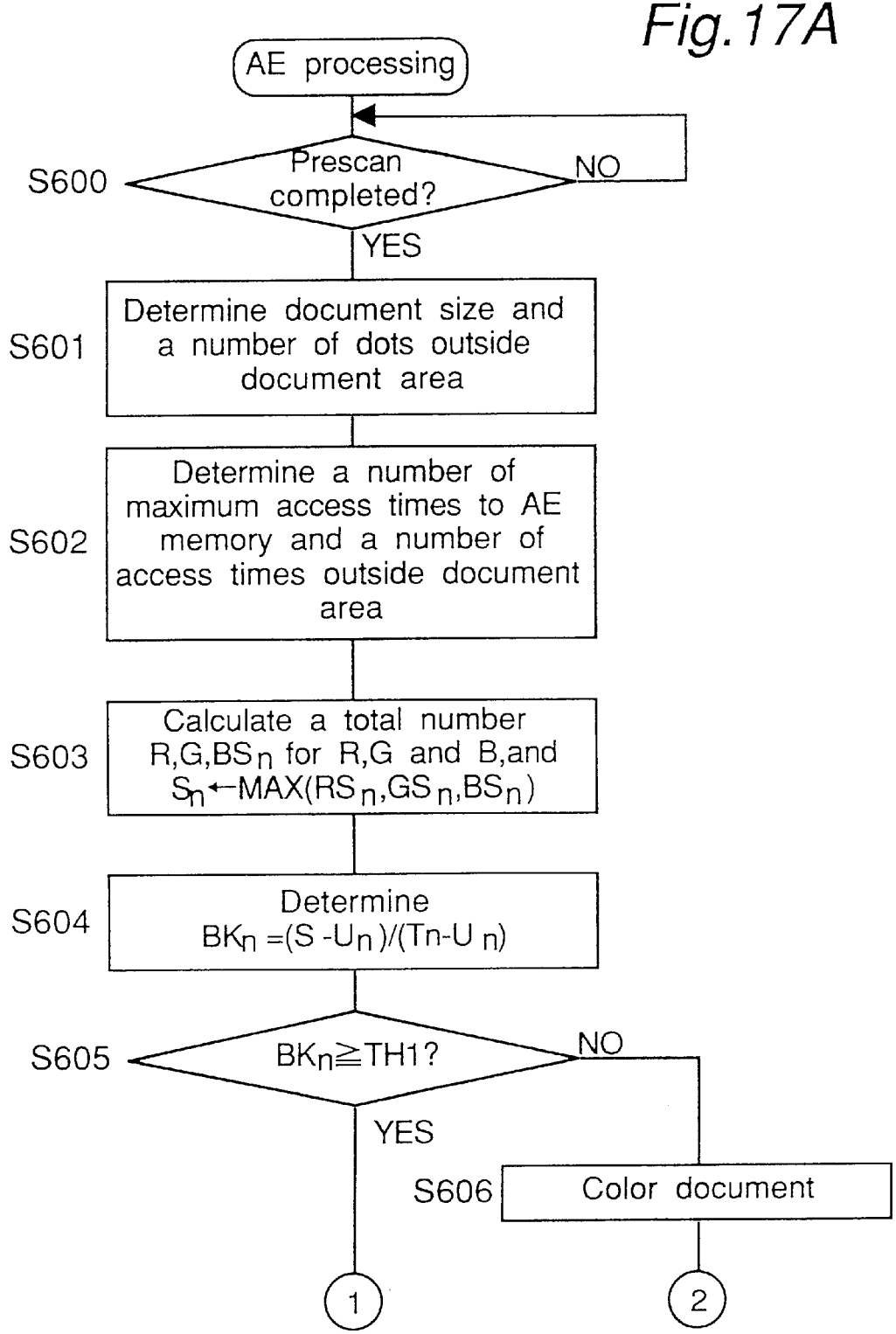

*Fig.20A* 400dpi

| $D_1$ | $D_2$ | $D_3$ | --- | $D_{n-1}$ | $D_n$ | $D_{n+1}$ | --- |
|---|---|---|---|---|---|---|---|
| --- | --- | --- | --- | --- | --- | --- | |
| | | | | | | | |

*Fig.20B* 200dpi $D'_1$ ---- $D'_2$ ---- ---- $D'_n$

*Fig.20C* 400dpi→200dpi

| $D''_1$ | | $D''_2$ | | $D''_3$ | | --- | --- |
|---|---|---|---|---|---|---|---|

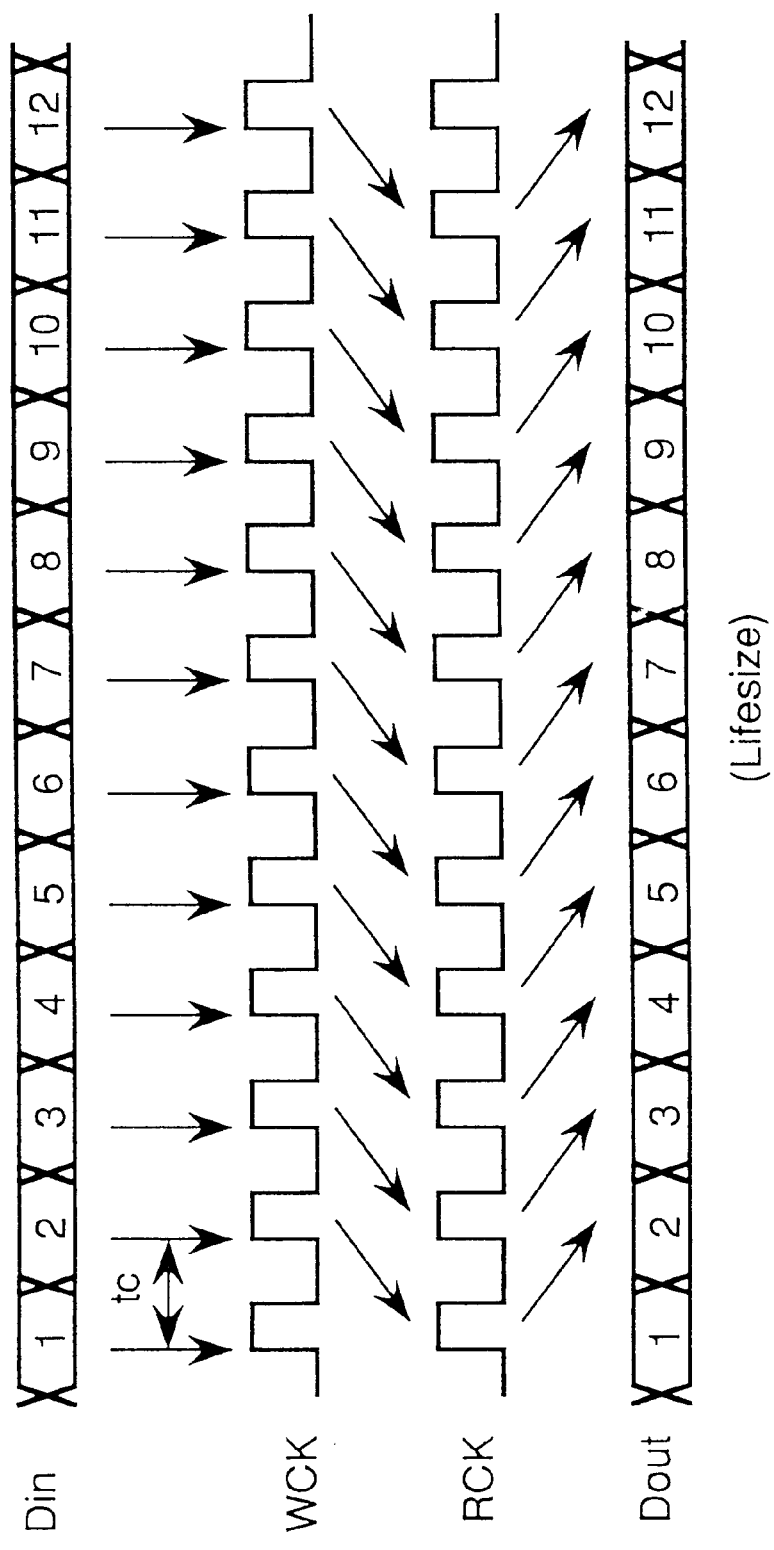
Fig.21 (Lifesize)

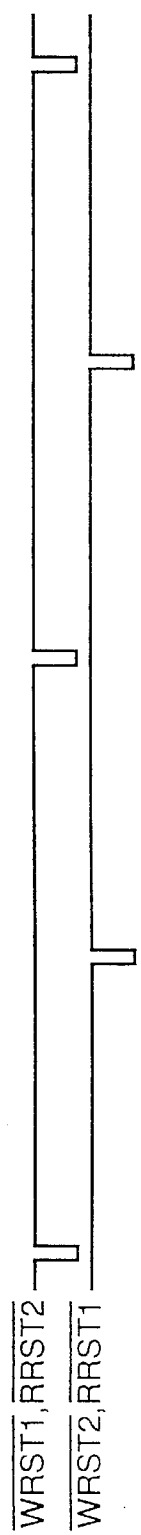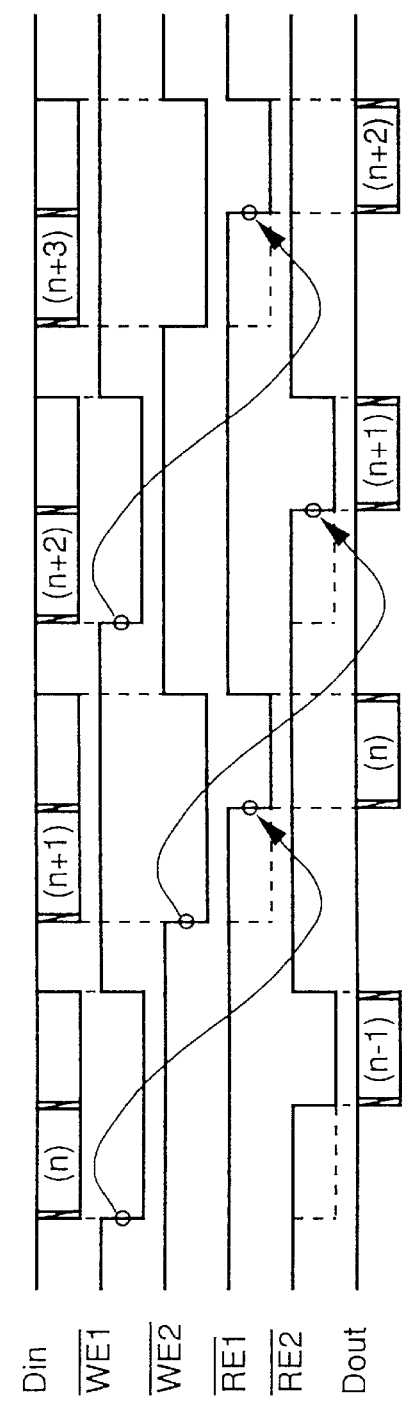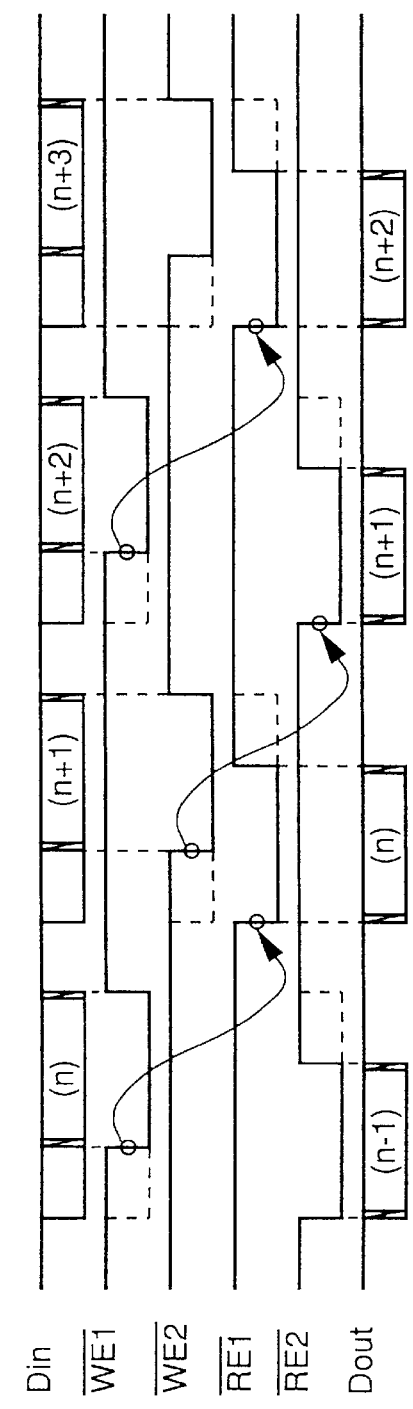

$$\begin{cases} W = \sqrt{WR^2 + WB^2} \\ \tan\theta = WB/WR \end{cases}$$

GDC₇₋₀  Ⓒ  −48
         Ⓜ  +24
         Ⓨ  +24

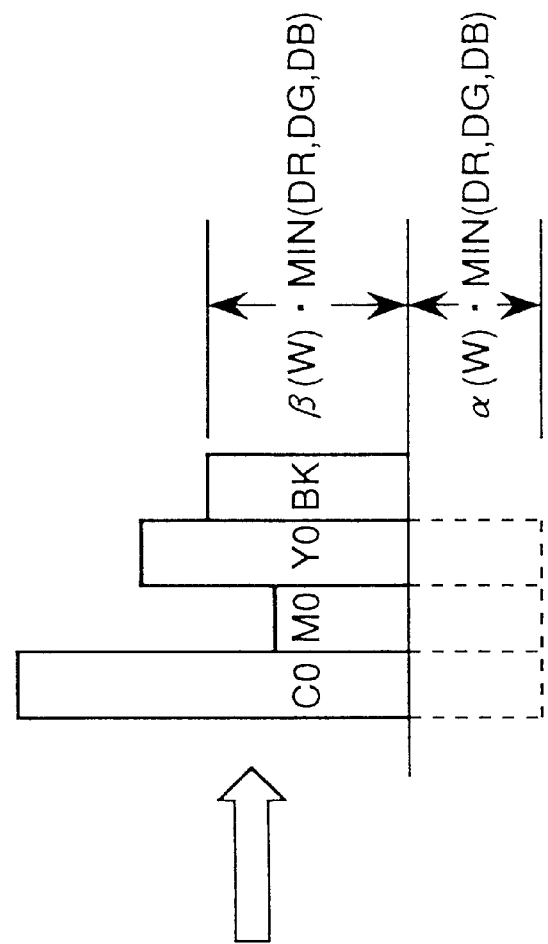
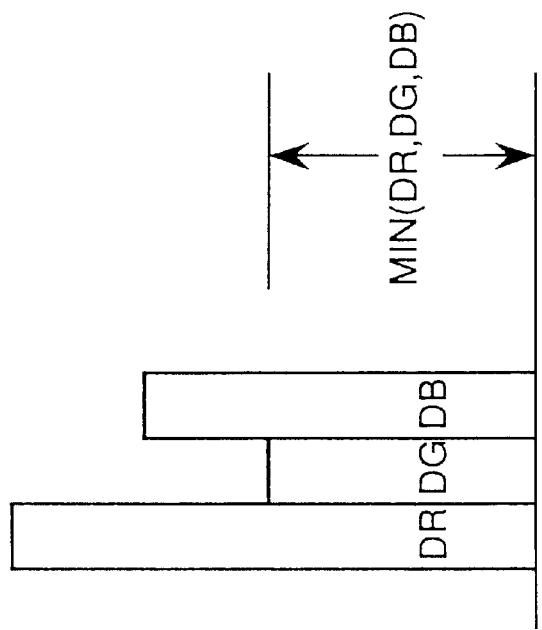
Fig.39A
Fig.39B

Fig.45

| 1/8 | 0   | 0 | 0    | −1/8 |
|-----|-----|---|------|------|
| 1/8 | 1/8 | 0 | −1/8 | −1/8 |
| 1/8 | 1/8 | 0 | −1/8 | −1/8 |
| 1/8 | 1/8 | 0 | −1/8 | −1/8 |
| 1/8 | 0   | 0 | 0    | −1/8 |

Fig.46

| −1/8 | −1/8 | −1/8 | −1/8 | −1/8 |
|------|------|------|------|------|
| 0    | −1/8 | −1/8 | −1/8 | 0    |
| 0    | 0    | 0    | 0    | 0    |
| 0    | 1/8  | 1/8  | 1/8  | 0    |
| 1/8  | 1/8  | 1/8  | 1/8  | 1/8  |

| 0 | 0 | 1/4 | 0 | 0 |
| --- | --- | --- | --- | --- |
| 0 | 0 | 0 | 0 | 0 |
| 1/4 | 0 | −1 | 0 | 1/4 |
| 0 | 0 | 0 | 0 | 0 |
| 0 | 0 | 1/4 | 0 | 0 |

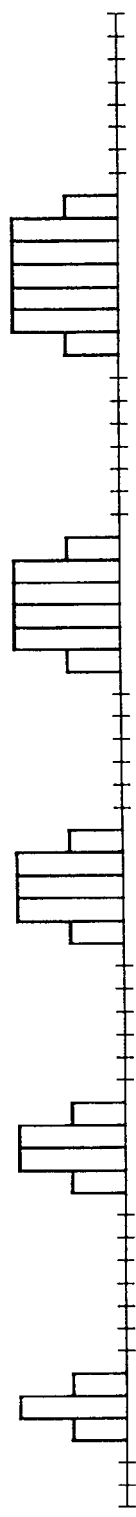
Fig.48A Brightness distribution
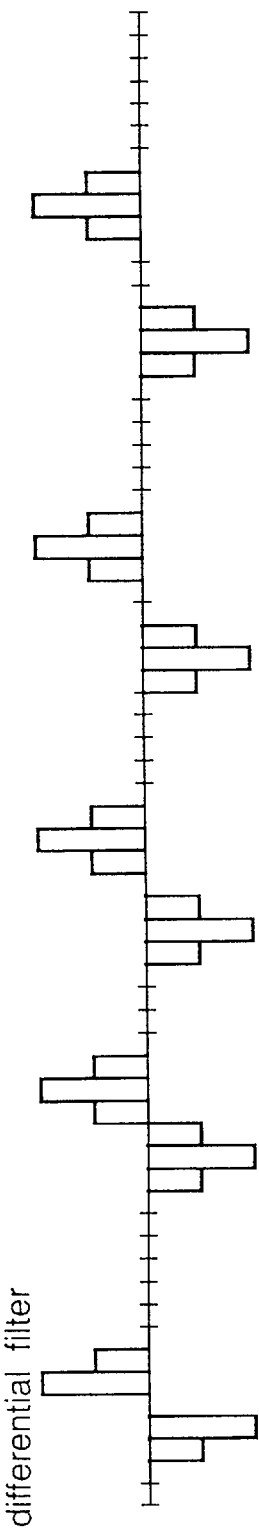
Fig.48B Primary differential filter
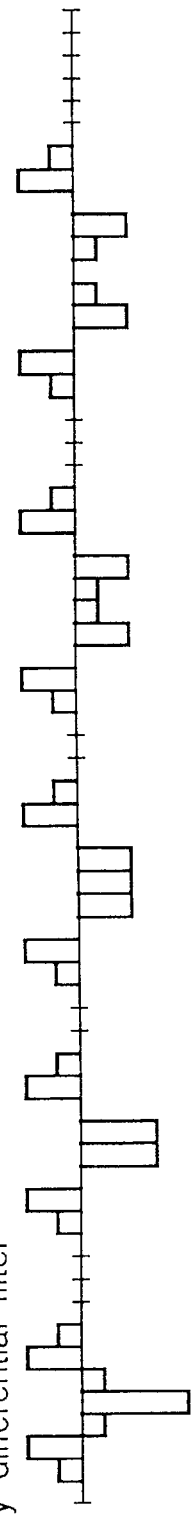
Fig.48C Secondary differential filter

| $a_{11}$ |  | $a_{13}$ |  | $a_{15}$ |
|---|---|---|---|---|
|  | $a_{22}$ | $a_{23}$ | $a_{24}$ |  |
| $a_{31}$ | $a_{32}$ | X | $a_{34}$ | $a_{35}$ |
|  | $a_{42}$ | $a_{43}$ | $a_{44}$ |  |
| $a_{51}$ |  | $a_{53}$ |  | $a_{55}$ |

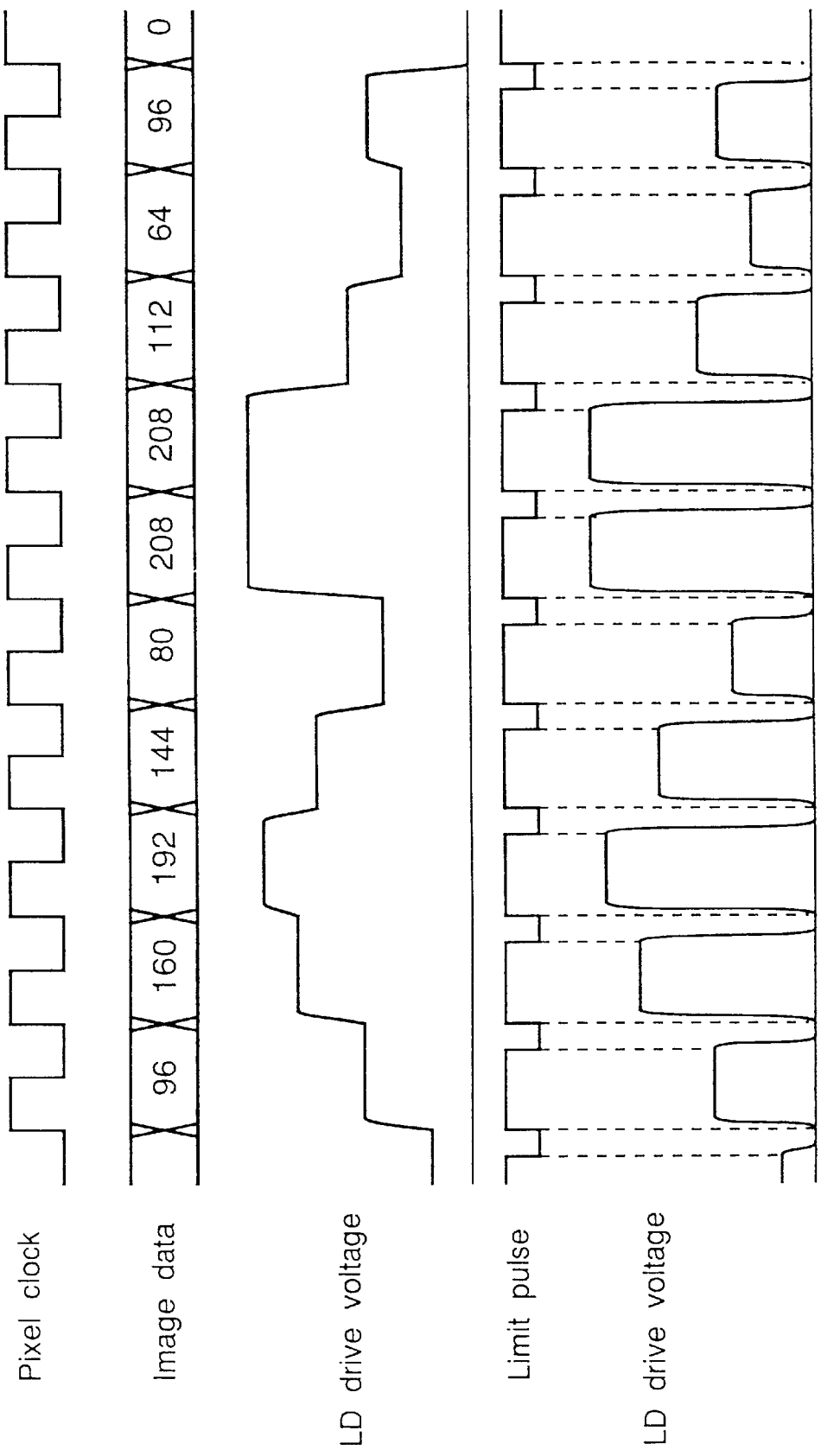

Fig.58

| 0 | 0 | −1/4 | 0 | 0 |
|---|---|---|---|---|
| 0 | 0 | 0 | 0 | 0 |
| −1/4 | 0 | 1 | 0 | −1/4 |
| 0 | 0 | 0 | 0 | 0 |
| 0 | 0 | −1/4 | 0 | 0 |

Fig.60

| 1/64 | 1/32 | 1/32 | 1/32 | 1/64 |
|------|------|------|------|------|
| 1/32 | 1/16 | 1/16 | 1/16 | 1/32 |
| 1/32 | 1/16 | 1/16 | 1/16 | 1/32 |
| 1/32 | 1/16 | 1/16 | 1/16 | 1/32 |
| 1/64 | 1/32 | 1/32 | 1/32 | 1/64 |

Fig.61

| 0 | 0 | 0 | 0 | 0 |
|---|---|---|---|---|
| 0 | 1/16 | 3/8 | 1/16 | 0 |
| 0 | 1/8 | 1/4 | 1/8 | 0 |
| 0 | 1/16 | 1/8 | 1/16 | 0 |
| 0 | 0 | 0 | 0 | 0 |

Fig.62

| 0 | 0 | 0 | 0 | 0 |
|---|---|---|---|---|
| 0 | 1/64 | 3/32 | 1/64 | 0 |
| 0 | 3/32 | 9/16 | 3/32 | 0 |
| 0 | 1/64 | 3/32 | 1/64 | 0 |
| 0 | 0 | 0 | 0 | 0 |

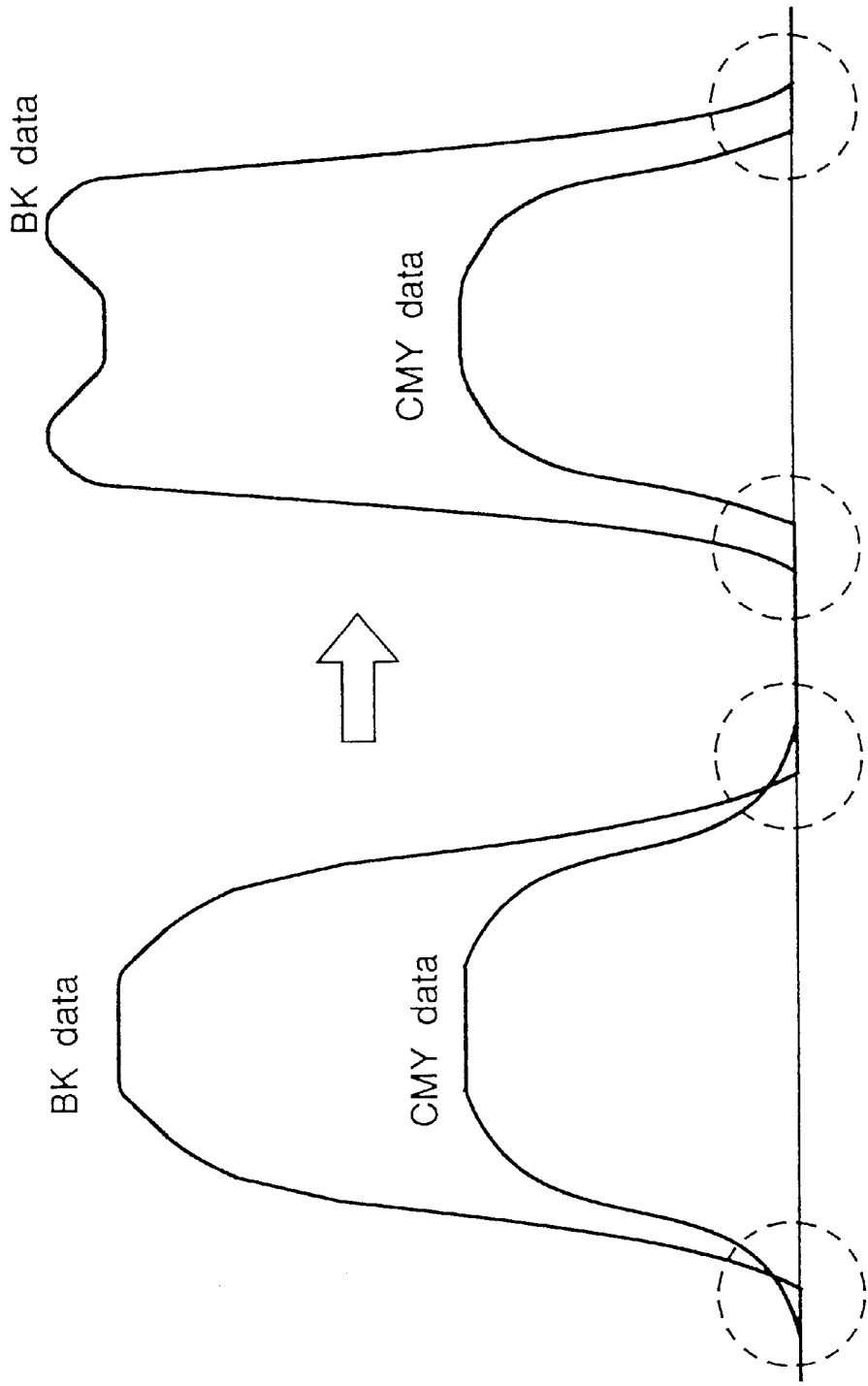

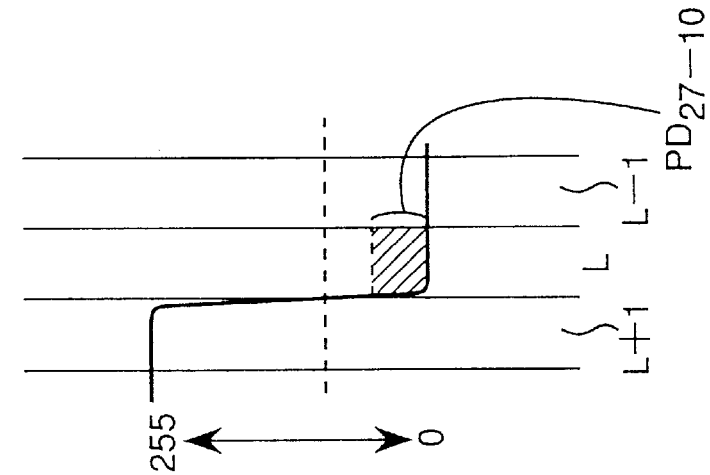
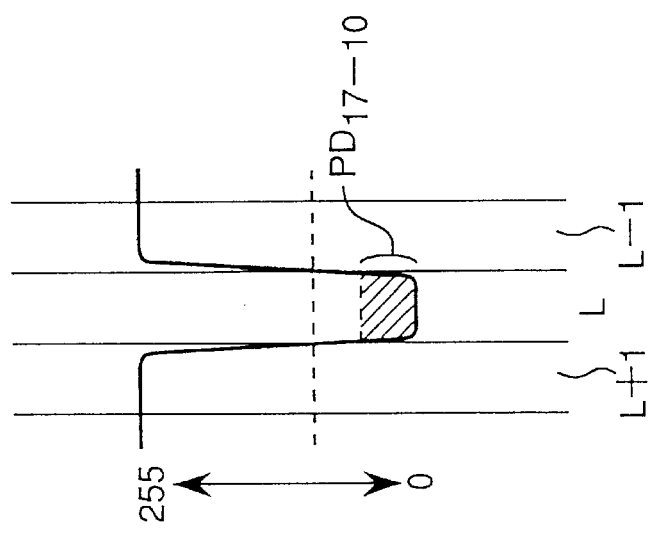
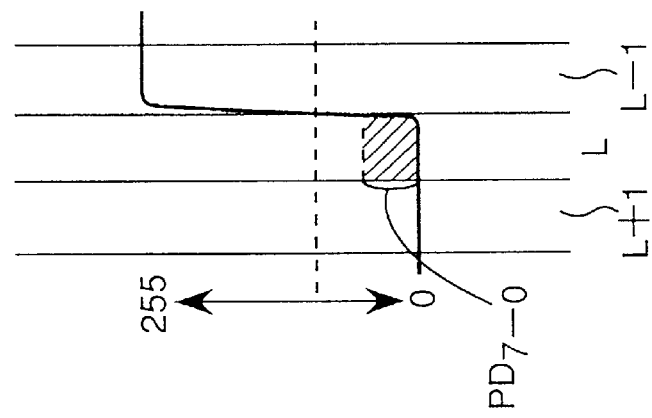

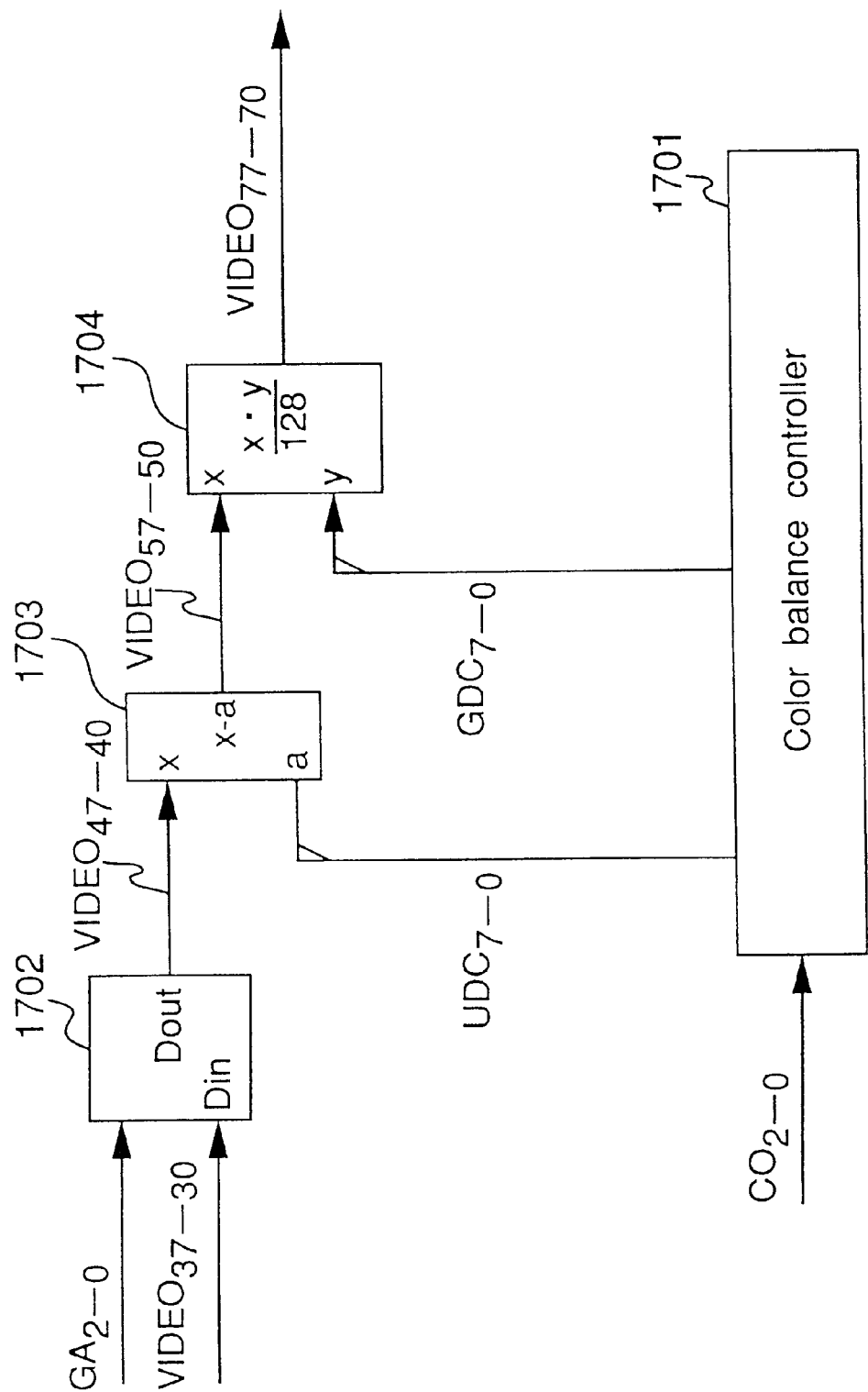

IMAGE PROCESSOR

This application is a continuation-in-part of an application Ser. No. 08/859,313 filed on Nov. 15, 1995.

BACKGROUND OF THE INVENTION

1. Field of the Invention

The present invention relates to an image forming apparatus such as a digital color copying machine.

2. Description of the Prior Art

In a digital color copying machine, a document is read to obtain digital data of red, green and blue. The digital data are converted to image data of cyan, magenta, yellow and black to be reproduced on a sheet of paper. The digital data are subjected to various processing such as shading correction, density conversion, color correction, edge emphasis, smoothing, gamma correction and the like.

Prescan of the document is performed for determining the conditions on forming an image of the digital data in a sheet of paper. Data obtained with a prescan on a document to be reproduced is performed for detection of document size, shading correction or the like. For example, automatic exposure is performed on prescan data for correcting image data to reproduce background of a document as white. However, the automatic exposure processing is effective only for a monochromatic character image because a reproduced image becomes dull for a color image or a photograph image. It is desirable that automatic exposure processing is performed for a color image or the like.

Auto color selection is also performed on prescan data to determine if a document is a monochromatic image or a full color image. Image data on the document is processed according to the auto color selection.

If the automatic exposure processing and the auto color selection are performed at the same time, a document size has to be detected beforehand. Then, prescan data are used twice. However, it is not desirable to perform prescan twice because it takes a longer time for copying.

A digital copying machine reads a document to get digital data of red, green and blue thereof and converts them to image data of cyan, magenta, yellow and black, which are reproduced on a sheet of paper with toners having the four colors. The image data are subjected to MTF correction before printing. For a document image comprising black characters, it is desirable to emphasize edges of black characters. Then, for example, black characters are detected in a document image, and the image data for the black characters are subjected to edge emphasis and are reproduced with black toners. Thus, the black characters are reproduced with black toners, and the image quality is improved.

As to the black characters, image data of the cyan, magenta and yellow are suppressed at the edges according to brightness component of the image data. However, if black characters are described in a colored background, an amount of suppression of the image data of the cyan, magenta and yellow becomes large, so that areas adjacent to the black characters become white though they have a color of the colored background. This deteriorates image quality in a reproduced image.

Black characters are detected as black image in an area between a pair of edges. However, for characters of dark blue, dark green or the like, edges are liable to be decided erroneously. Further, for an image comprising black dots, edges are decided erroneously, a Moire pattern may happen.

It is also a problem that in an electrophotographic copying machine, toners are liable to have a higher density at a leading edge and a lower density at a trailing edge, and this also deteriorates image quality of black characters.

A digital copying machine can control image qualities on various items such as hue, chroma, color, balance and the like besides gamma correction and edge emphasis. When a user wants a copy of a desired image quality, he or she adjusts the various items before starting copying operation. If the reproduced image does not have the desired image quality, he or she has to adjust the various items again based on the reproduced image. However, because a number of items to be adjusted is large, it is difficult to predict an image quality. Then, it is desirable to adjust image quality efficiently.

As to color balance, density level of toners of cyan, magenta, yellow and blue is controlled independently of each other. Then, density on a sheet of paper is also affected by adjustment of the color balance. Then, a total image density of a reproduced image may become higher or lower, and an amount of toners fixed on paper becomes uneven. It is also a problem that jam or the like may happen.

SUMMARY OF THE INVENTION

A first object of the present invention is to provide an image processor which performs prescan efficiently.

A second object of the present invention is to provide an image processor which performs automatic exposure appropriately irrespective of kind of document.

A third object of the present invention is to provide an image processor which decides black characters more precisely for edge emphasis.

A fourth object of the present invention is to provide an image forming apparatus which is easy to be adjusted on image quality.

A fifth object of the present invention is to provide an image forming apparatus which can adjust color balance appropriately.

In an aspect of the invention, color data of a document is read by a scanner and the color data are converted to lightness data and chroma data, and a black edge is detected by deciding an edge from the lightness data and deciding a black color from the chroma data. Then, the data of black of an interest pixel is increased by a prescribed amount for edge emphasis if the pixel is decided to exist at a black edge. Preferably, the color data are converted to data of cyan, magenta, yellow and black, and the data of cyan, magenta and yellow of a pixel at a black edge are replaced with minima of data of cyan, magenta and yellow of pixels in a prescribed region around the pixel. Preferably, for an isolated pixel, an amount to be added for edge emphasis is limited according to the density of the isolated pixels.

In a second aspect of the invention, in order to prevent erroneous decision of a black edge, each of the pixels in a prescribed area around an interest pixel to be decided to exist at a black edge are checked if it has a color based on the lightness data and chroma data and is not located at the edge. If the number of the pixels having colors and not existing at the edge is larger than a threshold level, the decision as a pixel at a black edge is invalidated.

In a third aspect of the invention, a black edge is detected by deciding an edge from the lightness data and by deciding a black color from the chroma data. On the other hand, area information on a document is received in synchronization with read of the document, and a type of the document is determined. Then, the data of the interest pixel are changed according to the type of the document and a result of decision of black edge.

In a fourth aspect of the invention, a color document is read, and a pixel at a rising edge and a pixel at a trailing edge of an image in the color data with respect to a paper-feed direction. Then, on edge emphasis, a first correction data is added to a pixel located by one pixel before the rising edge, and a second correction data is added to a pixel located one pixel after the trailing edge.

In a fifth aspect of the invention, automatic exposure is performed on a color document for correcting a background of the document. Color data of a color document are read, while a background of the document is obtained as a background level detected from a density histogram of pixels decided to be black. That is, the background level is determined only on pixels decided to be black. Then, the color data are corrected according to the background level for automatic exposure. Alternately, a standard document such as a white plate is also read, and the data of the standard document is subjected to the shading correction. A background level is also determined only on pixels decided to be black. Then, the color data of the document are corrected according to a difference of the background level or the document from the background level detected on the standard document so that a background level of an image formed on the sheet of paper has a prescribed value. Preferably, when color data of a document is read, an area wherein the document exists on a platen is determined. Then, an underground level of the document and a type of the document such as full color document are determined on the same data in the area.

In a sixth embodiment of the invention, a part of a color document read by a scanner is formed in a sheet of paper with different levels of an image forming condition such as edge emphasis. That is, image data on the same part of the color data are supplied repeatedly so that the plurality of image data is formed on a sheet of paper. A data processing means processes the part of the color data by changing the image forming condition successively. Then, a plurality of color image of the part processed on the image forming condition is formed in a sheet of paper.

In a seventh aspect of the invention, a scanner reads a color document to provide color data, and the color data are converted to data of cyan, magenta, yellow and black. When color balance is adjusted on one of the data of cyan, magenta, yellow and black, the data for each pixel of cyan, magenta, yellow and black are changed according to the color balance while keeping a total of the data of cyan, magenta, yellow and black constant. That is, when color balance is adjusted, the density is kept constant.

An advantage of the invention is that edge emphasis is performed appropriately.

Another advantage of the invention is that erroneous decision of black edge can be prevented for example on dark blue characters.

A third advantage of the invention is that an underground level of a color document can be corrected appropriately.

A fourth advantage of the invention is that a document area, an underground level and the like can be corrected in a single read of a document data.

A fourth advantage of the invention is that a user can select desired image forming conditions easily.

A fifth advantage of the invention is that color balance can be performed while keeping a constant density.

BRIEF DESCRIPTION OF THE DRAWINGS

These and other objects and features of the present invention will become clear from the following description taken in conjunction with the preferred embodiments thereof with reference to the accompanying drawings, and in which:

FIG. 2 is a plan view of an operational panel of the copying machine;

FIGS. 3A and 3B are block diagrams of a read signal processor;

FIGS. 17A, 17B and 17C are flowcharts of automatic exposure;

FIG. 20A is a diagram of read data $D_1, D_2, \ldots$ read at 400 dpi,

FIG. 20B is a diagram of read data $D_1, D_2, \ldots$ read at 200 dpi, and

FIG. 20C is a diagram of image data used after thinning out for a reduction from 400 to 200 dpi;

FIG. 21 is a timing chart when image data is processed for a life-size copy;

FIG. 25A is a timing chart of signals $\overline{WRST1}$, $\overline{WRST2}$, $\overline{RRST1}$ and $\overline{RRST2}$ sent to the memories 803a and 803b, and FIGS. 25B and 25C are timing charts of various signals $D_{in}$, $\overline{WE1}$, $\overline{WE2}$, $\overline{RE1}$, $\overline{RE2}$ and $D_{out}$;

FIGS. 39A and 39B are diagrams for illustrating undercolor remove and black painting;

FIG. 45 is a diagram of a primary differential filter along the main scan direction;

FIG. 46 is a diagram of a primary differential filter along the subscan direction;

FIG. 48A is a graph of lightness distribution of five lines with different size from each other, FIG. 48B is a graph of primary differentials for the five lines, and FIG. 48C is a graph of secondary differentials for the five lines;

FIG. 57 is a timing chart of pixel clock, image data, driving voltage for laser diode, limit pulse, and driving voltage with a duty ratio;

FIG. 58 is a diagram of a Laplacian filter;

FIG. 60 is a diagram of a smoothing filter for smoothing input data of 400 dpi to 300 dpi;

FIG. 61 is a diagram of a smoothing filter for smoothing input data of 400 dpi to 200 dpi;

FIG. 62 is a diagram of a smoothing filter for smoothing input data of 400 dpi to 100 dpi;

FIGS. 63A and 63B are diagrams for explaining a slight extension of chromatic data outside a character and deletion of such extension;

FIGS. 67A, 67B and 67C are diagrams of addition of $PD_{17-10}$ at a leading edge, at an intermediate point and at a trailing edge in an image;

FIG. 68 is a block diagram of a gamma correction section;

DETAILED DESCRIPTION OF THE PREFERRED EMBODIMENTS

Figure 1:
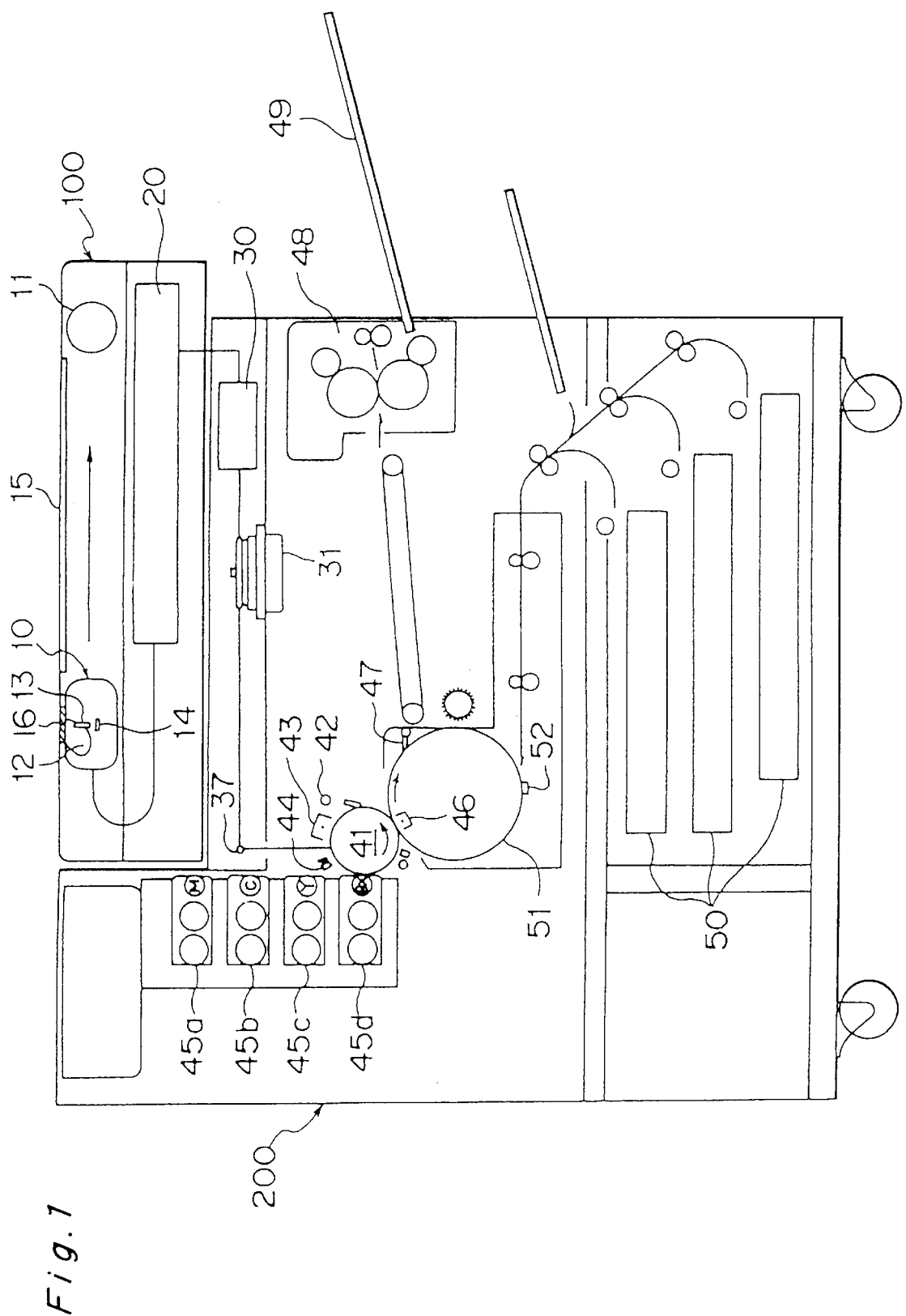
FIG. 1 is a schematic sectional view of a digital color copying machine of an embodiment of the invention.

Referring now to the drawings, wherein like reference characters designate like or corresponding parts throughout the drawings, an embodiment of the invention is described.

(A) Image Processor

FIG. 1 shows a digital color copying machine comprising an image reader 100 reading a document image and an image forming section 200 reproducing an image date read by the image reader 100. In the image reader 100, a scanner 10 comprises a lamp 12 exposing a document, a rod lens array 13 condensing a light reflected from the document, and a CCD color image sensor 14 converting the condensed light to electric signals. The image sensor 14 has three lines of CCD elements arranged with a prescribed distance for reading digital image data of components of red (R), green (G) and blue (B). When a document image is read, the scanner 10 is driven by a motor 11 to be moved along a subscan direction (shown with an arrow). The scanner reads a while plate 16 for shading correction first and scans the document put on a platen 15. An image of the document exposed with the lamp 12 is converted to multi-level electric signals of the three colors by the image sensor 14. After shading correction and interpolation between lines, a signal processor 20 converts the signals of the three colors to 8-bit gradation data of yellow (Y), magenta (M), cyan (C) and black (BK). The data are further subjected to MTF correction, gamma correction and the like. Then, they are stored in the buffer memory 30 for synchronization.

Next, in the image forming section 200, a printer head 30 converts the gradation data an analog signal to generate a driving signal, and a laser diode in the printer head 30 emits a light according the signal. The laser diode is always emits weak light in order to improve rising response on light emission, and the weak light is called as bias light.

The laser beam emitted by the laser diode is reflected by a mirror 37 to expose a rotating photoconductor drum 41.

The drum 31 has been erased before exposure for each copy operation and has been charged uniformly by a sensitizing charging 43. When the drum 41 is exposed in such a state, an electrostatic latent image of a document is formed on the photoconductor drum 41. One of four development unit of toners of cyan, magenta, yellow and black is selected to develop the latent image. A toner image developed is transferred by a transfer charger 46 onto a sheet of paper supplied from a cassette 50 on a transfer drum 51.

The above-mentioned printing process are repeated for four colors of yellow, magenta, cyan and black. The scanner 10 repeats the scan movement in synchronization with the transfer drum 51. Then, the sheet of paper is separated by a separation claw 47 from the transfer drum 51, passes through a fixing unit 48 for fixing the toner image and discharged onto a tray 49.

FIG. 2 shows an operational panel 25 of the copying machine. The panel 25 has a display unit 71. When a user presses a key 77 for selecting an image monitor, the display unit 26 displays not only a number of copies, a magnification, but also four kinds of image forming conditions of masking coefficients, sharpness, gamma curve and color balance. In the image monitor, eight images are printed on a sheet of paper according to image-forming conditions displayed in the display unit 71. The keys 74a–74d are used to select the four kinds of image forming conditions. A key 75 is used for entering into a serviceman mode, and when the mode is selected, an LED 75a is turned on. The serviceman mode is used to set coefficients $a_1$, $a_2$, $a_3$ and $a_4$ for HVC conversion used in an HVC converter 1100 which is explained later. A key 76 is used to invert a positive image of a document to a negative image.

(B) Outline of Read Signal Processor

Processings in the read signal processor 20 are explained. First, they are explained generally, and each processing is explained next in detail.

Figure 3B:
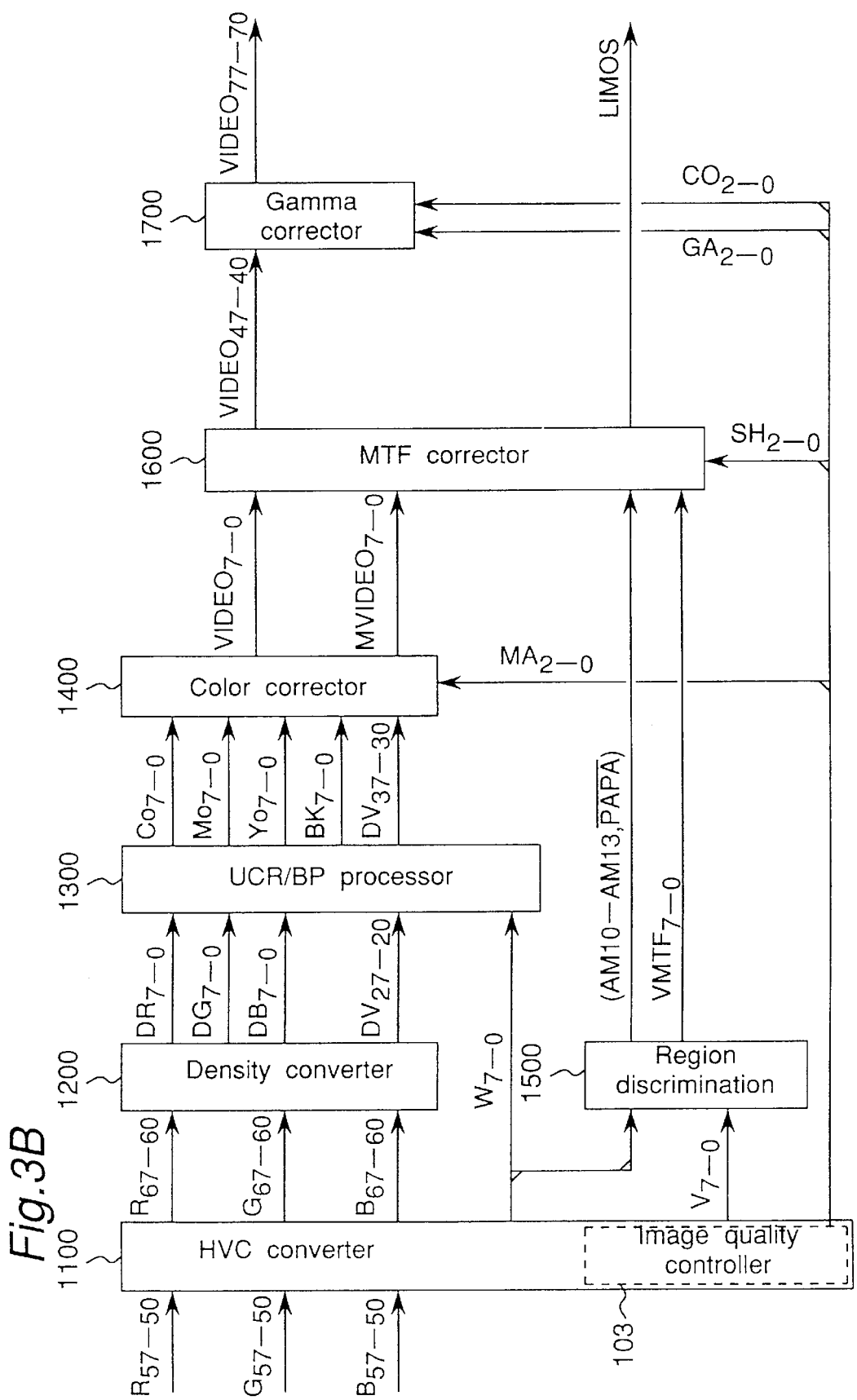

FIGS. 3A and 3B show blocks in the read signal processor 20. Analog image data OSR1, OSR2, OSG1, OSG2, OSB1 and OSB2 are sent to an analog-to-digital (A/D) converter 300. The A/D converter 300 converts the input data to 8-bit digital image data $R_{17\text{-}10}$, $G_{17\text{-}10}$, $B_{17\text{-}10}$ of the three colors and sends it to the shading correction section 400.

The shading correction section 400 corrects scattering of read data due to scattering of illumination of the lamp 12 and the like to output components $R_{27\text{-}20}$, $G_{27\text{-}20}$ and $B_{27\text{-}20}$.

Figure 7:
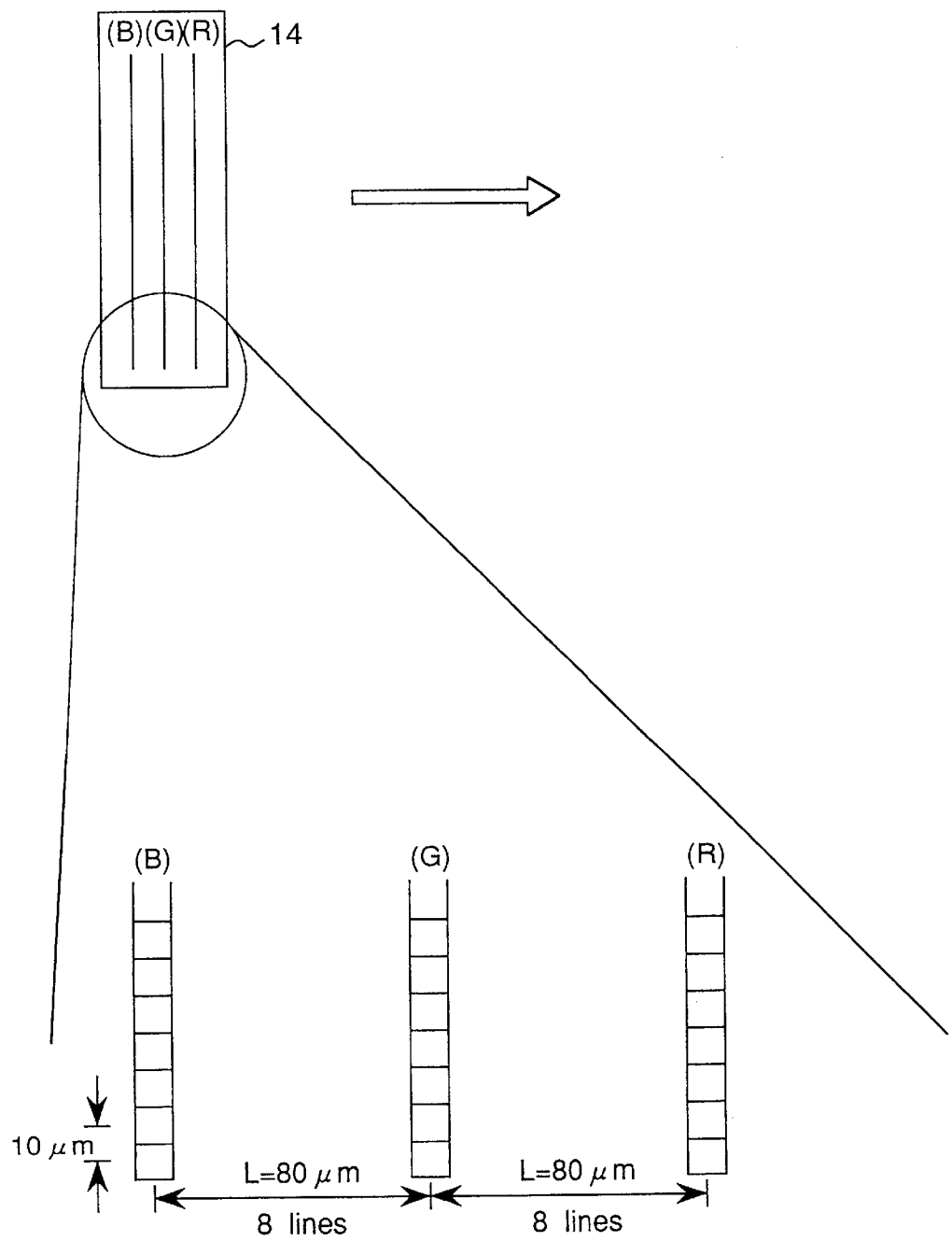
FIG. 7 is a schematic diagram of a CCD image sensor.

The image sensor 14 has three lines of CCD elements spaced by a predetermined distance for reading image data of red (R), green (G) and blue (B) (refer to FIG. 7). Each component of image data of the three colors is called simply as R data, G data and B data. A correction unit 500 for lines of three colors in the image sensor 14 stores the R data and G data temporarily to delay by a predetermined time with respect to the B data in correspondence to the distance between the three lines. In this embodiment, a number of effective pixels in a line is controlled according to magnification of copy. Further, correction for the lines is performed for correcting a shift of the read data. The corrected data $R_{37\text{-}30}$, $G_{37\text{-}30}$ and $B_{37\text{-}30}$ are sent to an AE processor 600 and to a magnification change and move processor 800.

The AE processor 600 detects document size and performs automatic color selection and automatic exposure. In the detection of document size, a range of the existence of a document on a platen 15 is detected along a main scan direction in the unit of line (refer to FIG. 16).

The magnification change and move processor 800 performs deletion of data in an unnecessary region, reduction interpolation, magnification and reduction, image repeat and magnification interpolation on data $R_{37\text{-}30}$, $G_{37\text{-}30}$ and $B_{37\text{-}30}$. The above-mentioned unnecessary region includes a region wherein no document exists on a platen and a region resulting from reduction of document image, and it is deleted according to the detection of document size in the AE processor 600. The reduction interpolation is performed for a size in correspondence to the reduction ratio in order to prevent deterioration of image quality of a reproduced image. On the other hand, when an image data is magnified, image quality is deteriorated if the image data is simply inflated. Then, the image data is smoothed in correspondence to a magnification. Further, when a user presses a key 77 in the operational panel, a part of a document image is output eight times repeatedly on the same sheet of paper.

An image interface 1000 selects either data $R_{47\text{-}40}$, $G_{47\text{-}40}$ and $B_{47\text{-}40}$ received from the magnification change and move processor 800, or R, G and B data, R-VIDEO$_{7\text{-}0}$, G-VIDOE$_{7\text{-}0}$ and B-VIDEO$_{7\text{-}0}$, received from an external apparatus 900, and synthesize it. Further it generates timing signals for sending image data to an RGB interface or a printer interface.

The HVC converter 1100 generates lightness signal $V_{7\text{-}0}$, color difference signals $WR_{7\text{-}0}$ and $WB_{7\text{-}0}$ based on RGB data, $R_{57\text{-}50}$, $G_{57\text{-}50}$ and $B_{57\text{-}50}$ obtained by reading a color patch with the image sensor 14 and R, G, B data stored in a ROM. Further, it generates chroma signal $W_{7\text{-}0}$, and hue signal $H_{7\text{-}0}$. Thus, scatterings of read characteristics of the image sensor can be corrected.

The HVC converter 1100 includes an image quality controller 1103. The controller 1103 sets image-forming conditions (masking coefficients, sharpness, gamma curve and color balance) for eight images for the image quality monitor in correspondence to key input of the key 77.

A density converter 1200 converts R, G, B data ($R_{67\text{-}60}$, $G_{67\text{-}60}$ and $B_{67\text{-}60}$) proportional to a quantity of reflection light from a document to density data $DR_{27\text{-}20}$, $DG_{27\text{-}20}$ and $DB_{27\text{-}20}$. Further, it includes an inverter to convert a positive image of a document to a negative image. Further, a negative/positive inverter 1250 inverts the data $DR_{27\text{-}20}$, $DG_{27\text{-}20}$ and $DB_{27\text{-}20}$ if $\overline{NEGA}$ signal is received, otherwise it passes the as-received data.

A UCR/BP processor 1300 obtains a minimum among the density data $DR_{27\text{-}20}$, $DG_{27\text{-}20}$ and $DB_{27\text{-}20}$ to take a part of the minimum as a black data $BK_{7\text{-}0}$ for painting black toners. On the other hand, quantities of toners of cyan, magenta and yellow are removed in correspondence to the black data (undercolor) to supply data, $Co_{7\text{-}0}$, $Mo_{7\text{-}0}$ and $Yo_{7\text{-}0}$.

Figure 42:
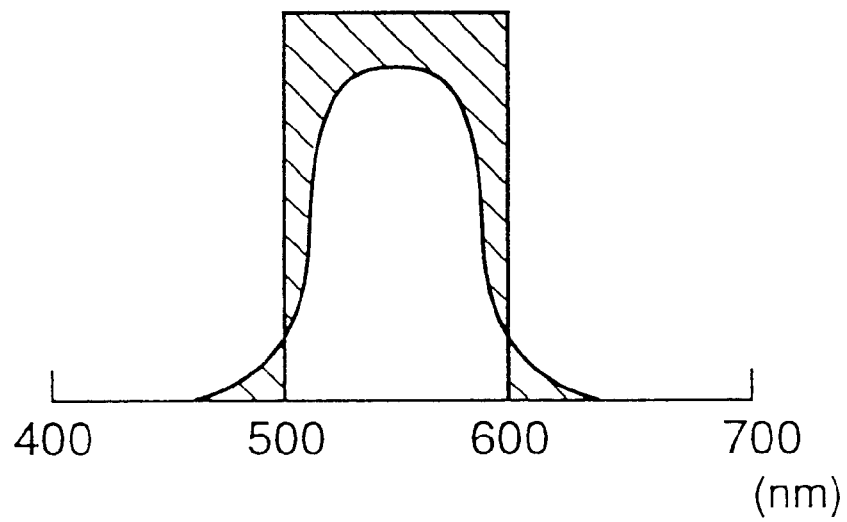
FIG. 42 is a graph of spectral characteristic of green filter.
Figure 43:
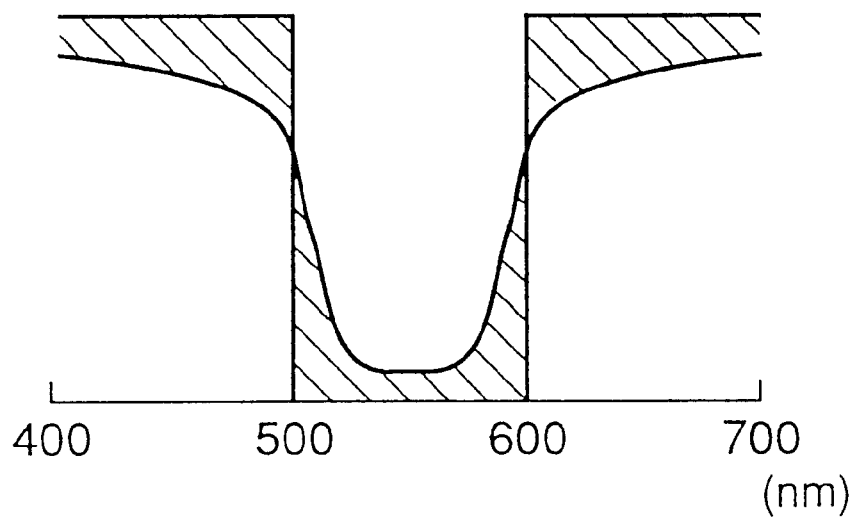
FIG. 43 is a graph of spectral characteristic of magenta toners.

A color corrector 1400 performs masking operation for adjusting color reproduction in correspondence to spectral characteristics of color filters of the image sensor 14 and the toners of cyan, magenta and yellow (refer to FIGS. 42 and 43).

A region discriminator 1500 discriminates black character areas and dot image areas in a document image. (In a dot image area, an image is composed of dots.) The discrimination of black characters comprises detection of a character (edge), detection of black, and detection of a region which is liable to be detected as black. A character (edge) is detected with a differential filter. Black is detected based on chroma. In this embodiment, erroneous decision can be prevented by smoothing the chroma data when the R, G and B data shifts slightly due to vibrations of the image sensor 14 on reading image data. Further, in order to prevent an erroneous decision as a black character on a character with a low lightness and a low chroma, a color background is discriminated. Even when it is decided as a black character, the decision is invalidated for a region decided to be a color background. Then, a black character can be decided correctly.

An MTF corrector 1600 performs edge emphasis and smoothing most suitable for the image data VIDEO$_{7-0}$ and MVIDEO$_{7-0}$ received from the color corrector 1400 based on the kind of pixels and printing situation. If a copying is operated in a full color standard mode, edges are not emphasized on data of cyan, magenta and black at black edges, and a minimum of the data of cyan, magenta and black is taken as image data. Thus, an undesired extended line of C, M and Y data can be deleted (refer to FIG. 64A). Further, edges are not emphasized when BK data is printed in a monochromatic standard mode or photography mode. Then, an edge of a color character is prevented to have a border of black.

Further, a duty ratio of laser emission is changed according to the kind of image recognized by the region discriminator 1500. The duty ratio is defined as a ratio of laser emission time in a pixel clock cycle. In case of a pixel in a dot image, the duty ratio is set to be 100% in order to prevent a Moire pattern. Otherwise the duty ratio is set to be say 80% to reduce noises between lines.

Further, a prescribed value is added to pixel data at edges to correct amounts of excess or deficient toners.

A gamma corrector 1700 performs gamma correction on the image data VIDEO$_{47-40}$ after MTF correction to provide image data having desired image quality. A user can select gamma curve change signal GA$_{2-0}$ with the key 74c.

(C) Analog-to-digital Converter

Figure 4:
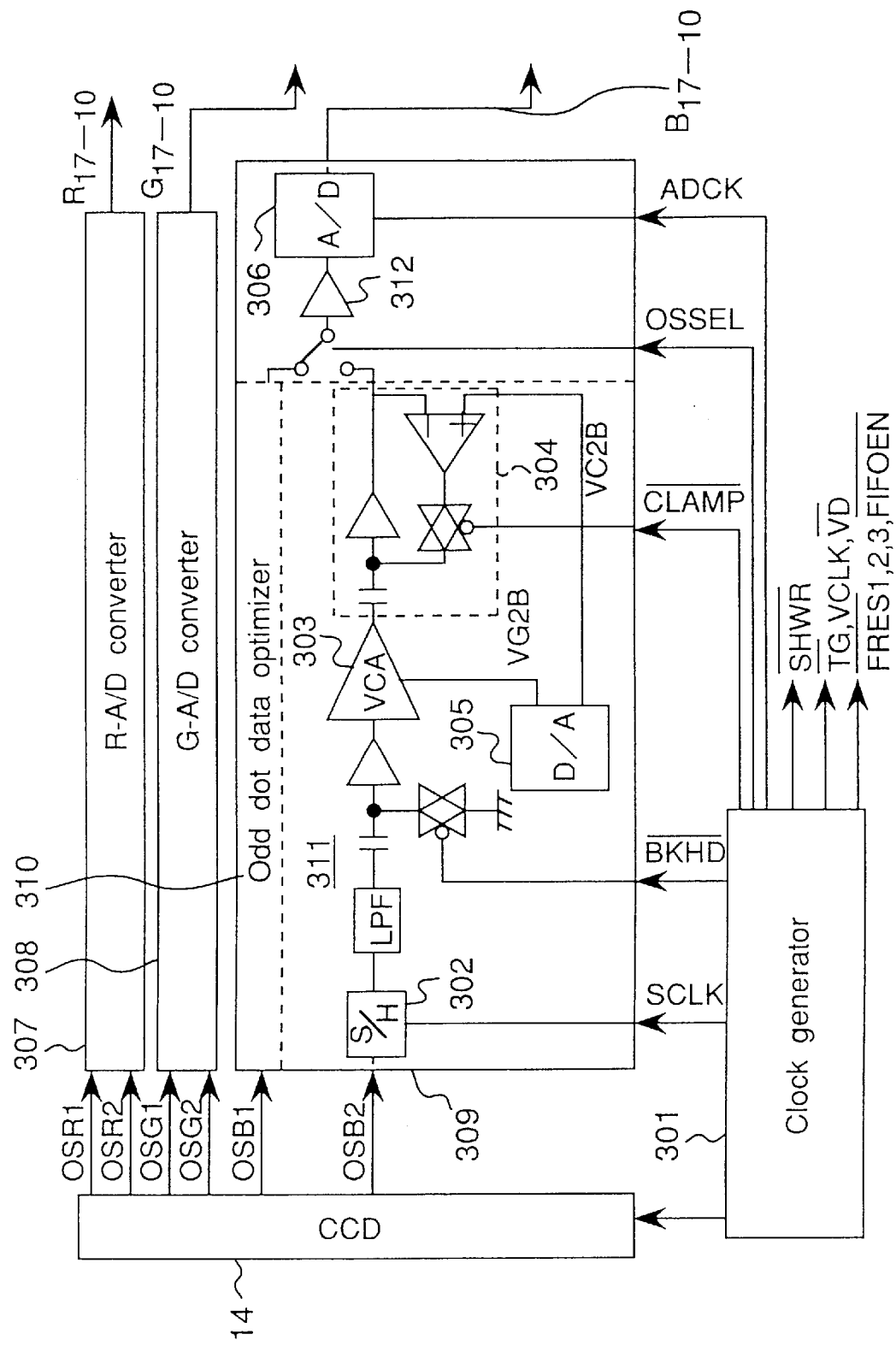
FIG. 4 is a block diagram of an A/D converter.

Each section in the read signal processor 20 shown in FIGS. 3A and 3B is explained in detail. FIG. 4 shows a block diagram of the analog-to-digital (A/D) converter 300 which converts an input signal to 8-bit digital image data. The CCD image sensor 14 receives analog image data OSR1, OSR2, OSG1, OSG2, OSB1 and OSB2 in proportion to a quantity of reflection light of the document image and converts them to 8-bit digital image data R$_{17-10}$, G$_{17-10}$, B$_{7-10}$ of the three colors. The analog image data OSR1, OSG1 and OSB1 denote image data of odd pixels, while the analog image data OSR2, OSG2 and OSB2 denote image data of even pixels. The analog image data are sent to three A/D conversion sections 307, 308 and 309 for red, green and blue. The three sections have the same structure each other, and each section comprises optimizing sections for odd pixels and for even pixels having the same structure each other.

Here, the optimizing section 310 for odd pixels in the section 309 for blue data is explained. A clock signal generator generates various clock signals. A sample-and-hold circuit 302 samples and holds analog data OSB2 of even pixels according to a sampling pulse SCLK and a low pass filter and the like remove reset noises thereof. The signal is clamped according to $\overline{\text{BKHD}}$ signal for switching an analog switch in order to clamp DC level to zero for amplifying the signal by the amplifier 303. Then, a voltage controlled amplifier 303amplifies the signal and a clamp circuit 304 adjust it according to clamp pulse $\overline{\text{CLAMP}}$ to a prescribed DC level which is set according to control voltages VG2B and VC2B from a D/A converter 305.

Image data of odd pixels and even pixels processed by the two optimizing sections 310 and 311 are synthesized as a continuous image data by switching according to signal OSSEL. The synthesized signal is sent through a buffer 312 to an A/D converter element 306 according to a sampling clock pulse ADCK.

(D) Shading Correction Unit

Figure 5:
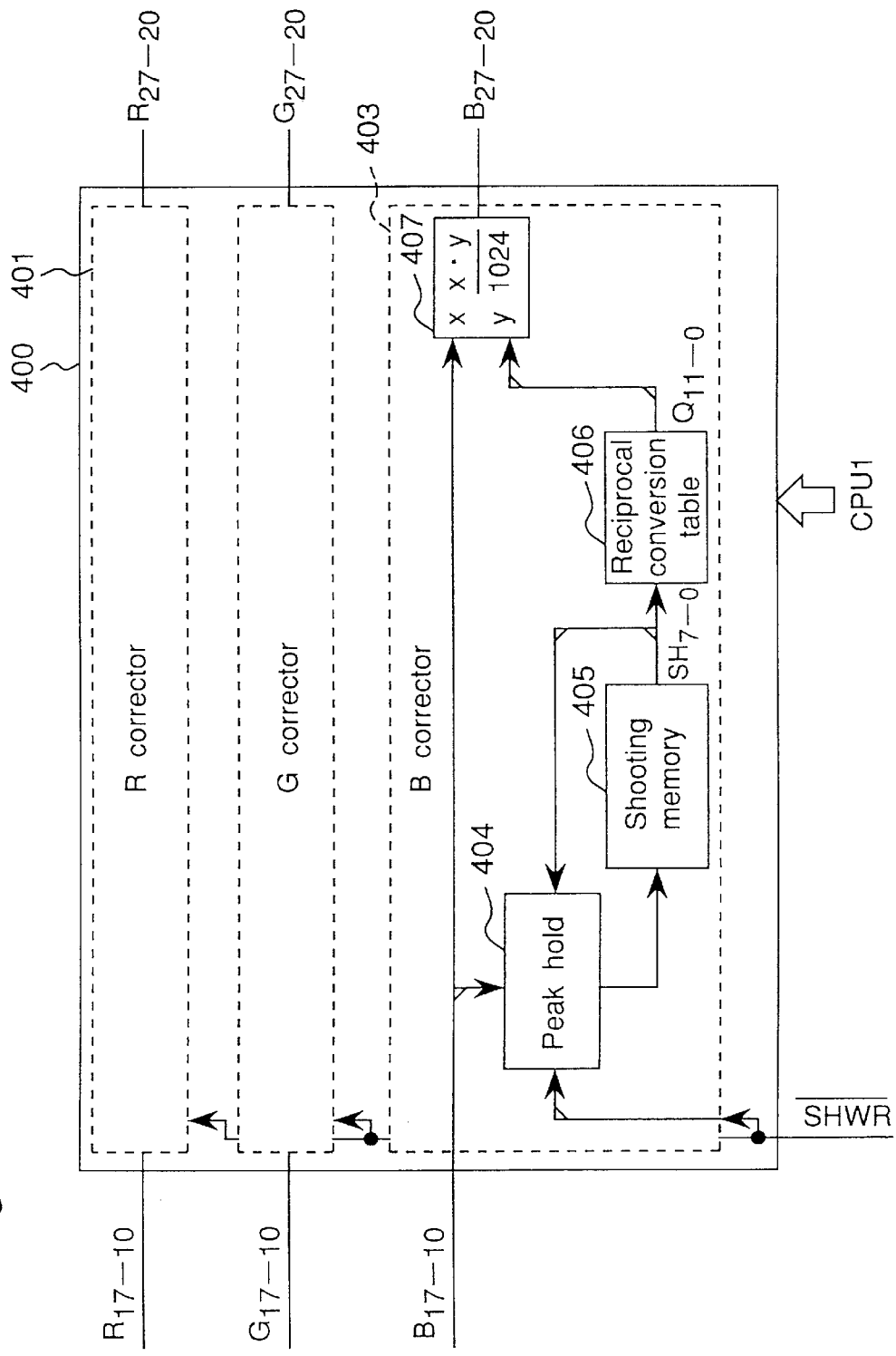
FIG. 5 is a block diagram of a shading correction section.

FIG. 5 shows the shading correction section 400. The shading correction section 400 corrects scattering of read data due to scattering of illumination of the lamp 12 and the like. First, data of a plurality of lines is read on a uniform white plate 16 along the main scan direction. As to the read data, data of the pixels on the same line along the sub scan direction are compared, and a most bright (white) data for each pixel is taken as a data for shading correction. Then, bad data due to dirtiness of the white plate 16 is removed for precise shading correction. Further, in reciprocal conversion on calculating shading correction data, an output data having bits larger than the input data is used for more precise shading correction.

In the block diagram shown in FIG. 5, input data R$_{17-10}$, G$_{17-10}$ and B$_{17-10}$ are received by correction sections 401, 402 and 403 for red, green and blue. That is, shading correction is performed for the image data of red, green and blue independently of each other. Thus, most appropriate shading correction can be performed for each of red, green and blue. The tree correction sections have the same structure each other. Then, the section 403 for blue is explained here. First, the input data B$_{17-10}$ is received by a peak hold circuit 404. When input data of a first line is received, the circuit 404 stores the as-received input data into the shading memory 405. When input data of a second line is received, the peak hold circuit 404 reads the data of the first line stored in the shading memory 405 sequentially and compares it with the data of the second line for each pixel. Then, a brighter data is hold and stores it in the shading memory 405. The image data of the third line and the like are processed similarly. Thus, the brightest data for each pixel is stored in the shading memory 405 to remove bad data due to dirts, ink and the like on the white plate 16.

A signal $\overline{\text{SHWR}}$ is input to the peak hold circuit 404 is kept at H level except when data for correction is read, in order to inhibit data input to the peak hold circuit 404. Then, the data stored in the shading memory 405 is held. On the other hand, when data for correction is read, the signal $\overline{\text{SHWR}}$ is changed to L level, and the above-mentioned processing to store the brightest data is performed. When the image sensor 14 starts to read a document image, the signal $\overline{\text{SHWR}}$ is changed again to H level to keep the data stored in the shading memory 405.

An reciprocal conversion table 400 performs operation of Eq. (1) on the 8-bit shading correction data SH$_{7-0}$ (D$_{in}$) stored in the shading memory 405 to output a 12-bit converted data Q$_{11-0}$ (D$_{out}$).

$$D_{out} = 255 \cdot Q / D_{in} \tag{1}$$
$$= 1 \quad \text{if } D_{in} \geq 4.$$

Figure 6:
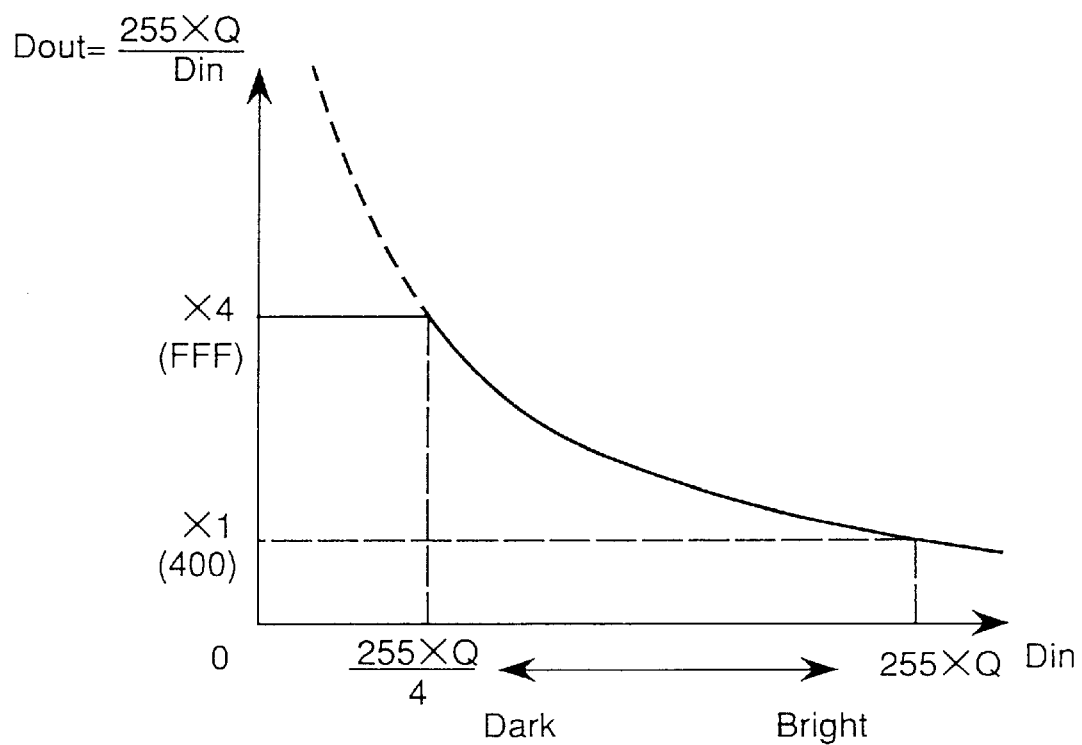
FIG. 6 is a graph of $D_{out}$ plotted against $D_{in}$ for shading correction.

The output data D$_{out}$ is a 12-bit data in order to avoid that the output value D$_{out}$ has the same value when the input value Din differs a little. Then, the precision of the shading correction is kept at a certain level. FIG. 6 shows a relation of D$_{out}$ relative to D$_{in}$. If a value of D$_{in}$ is extremely small, for example, if D$_{in}$ is 255·Q/4 or less, a value of D$_{out}$ increases abruptly and causes an error in shading correction. Then, if D$_{out}$ is 4 or larger, D$_{out}$ is forced to have a value of 1 to invalidate shading correction.

Shading correction is performed by multiplying the data B$_{17-10}$ with the reciprocal obtained by the table 406. That is, $$B_{27-20} = B_{17-10} \cdot D_{out} \tag{2}$$
$$= B_{17-10} \cdot 255 \cdot Q / D_{in}.$$

FIG. 6 shows the relation of Eq. (2). In other words, the data B$_{17-10}$ is normalized to 255·Q. The value Q is determined for each of red, green and blue according to spectral distribution of the white plate 16 for correcting white balance. This reflects a fact that the white plate 16 is not completely white in an actual case. In an embodiment, Qs for red, green and blue are 200/255, 242/255 and 211/255, respectively. The value 255 is a coefficient X which determines background level, and the background can be changed by changing the value X. In this embodiment, the AE processor 600 changes the background level according to a ratio of monochromatic pixels in an entire document, as will be explained later.

(E) Correction Unit for Lines of Three Colors in the Image Sensor

As shown in FIG. 7, the CCD image sensor 14 has three lines of red, green and blue of CCD elements for reading image data with a spacing of 80 μm between two lines. In the copying machine of the embodiment, a pixel has a width of 10 μm, or the three lines of the CCD elements has a spacing of eight lines. Then, the green component of the image data is read before eight lines than the blue component, and the red component is read before sixteen lines than the blue component. Actually, a number preceding the blue component also depends on the moving velocity along the subscan direction of the scanner 10. That is, the number of the lines between two CCD elements multiplied with the magnification Y is the actual lines preceding the blue component. The correction unit 500 stores the R and G data temporarily in memories to delay by predetermined times with respect to the B data in correspondence to the distance between the three CCD lines in the image sensor 14. For example, if magnification is two, a shift of data between each line becomes twice, and a capacity of the memories for the correction also becomes twice. In this embodiment, it is noted that a maximum size of a sheet of paper on which an image is formed is A3, and an effective pixel number in a line is controlled according to the magnification by a processor 501 for correction of the lines. In concrete, if magnification is two, a range to be read in a line is restricted by a half. Thus, an increase in capacity of the memories is suppressed. Further, the data of the lines are interpolated by a processor 502 for interpolation to correct a shift of the read data.

(E-1) Correction for Lines of Three Colors in the Image Sensor

Figure 8:
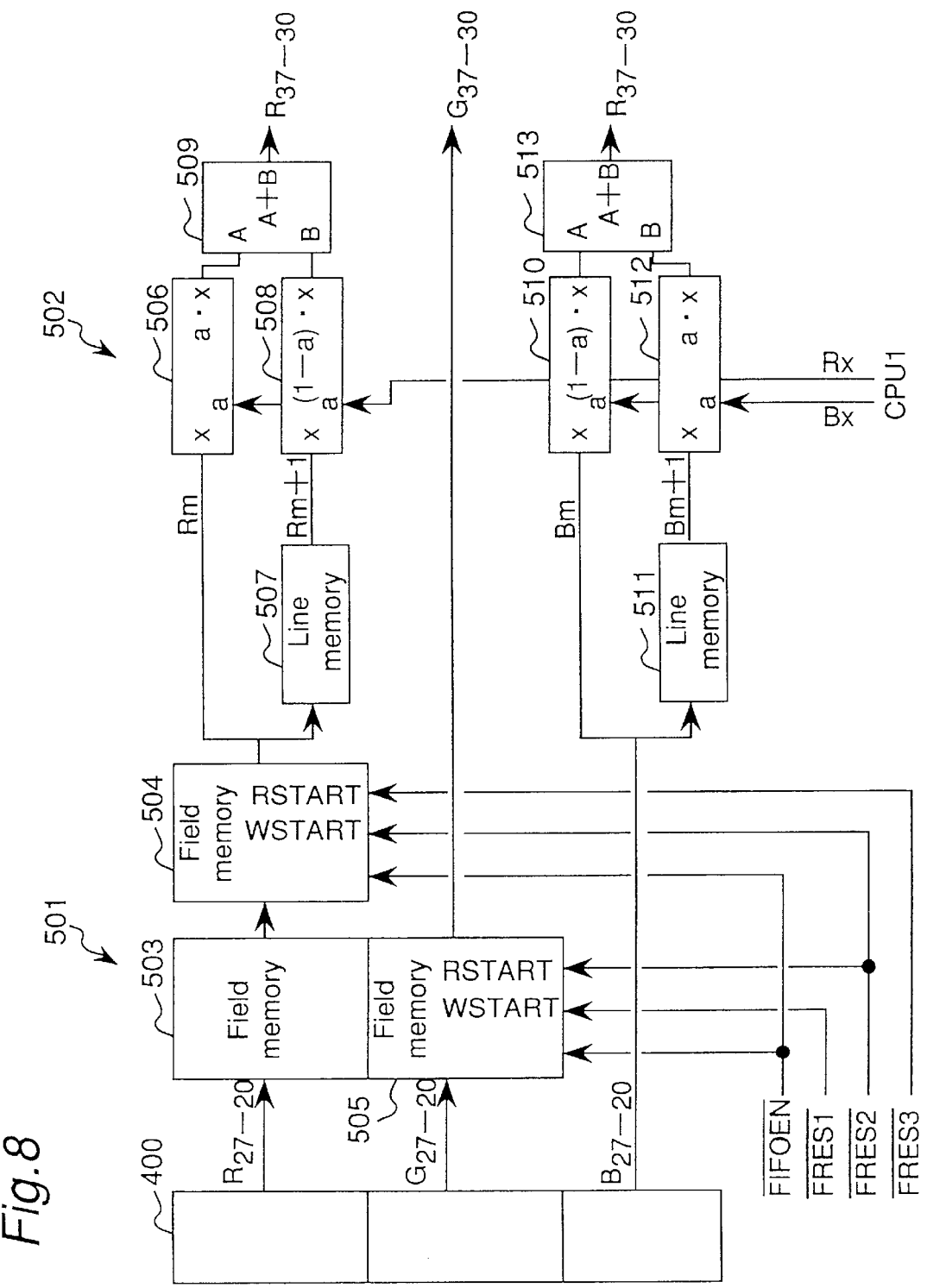
FIG. 8 is a block diagram of a correction unit.

FIG. 8 shows the processor 501 for correction of shifts between the lines and the processor 502 for interpolation in the correction unit 500. Input data $R_{27-20}$ and $G_{27-20}$ from the shading correction section 400 are stored in field memories 503 and 504 having a capacity of 256 K times 8 bits.

The input image data are 8-bit data. If a maximum size of a document read by the CCD image sensor 14 is A4 and the resolution is 400 dpi, a data amount is about 5 k bits for one line along the main scan direction. Therefore, one field memory has image data of 51 lines. When read data is expanded along the subscan direction for printing, each line of image data of a document is read repeatedly Y times where Y denotes magnification, to inflating data along the subscan direction Y times. As explained above, red data precedes by 16Y lines relative to B data, while green data precedes by 8Y lines relative to B data. In order to correct the shifts, it is required that the field memories 503 and 505 can store data of 8Y lines. On the other hand, as explained above, the field memories 503 and 505 only store data of 51 lines, and the magnification can only be enlarged up to 51/8=6.375. A maximum size of a sheet of copy paper is determined preliminarily, for example A3. Then, the correction processor 501 limits a range to be read by the image reader in inverse proportion to magnification X in the main scan direction. Then, an amount of data of one line in the main scan direction is about 5 k/X bits, and the field memory 503, 504 can store data of about 256 k/(5 k/X)=51X lines. Thus, the correction unit 500 increases a maximum magnification without increasing a memory capacity.

Figure 9:
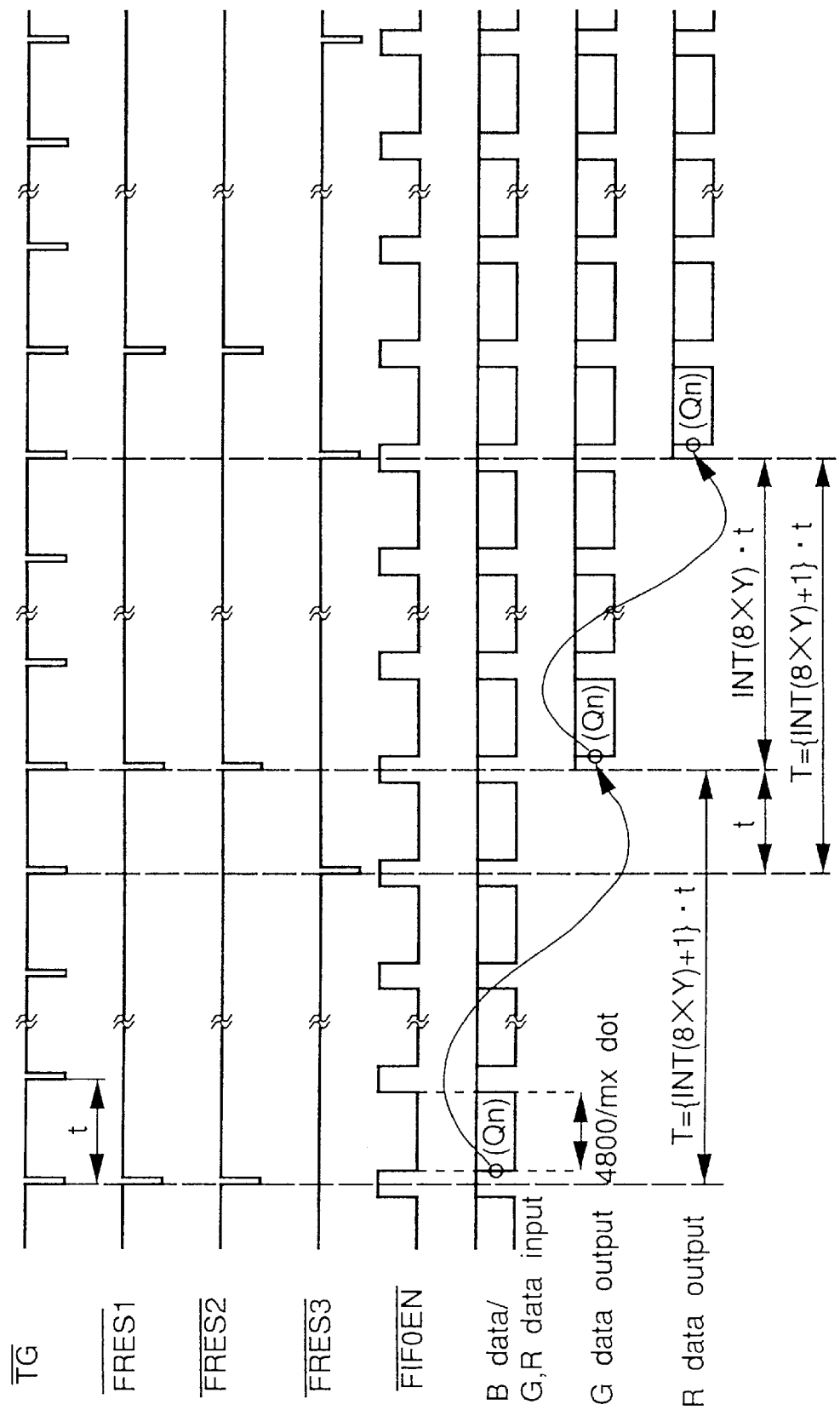
FIG. 9 is a timing chart of control signals and image data.

FIG. 9 shows a timing chart of control signals and image data. Signal $\overline{TG}$ denotes a trigger signal in synchronization with read period t of a line along the main scan direction by the image sensor 14. Signal $\overline{FIFOEN}$ is output in a read area determined according to magnification along the main scan direction. Signal $\overline{FRES1}$ is a write start signal for the field memories 503 and 505 with a period T of (INT(8Y)+1). Signal $\overline{FRES2}$ denotes a read start signal for the field memories 503 and 505 and has a period of T in synchronization with signal $\overline{FRES1}$. Data are started to be written in the field memory 503, 505 in synchronization of a leading edge of signal $\overline{FRES1}$. Then, they are read after the period T passes in synchronization with a leading edge of signal $\overline{FRES2}$. The signal $\overline{FRES2}$ also serves as a write start signal for a field memory 504. The field memory 505 writes the data from the field memory 503 in synchronization of signal $\overline{FRES2}$. Signal $\overline{FRES3}$ precedes by a read time t of by one line with respect to the signals $\overline{FRES1}$ and $\overline{FRES2}$, and has a period T. The preceding time of t is for the interpolation by the processor 502 for synchronizing red and blue image data to green image data.

(E-2) Interpolation

Next, the processor 502 for interpolation in the correction unit 500 is explained. The periods T of signals, $\overline{FRES1}$, $\overline{FRES2}$ and $\overline{FRES3}$ are rounded by INT function to synchronize with signal $\overline{TG}$. Then, the output of data from the field memory 503, 505 can be controlled in the unit of t (or an eighth times magnification). The processor 502 corrects the shift of (8Y−INT(8Y)) line which cannot be corrected by the processor 501.

Figure 10:
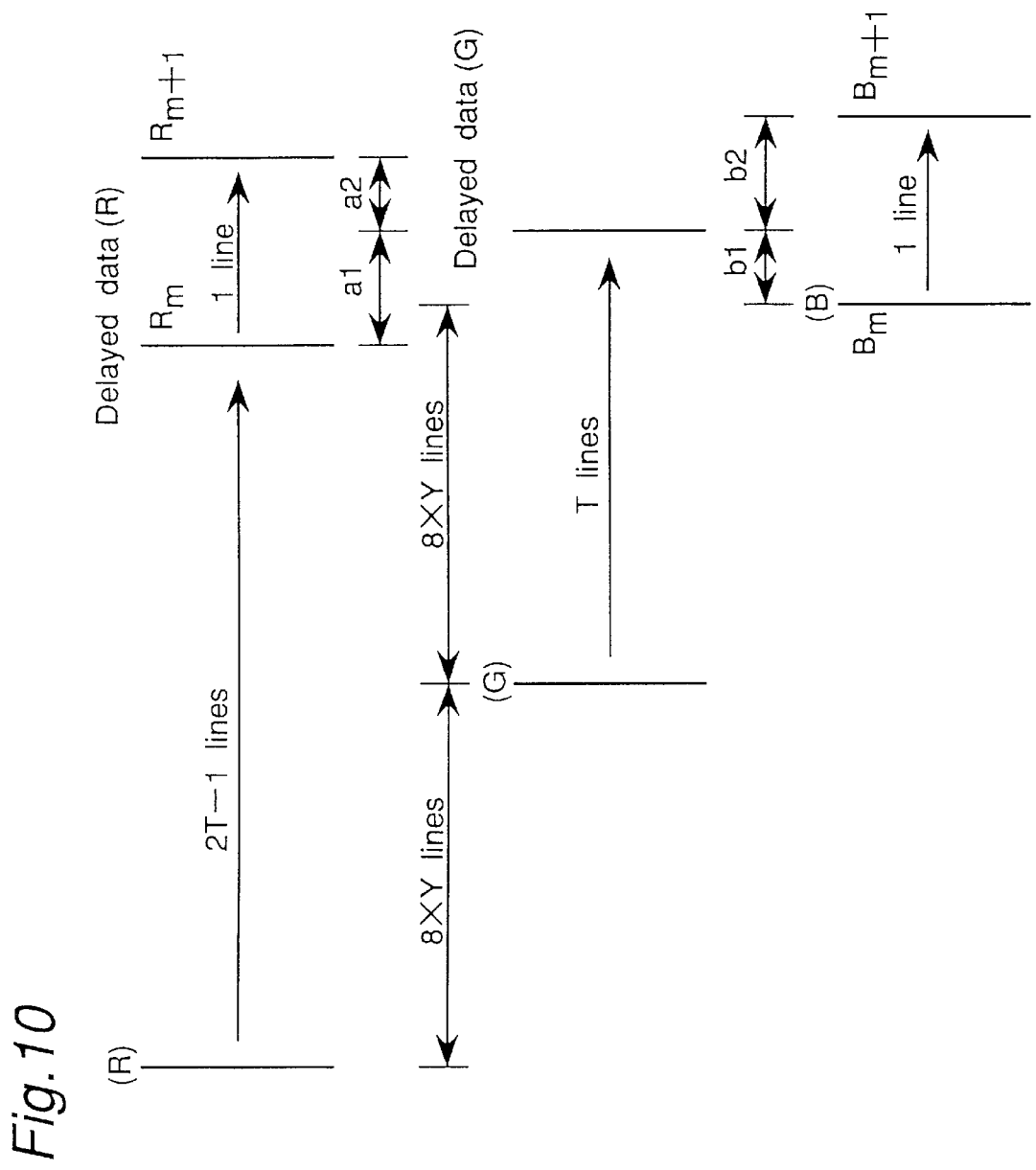
FIG. 10 is a diagram of shift of the image data of red (R), green (G) and blue(B) output by the image sensor.

FIG. 10 illustrates shift of the image data of red (R), green (G) and blue (B). In the processor 501, the R data is delayed by 2T−t, and the G data is delayed by T. Actually, the image data of R, G and B are shifted by 8Y lines each other. Owing to a fraction of 8Y, the R data precedes by a1=(8Y−INT (8Y)) line relative to the G line, and the G data precedes by b1=(1−(8Y−INT(8Y))) line relative to the B line.

As shown in FIG. 8, the R data stored in the field memory 504 flows through two paths. The R data along a path is delayed by one line by a line memory 507. If $R_m$ denotes a data of M-th line, data $R_m$ is sent from the field memory 504 to a multiplier 506, while data $R_{m+1}$ is sent to another multiplier 508 from the line memory 507. The multiplier 506 performs a following operation:

$$R_x \cdot R_m, \tag{3}$$

where $R_x$ is a coefficient determined by a following relation:

$$256:1 = R_x:1 - a_1 \tag{4}$$
$$= R_x:1 - (8Y - \text{INT}(8Y)),$$

or $$R_x = 256(1 - (8Y - \text{INT}(8Y))).$$

On the other hand, the other multiplier 508 performs a following operation:

$$(1-R_x) \cdot R_{m+1}, \tag{5}$$

Data obtained by the multipliers 506 and 508 are added by an adder 509 to supply data $R_{37-30}$. Thus, the correction on the fraction of multiplication is completed on the R data.

As shown in FIG. 8, the B data $B_{27-20}$ received from the shading correction unit 400 also flows through two paths. The R data along a path is delayed by one line by a line memory 511. If $B_m$ denotes a data of M-th line, data $B_m$ is sent to a multiplier 510, while data $B_{m+1}$ is sent to another multiplier 512 from the line memory 511. The multiplier 510 performs a following operation:

$$(1-B_x) \cdot B_m, \qquad (6)$$

where $R_x$ is a coefficient determined by a following relation:

$$256:1 = 256 - B_x:1 - b_1 \qquad (7)$$
$$= 256 - B_x:8Y - \mathrm{INT}(8Y),$$

or $$R_x = 256(1 - (8Y - \mathrm{INT}(8Y)).$$

On the other hand, the other multiplier 512 performs a following operation:

$$B_x \cdot B_{m+1}, \qquad (8)$$

Data obtained by the multipliers 510 and 512 are added by an adder 513 to supply data $B_{37-30}$. Thus, the correction on the fraction of multiplication is completed on the B data.

As explained above, the interpolation correction of the R and B data is performed relative to the G data, and the magnification can be set in the unit of $1/1024$. The data $R_{37-30}$, $G_{37-30}$ and $B_{37-30}$ subjected to the interpolation correction are sent to the AE processor 600 and to the magnification change and move processor 800.

(F) Automatic Exposure Processor

Figure 11:
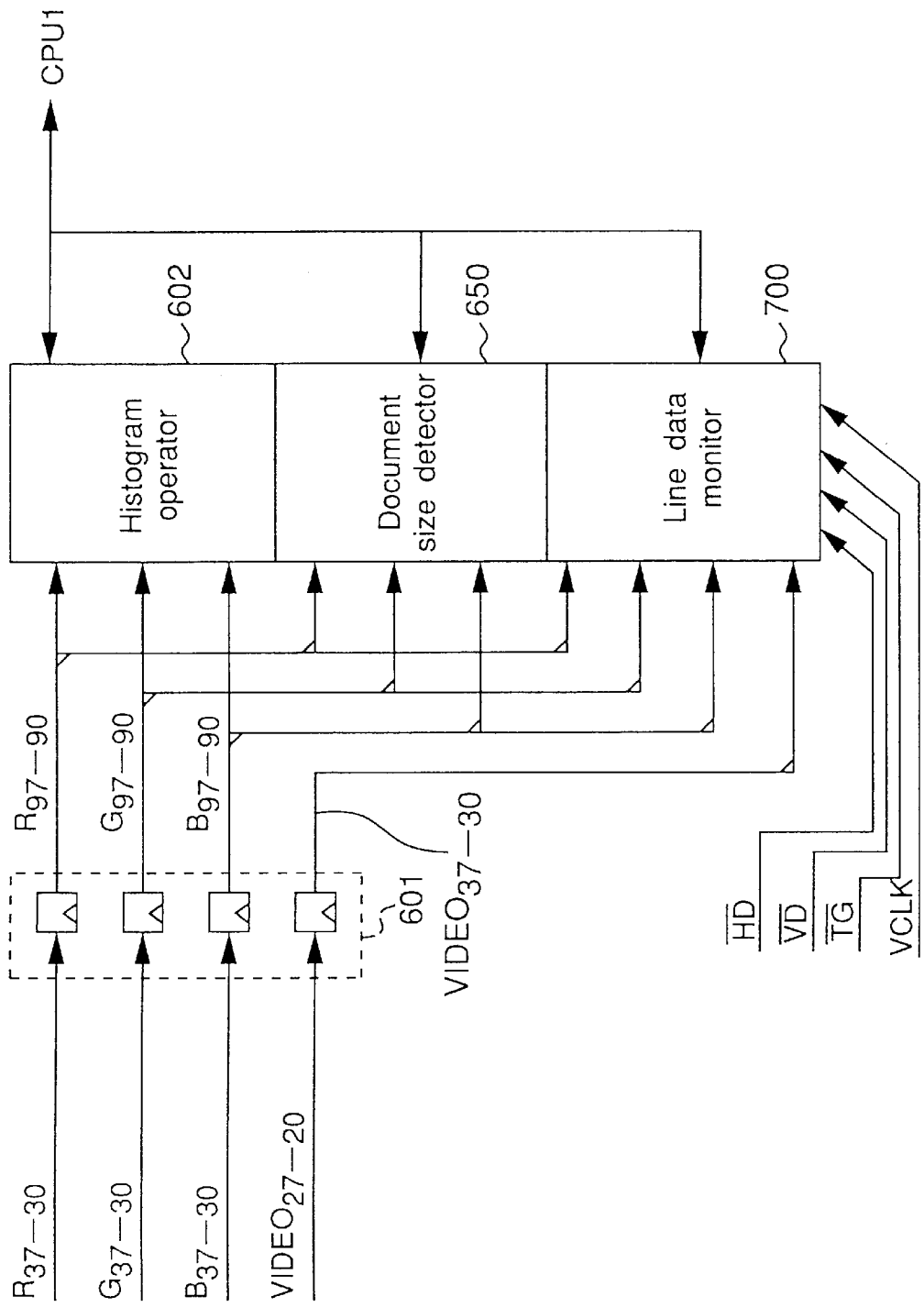
FIG. 11 is a block diagram of an automatic exposure processor.

The automatic exposure (AE) processor 600 detects document size and performs automatic color selection (ACS) and automatic exposure. FIG. 11 shows a block diagram of the automatic exposure processor 600. The processor 600 comprises a histogram generator 602 generates a histogram of monochromatic gradation data in a document image, a document size detector 650 detecting a document size, and a line data monitor 700 monitoring one line of data of R, B and B image data to detect anomalies due to troubles of the lamp 12, the image sensor 14 and the like.

As explained below, the auto color selection is performed to decide if the document is a full color document or a monochromatic document according to a ratio of monochromatic pixels in the whole document. The automatic exposure determines a background level of a document so that the most bright color in the document becomes white (gradation level 255). However, if the automatic exposure is performed on a full color document, an image reproduced on a sheet of paper seems to fade away as a whole. Then, the automatic exposure is forbidden if the automatic color selection decides that the document is a full color document.

(F-1) Histogram

Figure 12:
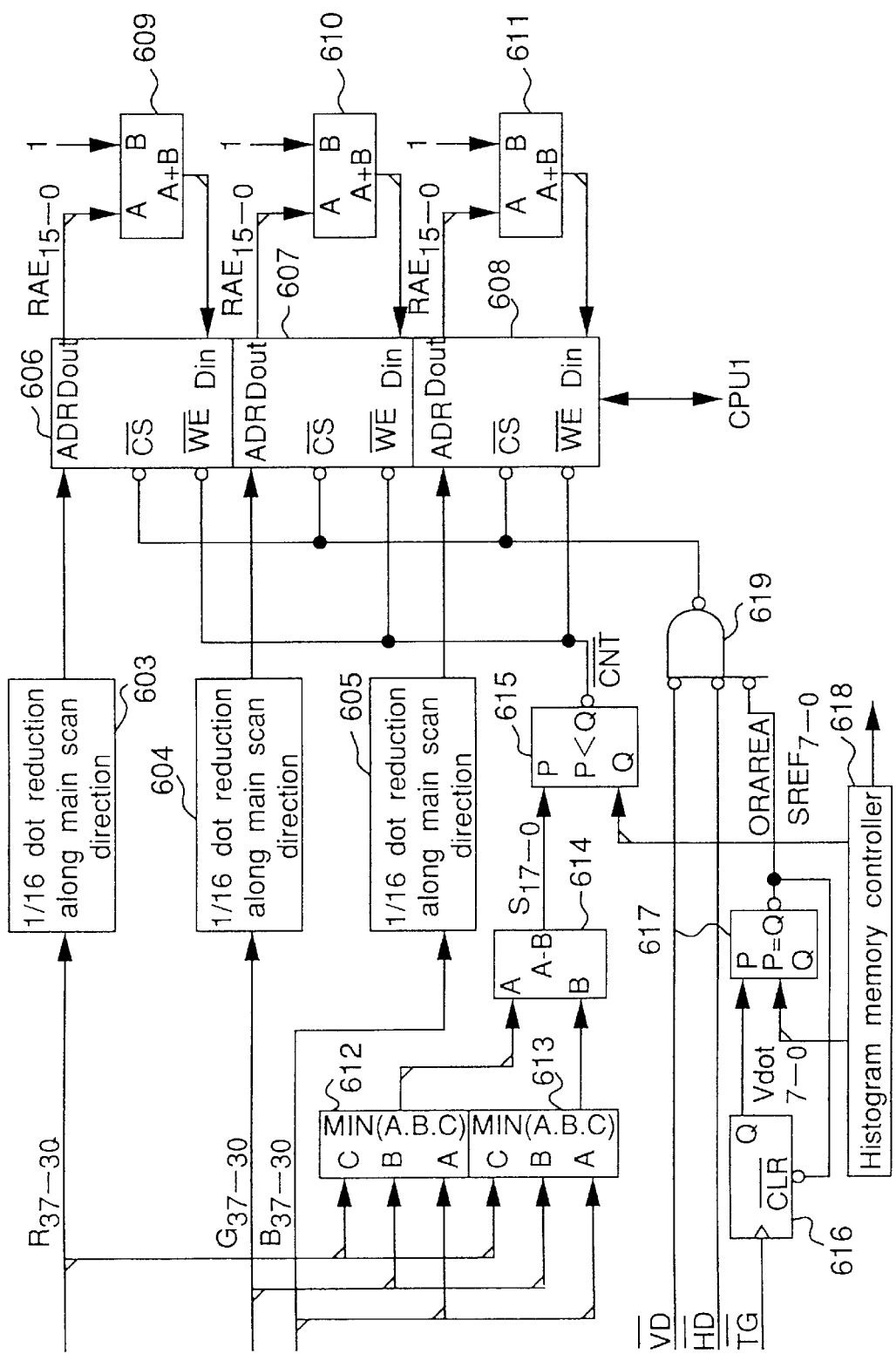
FIG. 12 is a block diagram of a histogram generator.

FIG. 12 shows a block diagram of the histogram generator 602. The histogram generator 602 generates a histogram of monochromatic gradation data of 256 gradation level in a document image, and the histogram is used in the automatic exposure processing explained later to decide if a ratio of the monochromatic gradation data is large or not.

Thinning out of the pixel data along the main scan direction is performed by thinning out circuits 603, 604 and 605 for the data $R_{37-30}$, $G_{37-30}$ and $B_{37-30}$ of red, green and blue received from the interpolation corrector 500. The circuits 603, 604 and 605 output a data once in sixteen pixels (pixel data) along the main scan direction to SDR pin of the histogram memories 606, 607 and 608 for red, green and blue. Thus, the data is thinned out at a ratio of $1/16$ along the main scan direction.

Thinning out of pixel data along the subscan direction is performed by a counter 616, a comparator 617 and a NAND gate 619. The counter 616 counts trigger signals $\overline{TG}$ generated once in the main scan. The comparator 617 outputs a signal when a count of the counter 616 equals to signal $Vdot_{7-0}$ received from a controller 618, and the counter 616 is reset when an output signal of the comparator 617 is received as a clear signal $\overline{CLR}$. The NAND gate 619 receives synchronization signal $\overline{HD}$ along the main scan direction, synchronization signal $\overline{VD}$ along the subscan direction and the output signal from the comparator 617. An output of the NAND gate 619 is sent to the histogram memories 606–608 as chip select signal $\overline{CS}$. Thus, the data is thinned out at a ratio of $1/Vdot_{7-0}$ along the subscan direction.

It is decided by a minimum detector 612, a maximum detector 613, an operator 614 and a comparator 615 if ratio of the monochromatic gradation data in a document image $R_{37-30}$, $G_{37-30}$ and $B_{37-30}$ is large or not. The decision utilizes a fact that differences between R, G and B data are small for monochromatic data. The minimum detector 612 detects a minimum of data of red (C), green (B) and blue (A) received at the same time, while the maximum detector 613 detects a maximum of the same data of red (C), green (B) and blue (A). The operator 614 calculates a difference of the maximum from the minimum. The comparator 615 compares the difference with a reference $SREF_{7-0}$ received from the controller 618. If the difference is smaller than the reference, the pixel detects a monochromatic light, and the comparator 615 sends a signal to $\overline{WE}$ pins of the histogram memories 606–608. If the reference $SREF_{7-0}$ is set to have a somewhat larger value, even if the background has a color, the background color can be treated as monochromatic color on purpose.

The histogram memories 606–608 calculate frequencies of the pixel data decided to be monochromatic by the comparator 615. For example, after the initialization of the CPU 1, signals of L level are input to $\overline{CS}$ and $\overline{WE}$ pins, the histogram memories 606 outputs a frequency $RAE_{15-0}$ of pixel data received at $\overline{ADR}$ pin. An adder 609 adds one to the frequency and sends the sum to Din pin of the histogram memory 606. The histogram memories 607 and 608 also operate similarly.

Figure 13:
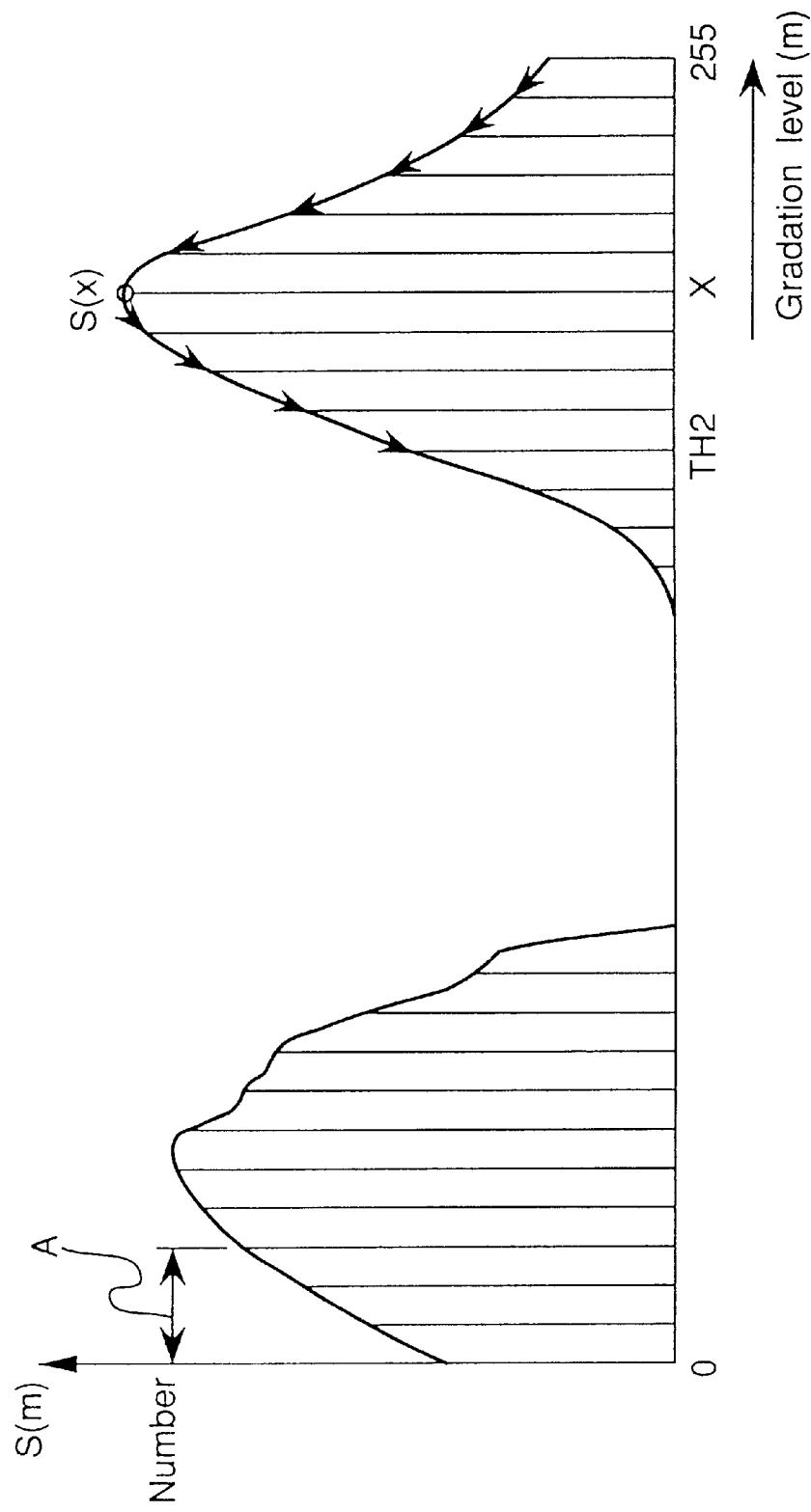
FIG. 13 is a graph of a histogram of a document image.

As explained above, the histogram generator 602 generates a histogram for monochromatic data included in a document image. FIG. 13 shows an example of a histogram. A range A shown in FIG. 13 is not used when the ratio of monochromatic pixels is calculated. This is intended to exclude black data outside a document because a cover having a mirror plane is used to cover a document on a platen.

(F-2) Document Size Detection

Figure 14:
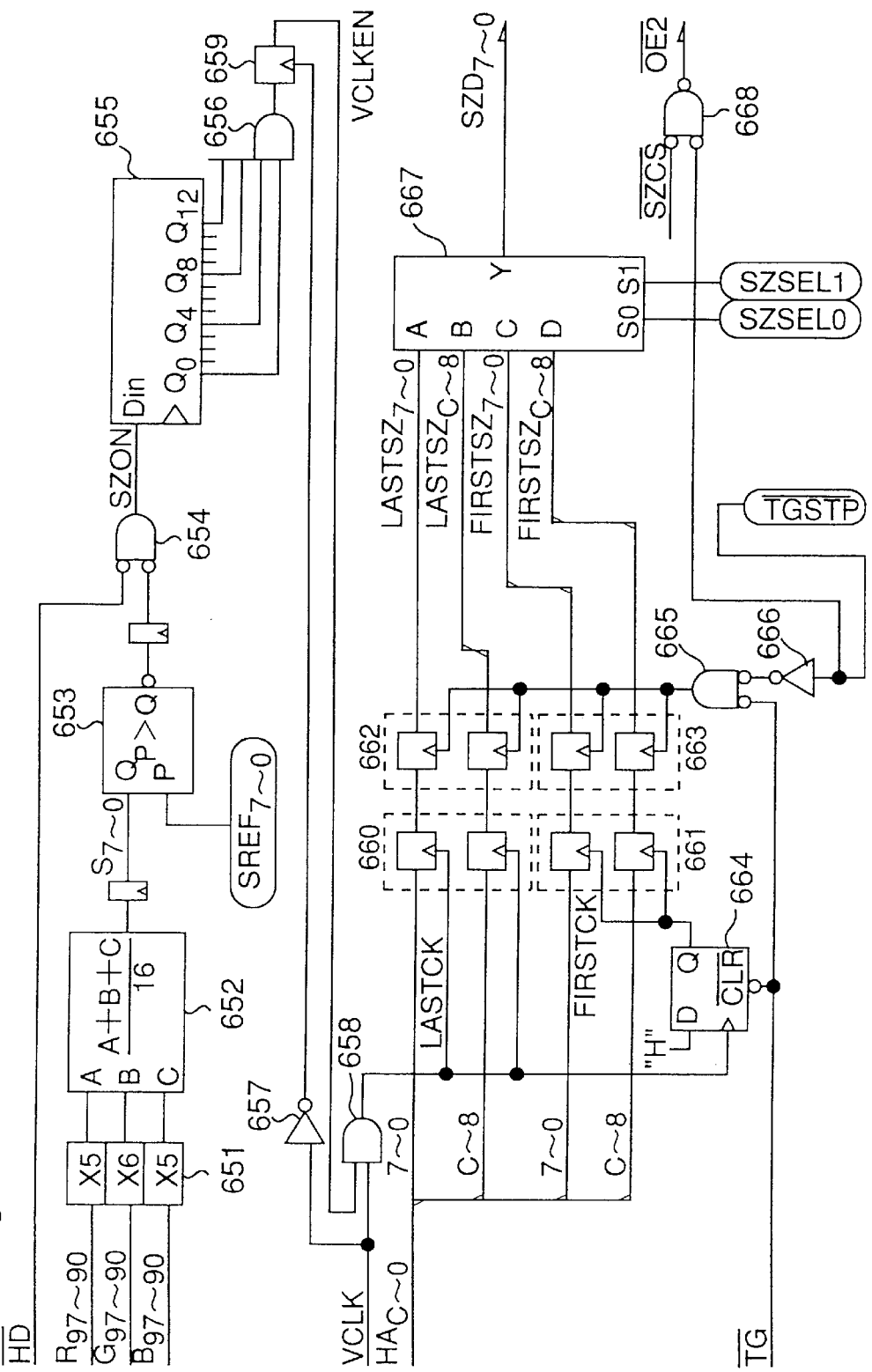
FIG. 14 is a block diagram of document size detector.
Figure 15:
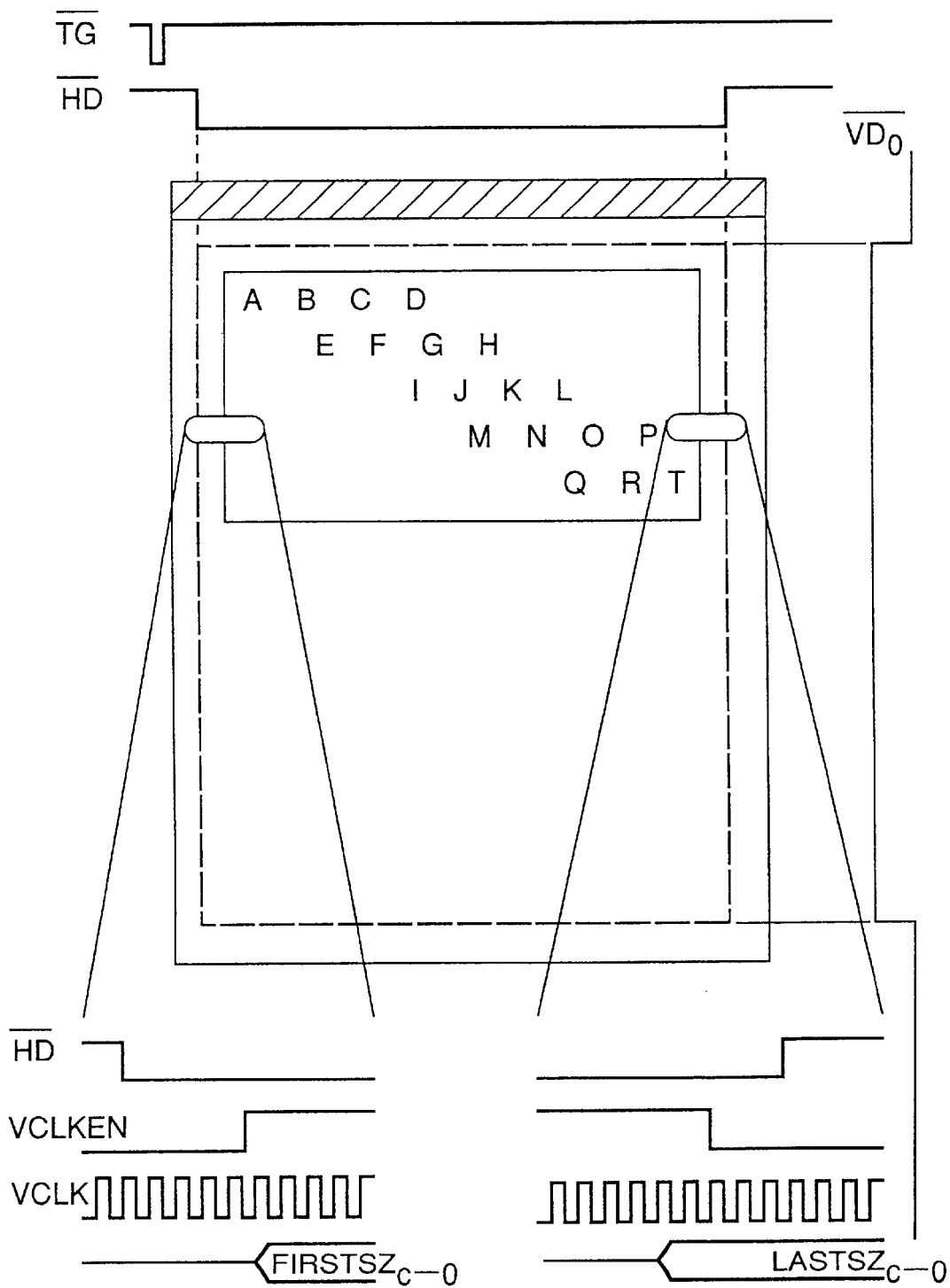
FIG. 15 is a diagram of a document and signals for document size detection.

FIG. 14 shows the document size detector 650. In the detection of document size by the document size detector 650, a range of the existence of a document on a platen 15 is detected along a main scan direction in the unit of line (refer to FIG. 15) in a prescan before a copying operation. In this embodiment, a document cover which covers a document put on the platen has a prescribed color of a uniform density to detect a boundary of the document. As shown in FIG. 15, a prescan is performed in an area of A3 in correspondence to the maximum document size. The document size $SZD_{7-0}$ is detected on input image data $R_{97-90}$, $G_{97-90}$ and $B_{97-90}$, and it used to determine a ratio of monochromatic data in the document by the automatic exposure processing explained later.

In the document size detector 650 shown in FIG. 14, multipliers 651 multiplies the input image data $R_{97-90}$, $G_{97-90}$ and $B_{97-90}$ with 5, 6 and 5, respectively, and an operator 652 adds the products and divided it with 16. Thus, a signal $S_{7-0}$ is obtained by mixing the input image data $R_{97-90}$, $G_{97-90}$ and $B_{97-90}$ with a ratio of 5:6:5. A comparator 653 outputs a signal to the NAND gate 654 if the signal $S_{7-0}$ is smaller than $SREF_{7-0}$ received from the controller 618. The NAND gate 654 further receives signal $\overline{HD}$ which is output in an area where the document can be read. Then, the NAND gate 654 outputs a signal $\overline{SZON}$ when the input image data $R_{97-90}$, $G_{97-90}$ and $B_{97-90}$ are decided to be pixel data of a document image.

A 13-bit shift register 655 receives the SZON signal extracts it every four signals to send four signals Q0, Q4, Q8 and Q12 to a NAND gate 656. When all the four signals have H level, this means that a document area is detected at 16 continuous pixels (about 1 mm). Then, erroneous detection of document size can be detected. A D-FF 659 receives an output signal of the NAND gate 656 and outputs a signal VCLKEN, as shown in a timing chart shown at the bottom in FIG. 15.

At an AND gate, a signal VCLK is enabled by the signal VCLKEN from the D-FF 657 to output signal LASTCK. The signal LASTCK is disabled at a trailing edge of the signal VCLKEN at a last end of the document area along the main scan direction so at to latch an address $HA_{c-0}$ in D-FFs 660. A flip flop 664 generates signal FIRSTCK according to the signal so as to change the output of D-FFs 661 which have been cleared by a trigger signal $\overline{TG}$. That is, the signal FIRSTCK rises at the leading edge of the first LASTCK of a line. Then, the address latched in the D-FFs 661 with the signal FIRSTCK becomes the top address of the document area.

The addresses latched in the D-FFs 660 and 661 are latched again in D-FFs 662 and 663 in correspondence to a signal of H level from an AND gate 665 generated by a signal $\overline{TG}$ so as to generate document size address signals $LASTSZ_{C-0}$ and $FIRSTSZ_{C-0}$ to be sent to a selector 667. The CPU 1 disables the signal $\overline{TG}$ once with signal $\overline{TGSTP}$, and a desired address signal is selected by providing signals SZSEL1 and SZSEL0 to the selector 667.

The selector 667 selects lower eight bits of the address at the last end of a document if SZSEL1=SZSEL0=0, upper five bits thereof if SZSEL0=0 and SZSEL1=1, to send it as a document size data $SZD_{7-0}$ to the CPU 1. Further, the selector 667 selects lower eight bits of the address at the top end of the document if SZSEL0=1 and SZSEL1=0, upper five bits thereof if SZSEL0=SZSEL1=1, to send it as a document size data $SZD_{7-0}$ to the CPU 1. The CPU 1 repeats the above-mentioned data read to recognize the document area along the subscan direction.

The document size data $SZD_{7-0}$ of 0 in a document and 1 outside it is written in a bit map memory provided in the CPU 1 by using the top and last addresses detected along the main scan direction and along the subscan direction successively. Next, it is decided if points of change from 1 to 0 and from 0 to 1 exists as a continuous line along the subscan direction. If discontinuity is detected, the address of the discontinuous change is corrected based on previous and following lines. This corrects erroneous detection for example when the document is a book and a center of the book is read as black, or when an edge of a document is dirty. After the correction, when the copying operation is started, the CPU 1 determines an effective document area according to the bit map data along the main scan direction successively.

Figure 16:
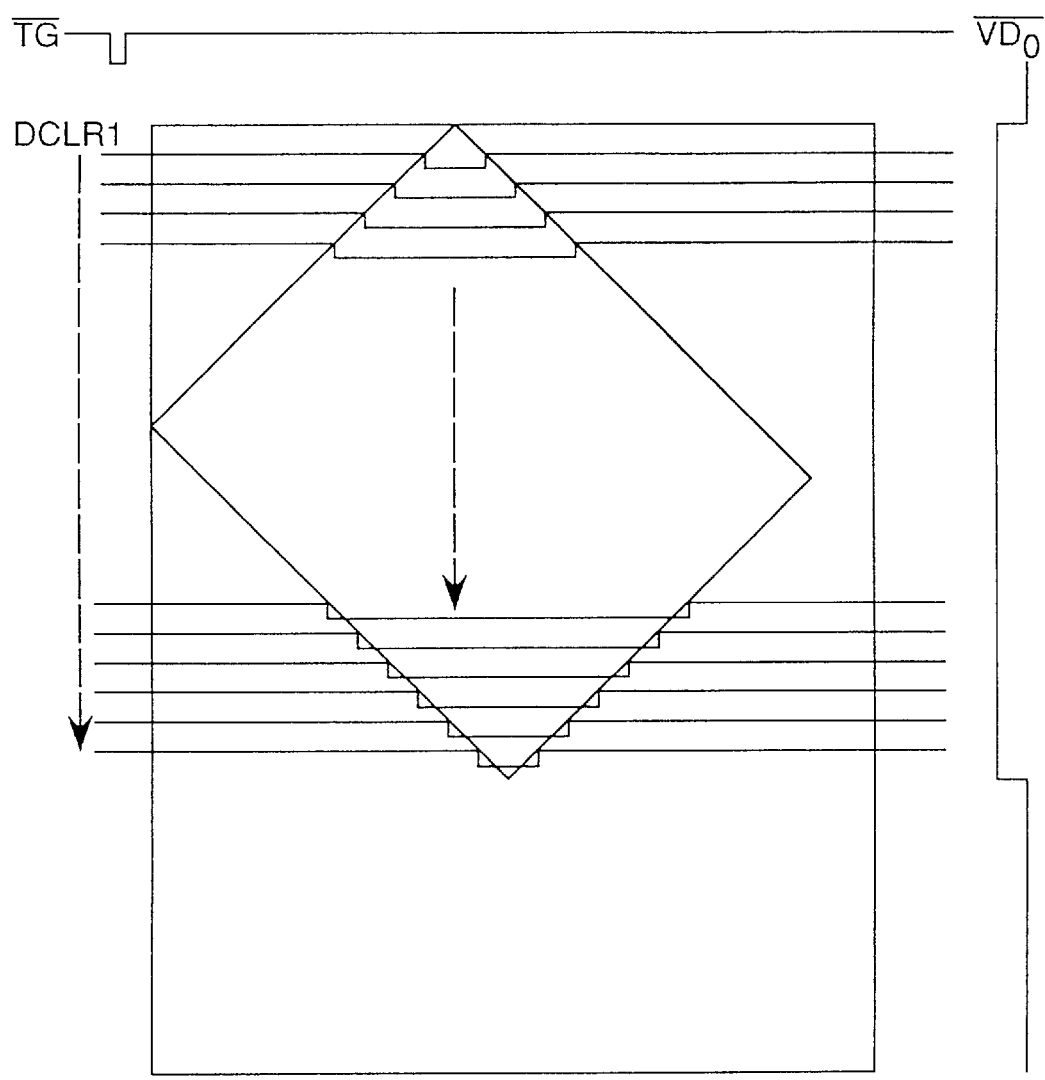
FIG. 16 is a diagram of a document put on a platen obliquely and DCLR1 signal.

The document size data $SZD_{7-0}$ is sent to the controller 801 in the magnification change and move section 800 explained later. The controller 801 generates signal DCLR1 which is L level in the document area and H level outside it according to the document size data $SZD_{7-0}$ in order to mask an area unnecessary for image processing. Then, even if a document is put obliquely as shown in FIG. 16, the area outside the document area can be masked in correspondence to the location of the document.

(F-3) Automatic Exposure

Figure 17B:
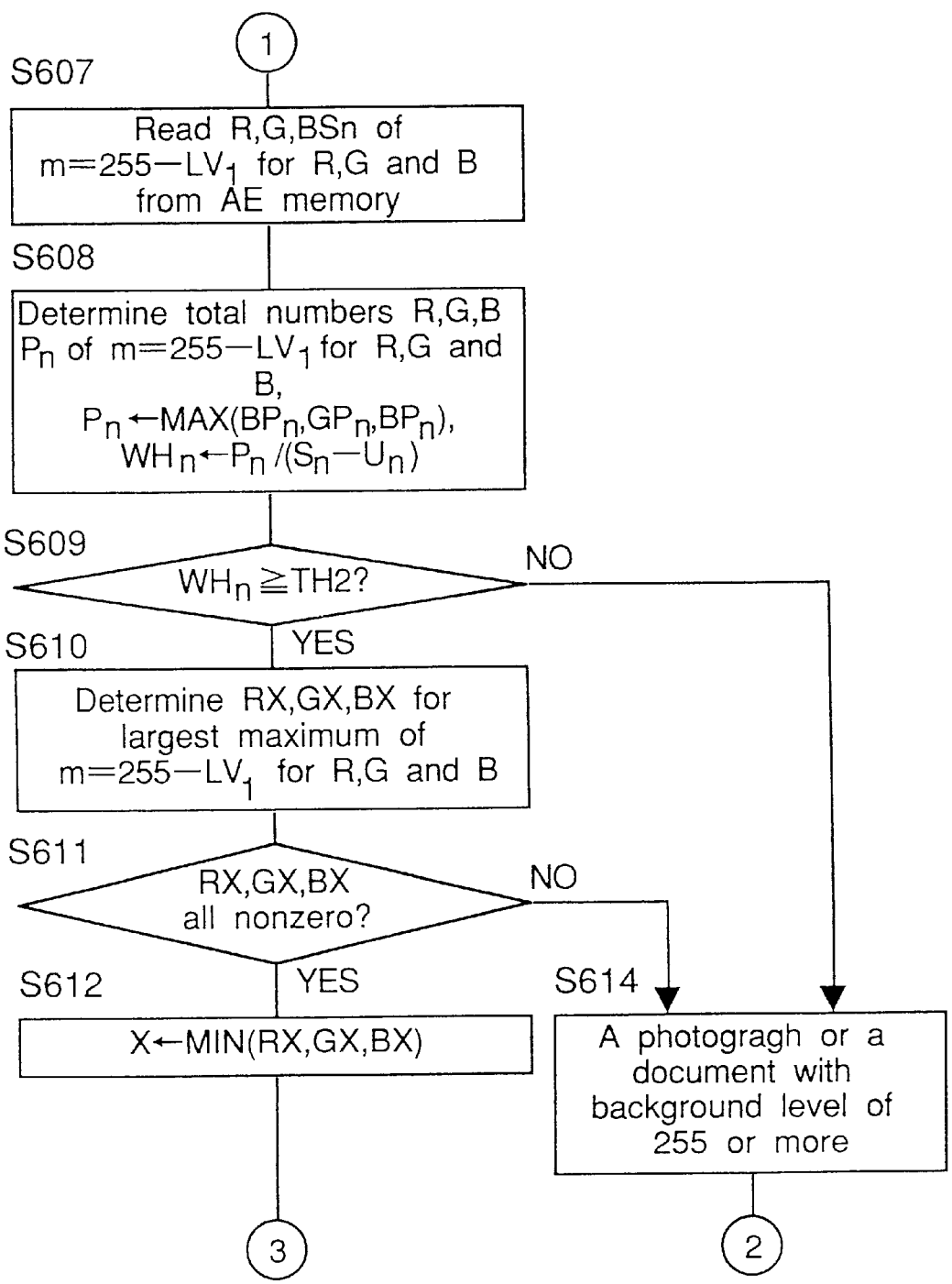
Figure 17C:
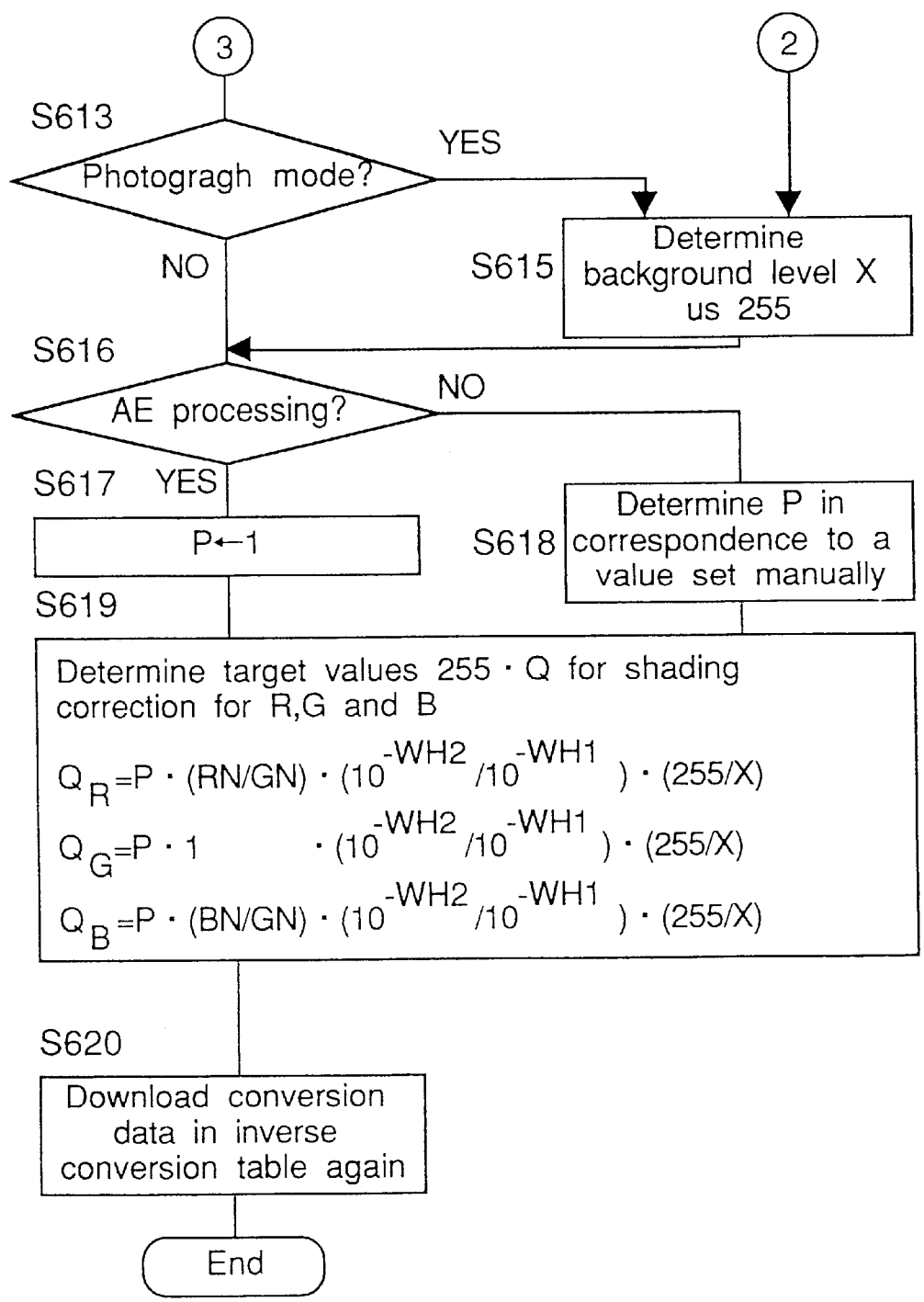

Signals $\overline{TGSTP}$ and $\overline{SZCS}$ are set if the CPU 1 is hard to read the signal $SZD_{7-0}$. Signal $\overline{OE2}$ is used as a sort signal for the CPU 1. FIGS. 17A, 17B and 17C show a flow of automatic exposure of the CPU 1 wherein the coefficient X of the background level explained above on the shading correction section 400 based on the histogram and the document area determined above. First, a prescan is performed. After the prescan is completed (YES at step S600), a total pixel number outside the document area is determined according to the document size determined by the document size detector 650 (step S601). Next, by multiplying a total pixel number of the maximum document area (A3 size) with ratios of thinning out along the main scan direction and along the subscan direction, a total pixel number Tn which can be stored in the histogram memories 606–608 is determined, and a pixel number Un outside the area is determined by multiplying the pixel number outside the document size detected by the document size detector 650 with the ratios of thinning out (step S602). Next, frequencies RSn, GSn and BSn stored in the histogram memories 606–608 is checked and a maximum thereof is determined (step S603). Then, achromatic ratio BKn=(Sn−Un)/(Tn−Un) is determined as a ratio of achromatic data in the document image according the values Sn, Un and Tn determined above (step S604). Because pixel data outside the area is read as black near 0, Un is subtracted from Sn and Tn. If the achromatic ratio BKn is equal to a predetermined threshold level TH1 or lower (NO at step S605), it is decided that the document is a color document (step S606), and the coefficient X of the background is set at 255 (step S615). On the other hand, if it the achromatic ratio is less than the threshold level TH1 (YES at step S605), it is decided that the document is a monochromatic document, and the histograms are analyzed.

First, frequencies RS(m), GS(m) and BS(m) are read from the histogram memories 606–608 at gradation level m from 255 to a certain level LV1 for each of red, green and blue (step S607). Next, total frequencies RPn, GPn and BPn are calculated, and a maximum of RPn, GPn and BPn is determined. Further, a background ratio WHn=Pn/(Sn−Un) of a monochromatic document is determined (step S608). If the background ratio WH2 is equal to a threshold level TH2 or larger (YES at step S609), gradation levels RX, GX and EX of red, green and blue in correspondence to maximums appearing first by checking from the top level 255 are determined (step S610). If the background coefficients are determined for each of red, green and blue, the color balance except the background is deteriorated. Then, if there exist all of RX, GX and BX (YES at step S611), a minimum thereof is determined as the ground level coefficient X (step S612).

If one of RX, Gx and EX has no maximum (NO at step S611) or if the background ratio is less than the predetermined threshold TH2 (NO at step S609), it is decided that the document has background of 255 or larger or the document is a photograph document or the like having no background (step S614) and sets the coefficient X to be 255 (step S615). Further, even if RX, GX and BX all exist (YES at step S611), the coefficient X is set to be 255 in the photograph mode (YES at step S613).

When the standard mode is set (YES at step S616), the automatic exposure processing is performed. As explained later, coefficient P is set as 1 (step S617). On the other hand, if the exposure level is set manually (NO at step S616), the coefficient P is set according to the level 1–7 (step S618) (refer to Table 1), and in this case, X=255.

As explained above on shading correction, the white plate 16 for shading correction is not ideal white, and the spectral distribution thereof is replaced as RN:GN:RN instead of sensitivity ratio of red, green and blue of the image sensor 14. If WH1 denotes sensitivity of green wavelength region of the plate 16 and WH2 denotes a minimum of the dynamic range of the density gradation of a copy, Q is calculated for a desired value 255/Q of the reciprocal conversion table for shading correction for each of red, green and blue as follows:

$$Q_R = P \cdot (RN/GN) \cdot 10^{WH1-WH2} \cdot (255/X),$$

$$Q_G = P \cdot 1 \cdot 1 \cdot 10^{WH1-WH2} \cdot (255/X), \quad (9)$$

and $$Q_B = P \cdot (BN/GN) \cdot 10^{WH1-WH2} \cdot (255/X),$$

The coefficients are used when the background level is set manually, and they are set to be one when automatic exposure is performed. When the background level is set manually, the value X of the background level is set to be 255. Table 1 is shows values of the coefficients P and N for automatic exposure and for manual setting. The background level set manually has seven steps. The level has a center at level 4, and as the level departs from 4 toward 1, the background is canceled more, while as the level departs from 4 toward 7, the background or fog becomes noticeable more.

TABLE 1

Setting of coefficients P and X

| AE processing (standard mode) | | Manual setting | |
| --- | --- | --- | --- |
| P = 1 | 7 | P = 13/16, | X = 255 |
| (X is decided | 6 | P = 7/8, | X = 255 |
| according to | 5 | P = 15.16, | X = 255 |
| histogram) | 4 | P = 1, | X = 255 |
| | 3 | P = 17/16, | X = 255 |
| | 2 | P = 9/8, | X = 255 |
| | 1 | P = 19/16, | X = 255 |

Conversion data are downloaded in the reciprocal conversion table 406 for each of red, green and blue by using the coefficients $Q_R$, $Q_G$ and $Q_B$ determined above (step S620). In the above-mentioned AE processing, the background of a document can be processes suitably so that color a copy is noa copy is not different from that of the document even for a document of photograph or a color image.

In the above-mentioned automatic exposure processing, shading correction is adjusted suitably by changing coefficients X and P. However, the adjustment is not limited to this method. For example, background clearance level $UDC_{7-0}$ and slope correction value $GDC_{7-0}$ used in the gamma correction section 1700 shown in FIG. 69 may be changed. In this case, the background clearance level $UDC_{7-0}$ and the slope correction value $GDC_{7-0}$ are determined according to a following LOG correction formula:

$$UDC_{7-0} = -(255/DMAX) \cdot \log(X/255), \quad (10)$$

and $$GDC_{7-0} = (255/(255-UDC_{7-0})) \cdot 128.$$

A desired value 255·Q of shading correction is set with X=255.

In another way, a ratio of achromatic color in a document obtained in the analyses of the histogram data means if the document is a color document or a monochromatic color, and it can be used to discriminate a document for the automatic color selection as a full color copying machine. If the document is a monochromatic document, printing may be performed only with black toners. Then, an amount of toners is reduced, and printing can be performed at a fast speed.

Further, even if the background of a document has a color, the background may be clear if desired. This is possible by setting the level of $SREF_{7-0}$ somewhat larger so as to enlarge a range of achromatic color, and the histograms of the R, G and B data are obtained in the enlarged range. In this case, it is not needed to obtain the ratio of achromatic color, and the background level X is obtained by analyzing the histograms.

Instead of detecting the largest maximum from the histograms, an average gradation level, the maximum and the minimum of the data are obtained, and the coefficient X may be determined according to an average lightness and the gradation dynamic range determined therefrom.

(G) Magnification Change and Image Move Processor

Figure 18:
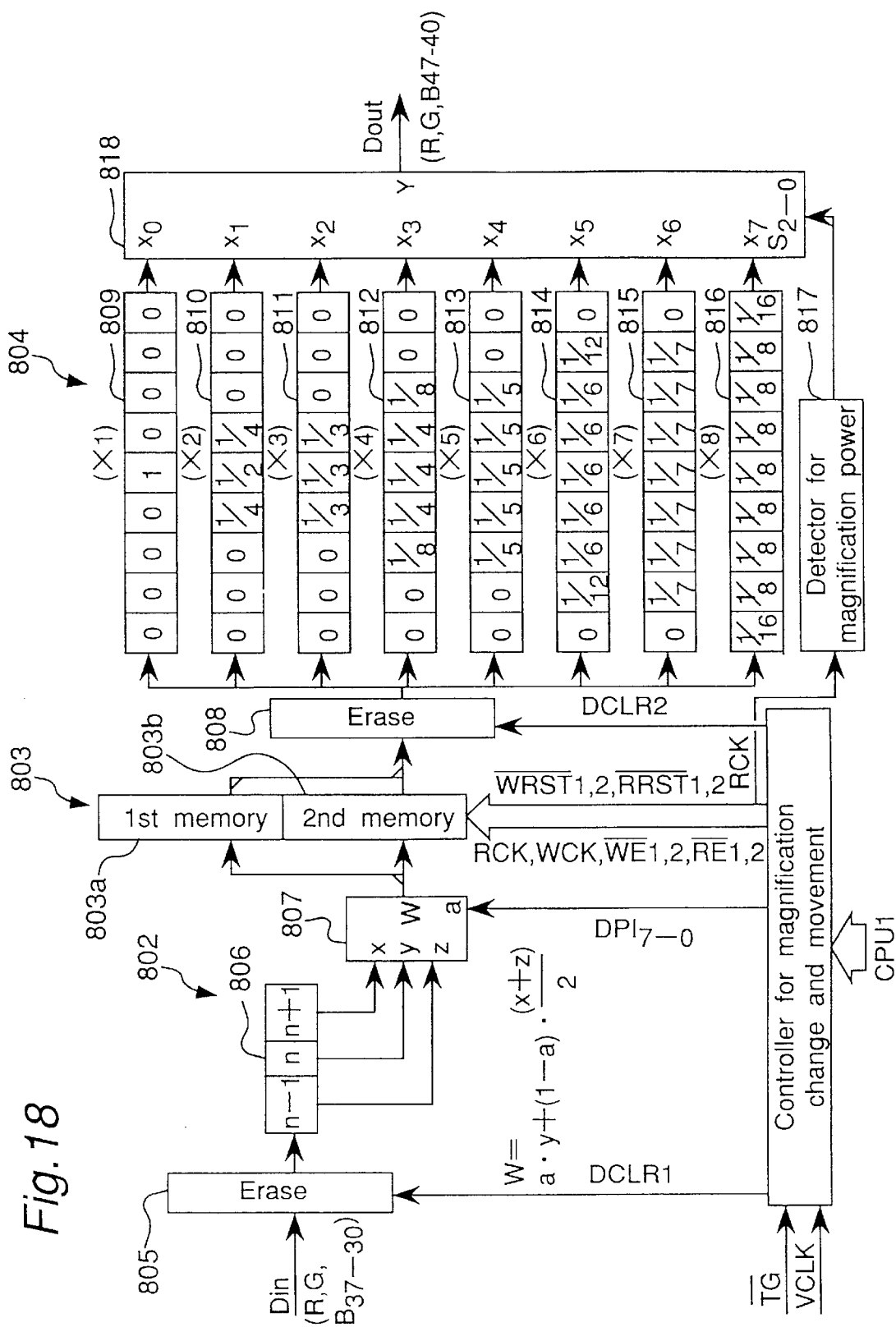
FIG. 18 is a block diagram of a magnification change and move processor.

FIG. 18 shows the magnification change and image move processor 800 which performs various processings on data $R_{37-30}$, $G_{37-30}$ and $B_{37-30}$ including erasion of data on an unnecessary region, reduction with interpolation, output of image data, image repeat and enlargement of image with interpolation. The above-mentioned unnecessary regions include a region wherein no document exists on a platen and a region resulting from reduction of document image, and they are erased according to the detection of document size in the AE processor 600. As to the reduction with interpolation, for example, when a image read at 400 dpi (dots per inch) by the image sensor 14 if a document is desired to be reduced to 50%, an image reader of 200 dpi has to read an image instead that of 400 dpi, and the read data has to be printed at a density of 400 dpi. However, practically, image data is read with the image reader of 400 dpi, and the read data are thinned out by a half and the remaining data are printed at the density of 400 dpi. In this case, data of a narrow line, a point or the like may vanish, and this deteriorate image quality. Then, reduction with interpolation is performed for a size in correspondence to a reduction ratio in order to prevent deterioration of image quality of a reproduced image. On the other hand, when an image data is enlarged, image quality is deteriorated if the image data is simply inflated. Then, the image data is smoothed in correspondence to a magnification.

(G-1) Erasion of Data in an Unnecessary Region

Figure 19A:
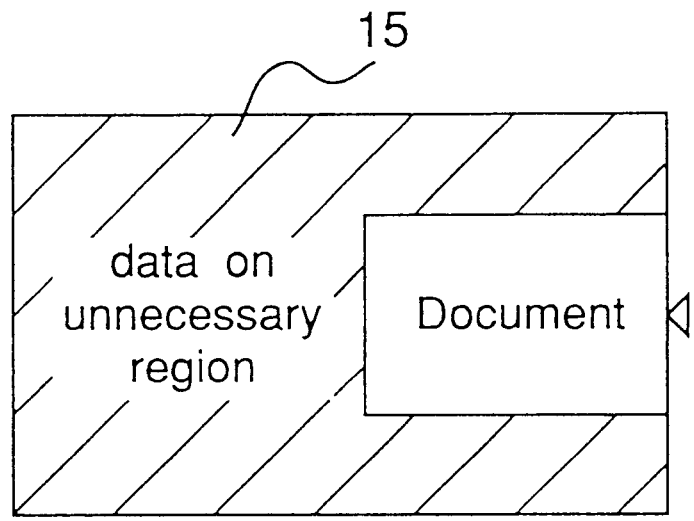
FIG. 19A is a plan view of a document put on a platen.

First, the erasion of data in an unnecessary region is explained. In the magnification change and move processor 800 shown in FIG. 18, a first erase section 805 for outside regions clears image data in an unnecessary region from the input image data Din ($R_{37-30}$, $G_{37-30}$ and $B_{37-30}$). The unnecessary region mentioned here means a region on a platen except a document, as shown as a hatched area in FIG. 19A. The read data in the unnecessary region are black data, and they deteriorate copy quality. The read data in the unnecessary region is erased or cleared according to a DCLR1 signal received from a controller 801. The DCLR1 signal depends on TG signal as a horizontal synchronization signal and VCLK signal as a synchronization signal for image data. The controller 801 detects an end of image data from the VCLK signal. Then, it makes the first erase section 805 clear the data read based on $\overline{TG}$ signal until a next VCLK signal because they are decided to be data in the unnecessary region.

(G-2) Interpolation for Reduction

Next, a interpolation section 802 for reduction performs interpolation on a pixel data received sequentially by using pixel data before and after the pixel data. The interpolation for reduction means interpolation to reduce defects on reduction according to a reason explained below, and it is performed by the interpolation section 802. A document image is generally reduced by thinning out the image data. In an apparatus where image data is read at say 400 dpi for a life-size copy (FIG. 20A), when the document image is reduced to a half size, it is desirable that the document image is read at 200 dpi (FIG. 20B) and that the image data is printed at 400 dpi. The image data are thinned out every other data. However, practically, as shown in FIG. 20C, a part of the image data read at 400 dpi is taken out for printing to change a resolution. However, this simple thinning-out deteriorates the resolution of the image. If the document image comprises a dot image, a Moire pattern may happen if the reduction ratio becomes large. Further, for a monochromatic bi-level image, a probability of monochromatic pixels is rarely as large as 50%, and white pixels dominate usually. In such a case, the simple thinning-out may causes defects in a reproduced image. In order to reduce the bad image quality due to the defects of data, the interpolation section 802 performs interpolation on the pixel under interest (or interest pixel) with adjacent pixels before reduction. The interpolation section 806 comprises a memory 806 for storing three successive pixel data and an operator 807 which performs a prescribed interpolation or correction of the n-th pixel data according to Eq. (11), and it is performed on three successive pixel data X(n−1), X(n) and X(n+1) of (n−1)-th, n-th and (n+1)-th pixels:

W(n)=a·X(n)+(1−a)·(X(n−i)+X(n+1))/2, (11) where W(n) denotes an image data of the n-th pixel obtained by the interpolation, a coefficient "a" denotes a magnification along the main scan direction, and X(n−1), X(n) and X(n+1) denote data of the (n−1)-th, n-th and (n+1)-th pixels. In this embodiment, a ≧⅓, and if a <⅓, a is rounded as ⅓ or 0.33. In order to meet a situation where a <⅓, a capacity of the memory 806 is enlarged to store five pixel data, that is, data of (n−2)-th, (n−1)-th, n-th, (n+1)-th and (n+2)-th pixels. The interpolation is performed on the five pixel data according to following Eq. (11):

$$W = n, \text{ (if } a \geq 1.00) \tag{11'}$$

$$W = a \cdot X(n) + (1-a) \cdot (X(n-1) + X(n+1))/2,$$

$$\text{(if } 1.00 > a \geq 0.33)$$

$$W = a(X(n-1) + X(n) + X(n-1)) +$$

$$((1-3a)/4) \cdot (X(n-2) + X(n+2)), \quad \text{(if } 0.33 > a \geq 0.20)$$

and $$W = (X(n-2) + X(n-1) + X(n) + X(n+1) + X(n+2))/5,$$

$$\text{(if } 0.20 > a)$$

where X(n−2) and X(n+2) denote data of the (n−2)-th and (n+2)-th pixels. As explained above, if the memory 806 is provided for the matrix size of five pixels, the interpolation is possible for the coefficient "a" of 0.2 or more.

(G-3) Magnification Change and Image Move

The pixel data after the above-mentioned interpolation are stored in a memory 803a or 803b according to control signals received from the controller 801. The control signals include write clock signal WCK and read clock signal RCK both depending on magnification, write enable signals $\overline{WE1}$ and $\overline{WE2}$, read enable signals $\overline{RE1}$ and $\overline{RE2}$, write address reset signals $\overline{WRSR1}$ and $\overline{WRST2}$ and read reset signals $\overline{RRST1}$ and $\overline{RRST2}$ for the two memories represented as "1" and "2". The controller 801 sends an enable signal $\overline{WE1}$ or $\overline{WE2}$ to one of the memories 803a and 803b for writing data thereto, while it sends a read enable signal $\overline{RE1}$ or $\overline{RE2}$ to the other of the memories for reading data therefrom. The magnification can be changed by controlling the period of the WCK/RCK signals and the duty ratio of pulses. Further, by changing the phase of the write enable signals $\overline{WE1}$ and $\overline{WE2}$, read enable signals $\overline{RE1}$ and $\overline{RE2}$, the image can be moved. The write address reset signals $\overline{WRSR1}$ and $\overline{WRST2}$ and read reset signals $\overline{RRST1}$ and $\overline{RRST2}$ are output at the start of write and read of data, for controlling the positions of eight images in the image monitor mode.

Figure 22:
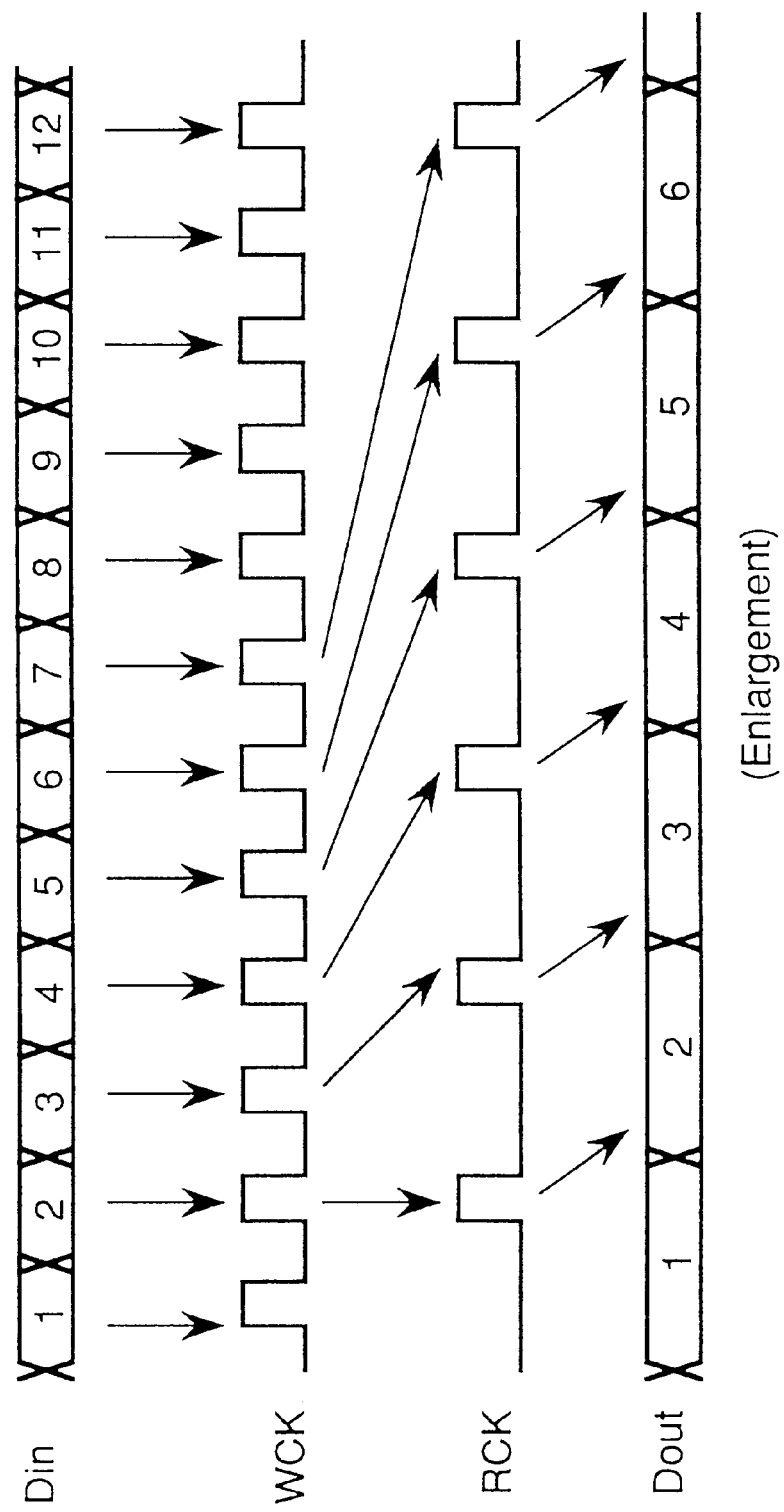
FIG. 22 is a timing chart when image data is processed for a magnification L larger than one.
Figure 23:
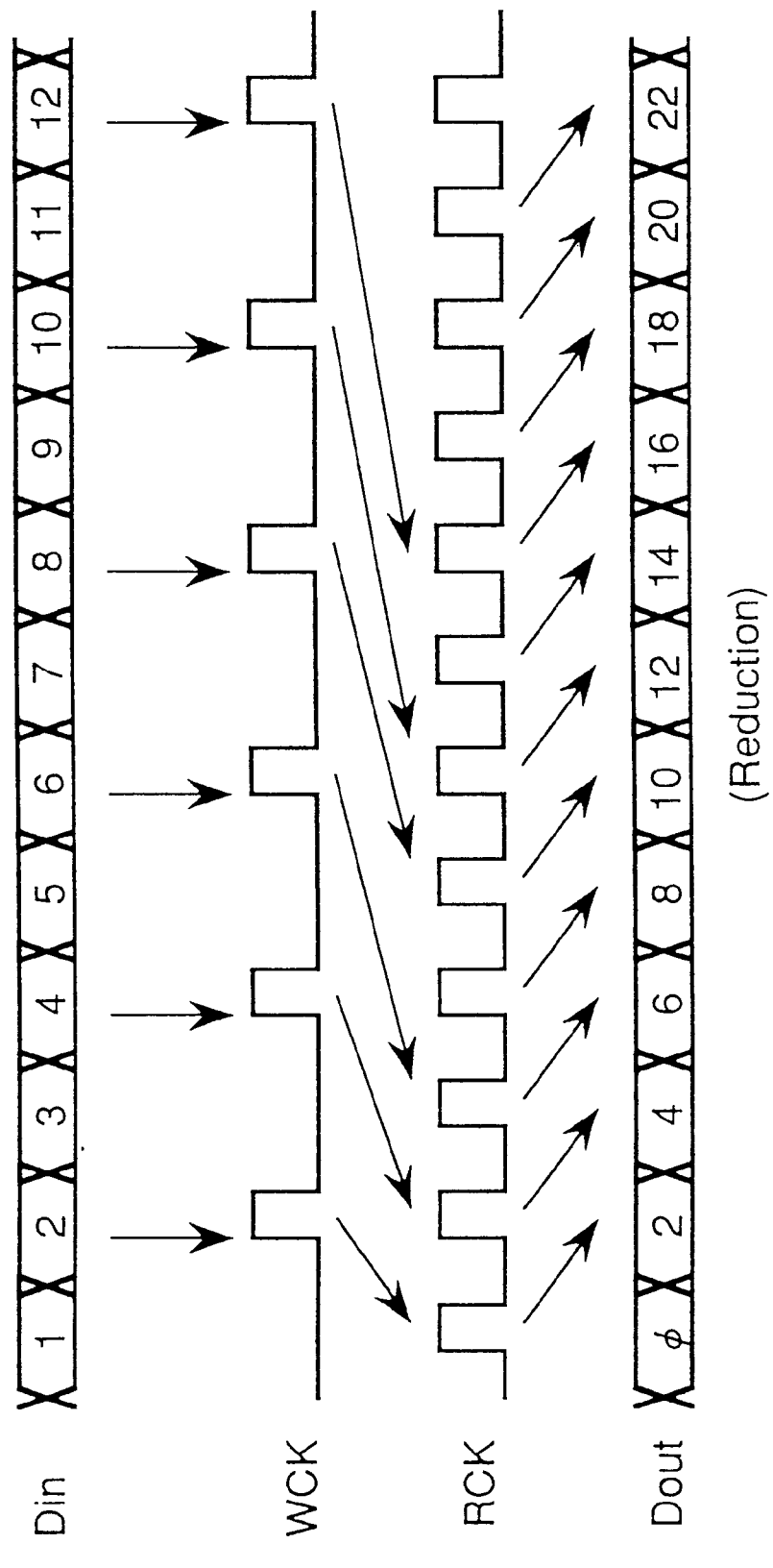
FIG. 23 is a timing chart when image data is processed for a magnification L smaller than one.

The magnification change and the image move by using the memories 803a and 803b are explained further in detail. FIGS. 21–23 show timing charts of input data $D_{in}$, clock signals WCK and RCK and output data $D_{out}$. In a case shown in FIG. 21 for a life-size reproduction, the clock signals WCK and RCK are set to have the same period "tc" and duty ratio. As to the first memory 803a, while $\overline{WE1}$ signal is low, an image data $D_{in}$ is written in synchronization with the leading edges of write clock signals WCK. When $\overline{RE1}$ signal is changed to low, the image data stored in the memory 803a is read sequentially at the leading edges of read clock signals RCK. The write and read operations are performed similarly as to the second memory 803b. As explained before, when one of the memories 803a and 803b is allowed to write data thereto, the other of the memories is allowed only to reading data therefrom.

In a case shown in FIG. 22 for a reproduction with a magnification L larger than 1 (the magnification L is 2 in the case shown in FIG. 22), the write clock signals WCK have a period "tc" and a duty ratio "d". On the other hand, the read clock signals RCK have a period tc·X and a duty ratio d/X. As to the first memory 803a, while $\overline{WE1}$ signal is low, an image data $D_{in}$ is written in synchronization with the leading edges of write clock signals WCK. When $\overline{RE1}$ signal is changed to low, the image data stored in the memory 803a is read sequentially at the leading edges of read clock signals RCK. The write and read operations are performed similarly as to the second memory 803b. As explained before, when one of the memories 803a and 803b is allowed to write data thereto, the other of the memories is allowed only to reading data therefrom. The processes of write to and read from the memories 803a and 803b are similar to the case shown in FIG. 21. However, the period of the read clock signals RCK is multiplied with X, and this means that the output data Dout are extended in time by L times along the main scan direction. The value of L may have a fraction because the read timing is simply expanded in proportion to X.

In a case shown in FIG. 23 for a reproduction with a magnification L smaller than 1 (the magnification L is ½ in the case shown in FIG. 23), the write clock signals WCK have a period tc·L and a duty ratio d/L while the read clock signals RCK have a period tc and a duty ratio d. The processes of write to and read from the memories 803a and 803b are similar to the case shown in FIG. 21. However, the period of the write clock signals WCK is multiplied with L, and this means that the input data $D_{in}$ are thinned out in time by L times along the main scan direction. That is, the input data is read every other image data, as shown in the timing chart. Then, by reading the data with RCK signals having the same period tc and duty ratio as the life-size reproduction, data $D_{out}$ reduced by half along the main scan direction is output.

Figure 24A:
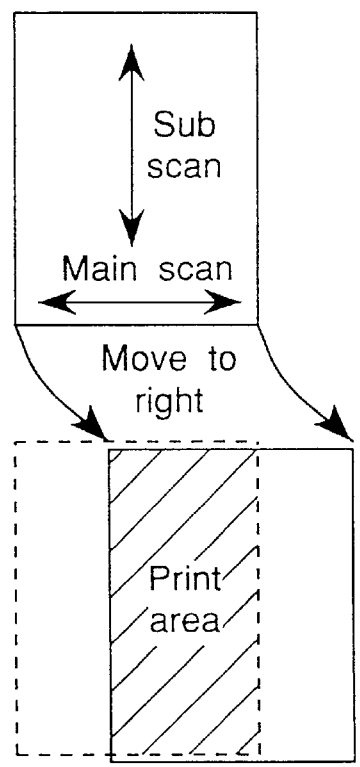
FIGS. 24A and 24B are diagrams illustrating leftward and rightward movement of image.
Figure 24B:
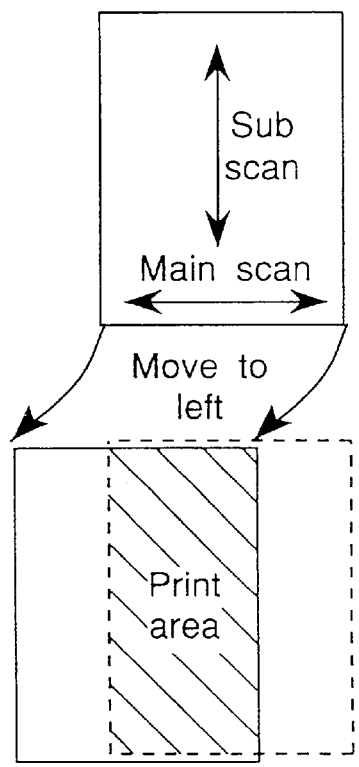

Next, image move is explained. The controller 801 moves output image by controlling the phase of the signals $\overline{WE1}$, $\overline{WE2}$, $\overline{RE1}$ and $\overline{RE2}$. The image move means that a document image is moved left or right in a sheet of paper, as shown in FIG. 24A and 24B. FIG. 25A shows waveforms of signals $\overline{WRST1}$, $\overline{WRST2}$, $\overline{RRST1}$ and $\overline{RRST2}$ sent to the memories 803a and 803b. FIGS. 25B and 25C show various signals Din, $\overline{WE1}$, $\overline{WE2}$, $\overline{RE2}$ and $D_{out}$ output in synchronization with the waveforms shown in FIG. 25A.

In order to move the data rightward, a timing to switch $\overline{RE1}$ and $\overline{RE2}$ to L level is delayed, as shown in FIG. 25B. Then, a timing to read a data from the memories is delayed. Thus, a document image formed on a sheet of paper is moved right as a whole.

Similarly, in order to move the data leftward, a timing to switch $\overline{WE1}$ and $\overline{WE2}$ to L level is delayed, as shown in FIG. 25C. Then, a line data is written to the memories from the top address, and the data written is read with a normal timing. Thus, a document image formed on a sheet of paper is moved left as a whole.

The image move of the document image upward and downward can be performed by adjusting the start timing of the reading of the image sensor 14, and the start timing of development. However, detailed explanation of this principle is omitted here.

Figure 26:
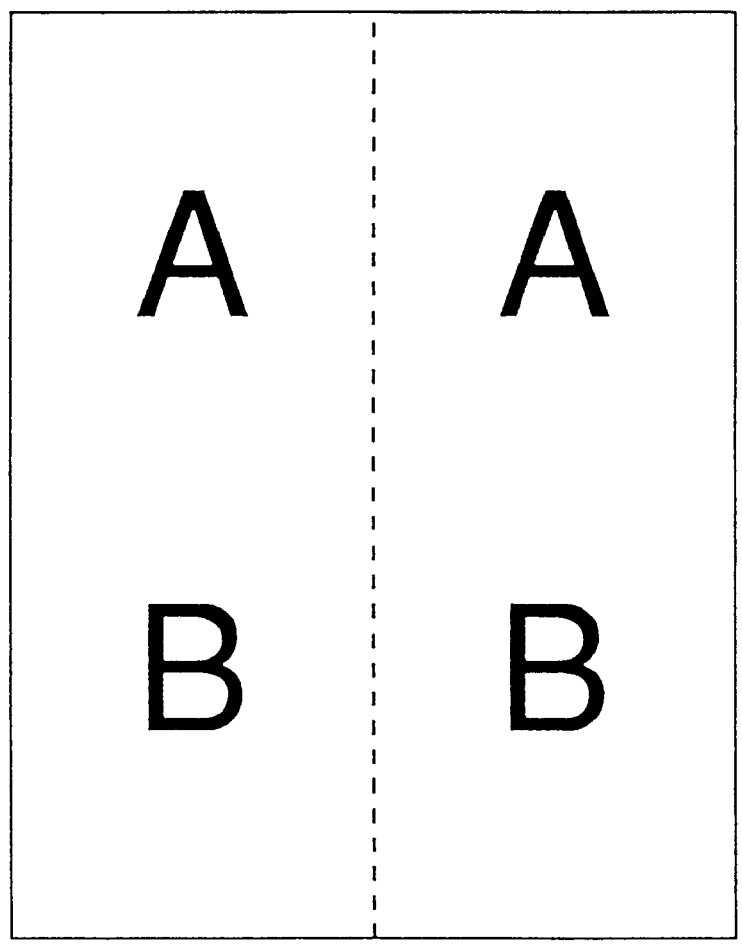
FIG. 26 is a diagram for illustrating image repeat.
Figure 27:
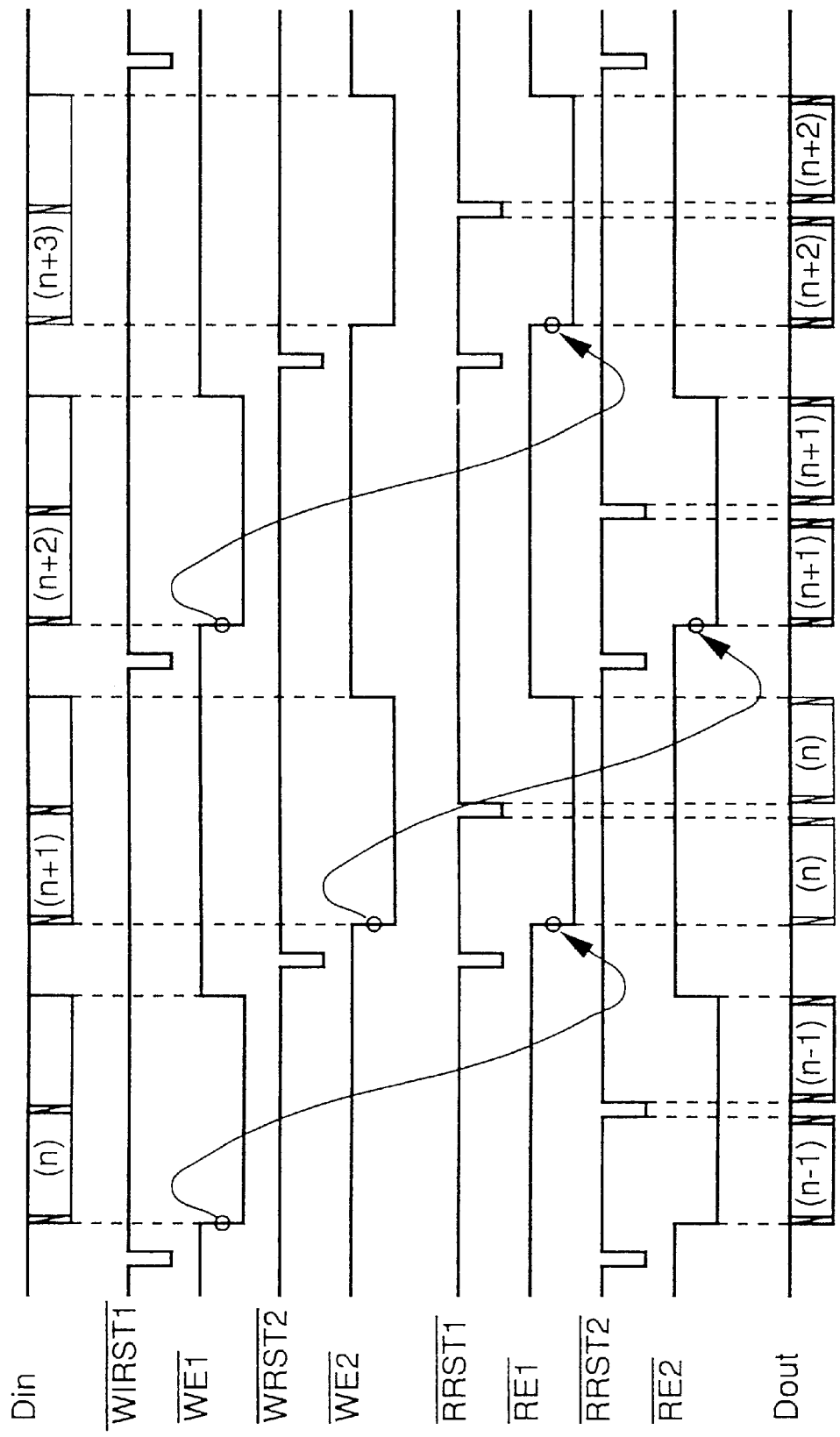
FIG. 27 is a timing chart for image repeat.

Next, image repeat is explained. The controller 801 performs image repeat by controlling signal $\overline{WRST1}$, $\overline{WRST2}$, $\overline{RRST1}$ and $\overline{RRST2}$. As shown in FIG. 26, in the image repeat, a document image is output repeatedly on a sheet of paper. For example, when the same image data is output twice at equal distances in a one line along the main scan direction, signals $\overline{RRST1}$ and $\overline{RRST2}$ are output at the start and at the midpoint of the line, as shown in FIG. 27. The memories 803a and 803b supply the stored data from the first address according to the signals $\overline{RRST1}$ and $\overline{RRST2}$. Thus, the same data are output repeatedly on a line. This is repeated for each line. In this embodiment, when a user presses the key 88, a part of the document image is output eight times repeatedly.

Figure 19B:
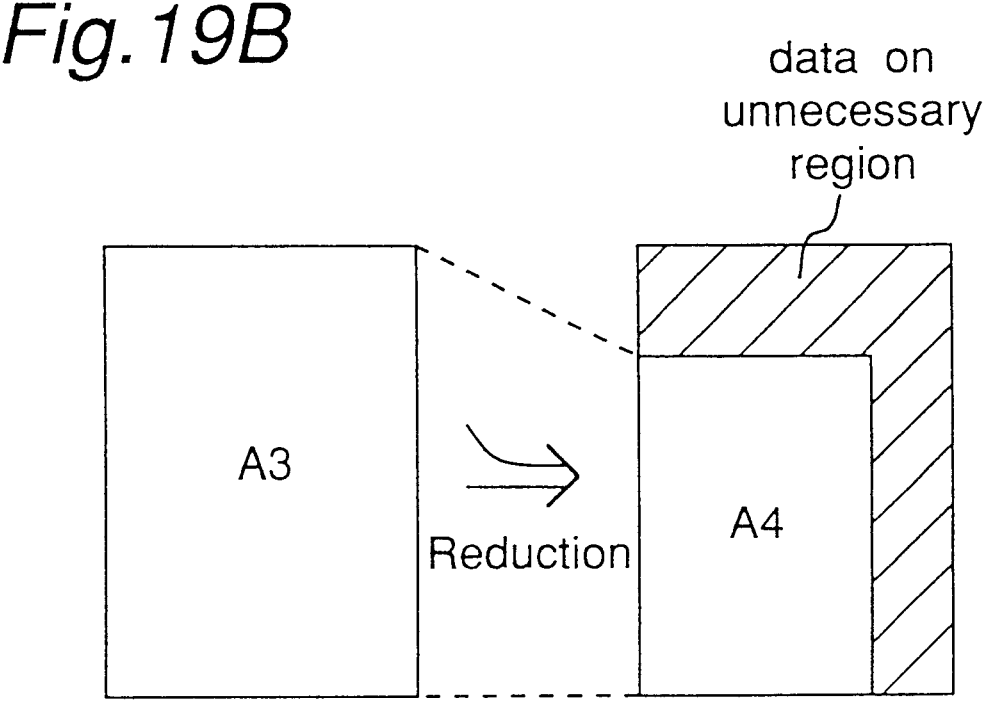
FIG. 19B is a diagram of reduction of image.

A second erase section 808 for outside regions clears image data or changed to white data in an unnecessary region from the output image data Dout. The unnecessary region mentioned here means a region resulting from reduction of document image. For example, as shown in FIG. 19B, a document of A3 size is reduced to A4 size, an unnecessary region expressed with a hatching results, and it is represented as white. Thus, the unnecessary region is prevented to be painted with black.

(G-4) Interpolation for Enlargement

A interpolation section 804 for enlargement performs interpolation of data from the second erase section 808 according to the magnification in order to prevent image deterioration when the image is enlarged simply by the controller 1. The data from the second erase section 808 is supplied to eight smoothing filters 809–816 having appropriate weights on a pixel under interst and adjacent pixels as shown in FIG. 18 according to the magnification. The filters 809–816 corresponds to magnifications of 1, 2, . . . , 8 successively. For example, the filter 809 for the magnification of 1 only processes the pixel under interest and the weight is set as 1. That is, the smoothing filter 809 outputs the as received data. A magnification detector 817 detects an integral part of the magnification L along the main scan direction based on the period of read clock signals RCK and the duty ratio for the memories 803a and 803b, and the obtained value $S_{2-0}$ of the magnification is sent to a selector 818. Then, the selector 818 outputs a data $D_{out}$ ($R_{47-40}$, $G_{47-40}$ and $B_{47-40}$) from the smoothing filter in correspondence to the magnification.

(H) Image Interface

The image interface 1000 selects either the data $R_{47-40}$, $G_{47-40}$ and $B_{47-40}$ received from selector 818 in the magnification change and image move processor 800, or R, G and B data, R-VIDEO$_{7-0}$, G-VIDOE$_{7-0}$ and B-VIDEO$_{7-0}$, received from an external apparatus 900, and synthesize it. Further, it generates timing signals for sending image data to an RGB interface or a printer interface.

(I) HVC Converter

Figure 28:
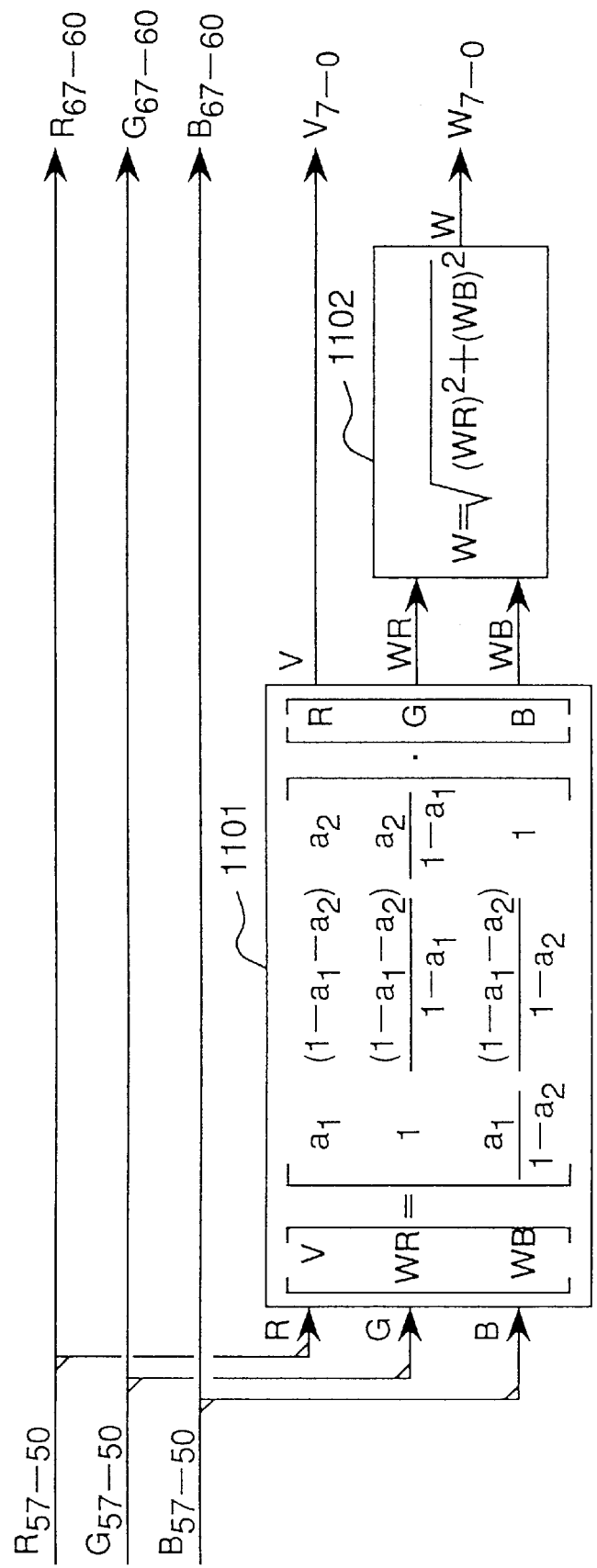
FIG. 28 is a block diagram of an HVC converter.

FIG. 28 shows the HVC converter 1100. As explained briefly before, the HVC converter 1100 generates lightness signal $V_{7-0}$, color difference signals $WR_{8-0}$ and $WB_{7-0}$ based on the R, G, B data, $R_{57-50}$, $G_{57-50}$ and $B_{57-5O}$ obtained by reading a color patch with the image sensor 14 and the R, G, B data stored in a ROM. A color patch is a color pattern with a uniform density. Further, it generates chroma signal $W_{7-0}$ and hue signal $H_{7-0}$. Thus, scatterings of read characteristics of the image sensor can be corrected.

(I-1) HVC Conversion

First, HVC conversion is explained. An operator 1101 receives input data R, G and B and operates the conversion shown in Eq. (12) to output lightness signal $V_{7-0}$ and color difference signals $WR_{7-0}$ and $WB_{7-0}$.

$$V = a_1 \cdot R + a_2 \cdot G + a_3 \cdot B, \tag{12}$$

where $a_1 + a_2 + a_3 = 1$, $$WR = (R-V)/(1-a_1),$$

and $$WB = (B-V)/(1-a_3).$$

Coefficients $a_1$ and $a_2$ are usually set to be about 0.3 and 0.1 for a usual RGB image data of television. This means that a mixing ratio of red:green:blue=3:6:1 though the coefficients are changed a little according to characteristics of the image sensor and the color characteristics of lenses in a reduction optical system. For example, as to the image sensor 14 of the embodiment, $a_1 = 0.35$ and $a_2 = 0.55$.

Figure 29:
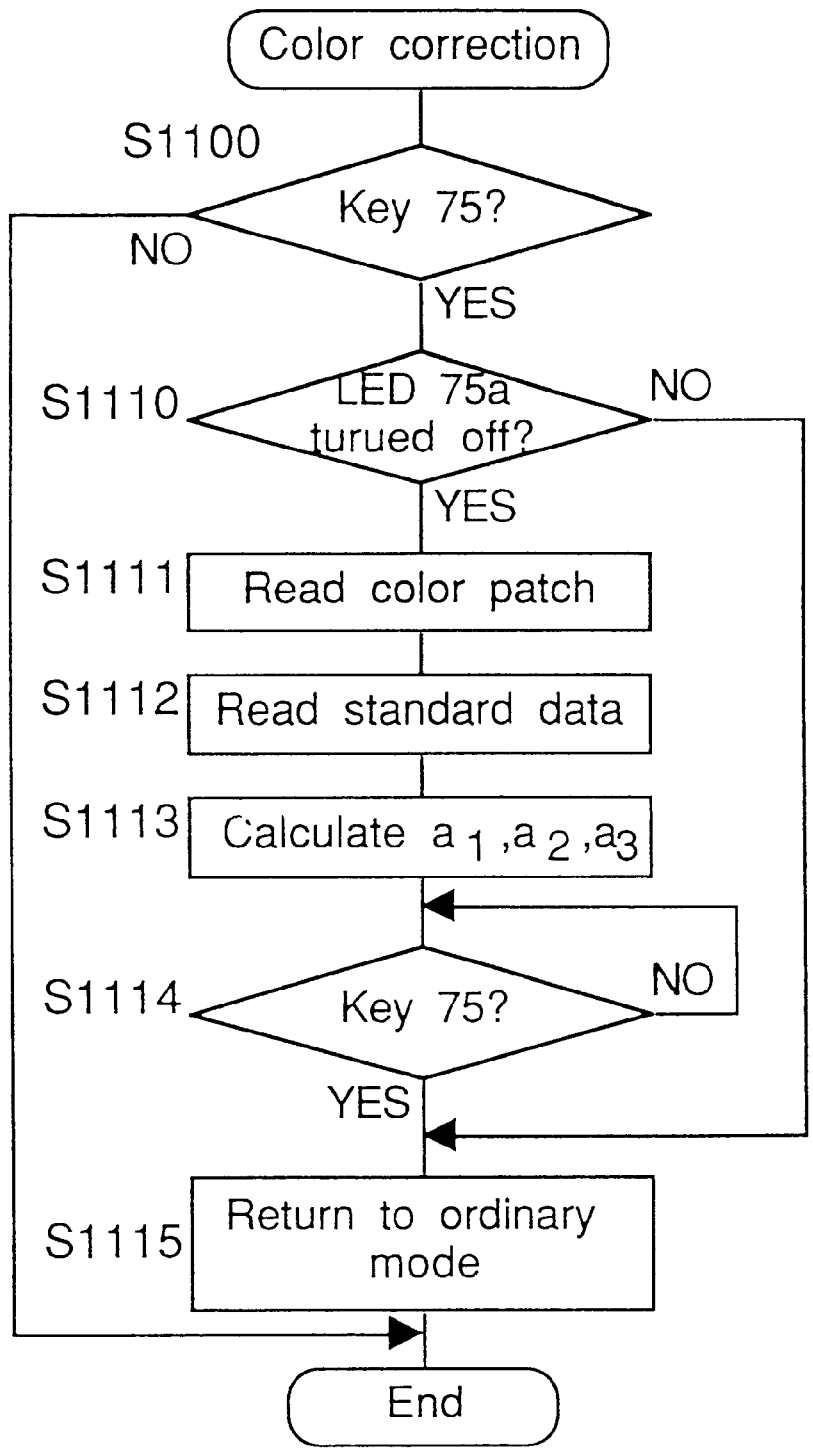
FIG. 29 is a flowchart for determining coefficients $a_1$, $a_2$ and $a_3$ used in HVC conversion.

The coefficients are determined according to a flow shown in FIG. 29. When a key 75 is pressed by a user to set a serviceman mode (YES at step S1100), a color patch is put on a platen 15. Then, when a print key 73 is pressed or when an LED 75a is turned off (YES at step S1110), the LED 75a is turned on and the color patch is red (step S1111) Then, a standard value stored beforehand is read to read a value of lightness V (step S1112). Then, coefficients $a_1$, $a_2$ and $a_3$ are determined according to the RGB data and the lightness V with the least square method (step S1113). When the key 75 is pressed again by a user to set a serviceman mode (YES at step S1114), the LED 75a is turned off and the flow returns to the normal mode (step S1115).

Figure 30:
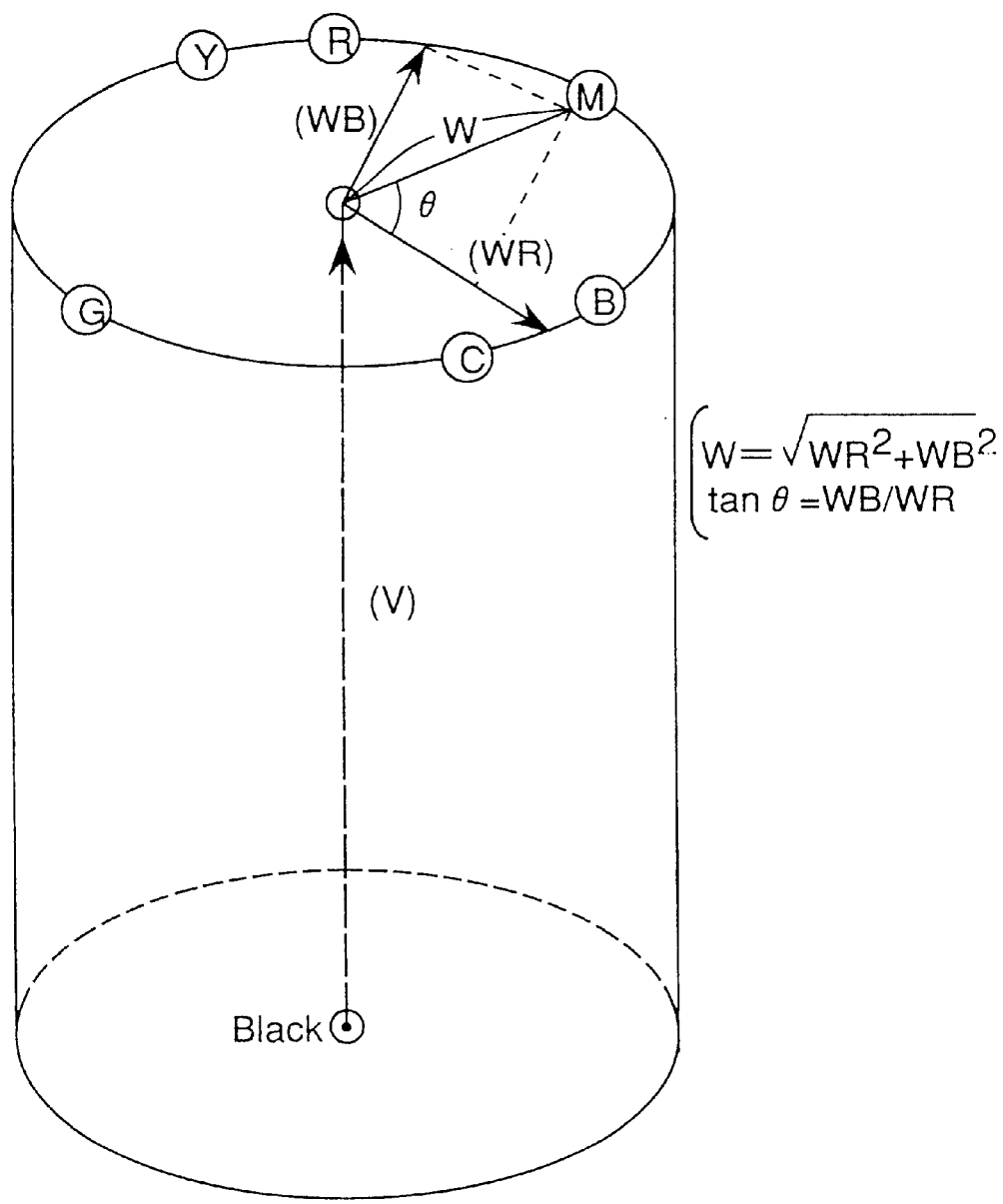
FIG. 30 is a diagram of color difference signals WR and WB in color space.

As shown in FIG. 30, the color difference signals $WR_{7-0}$ and $WB_{7-0}$ are represented as diagonal axes in a hue plane in color space. The chroma signal $W_{7-0}$ is calculated by an operator 1102 receiving the color difference signals WR and WE according to following Eq. (13):

$$W = (WR^2 + WB^2)^{1/2}. \tag{13}$$

Because the conversion coefficients $a_1$ and $a_2$ are determined by the read data of the patch, errors of the HVC conversion due to read characteristics of the image sensor 14 can be removed.

(I-2) Image Monitor

Further, the HVC converter 1100 includes an image quality controller 1103. The controller 1103 sets image-forming conditions (masking coefficients, sharpness, gamma curve and color balance) for eight images for the image quality monitor in correspondence to key input of the key 77.

Figure 31:
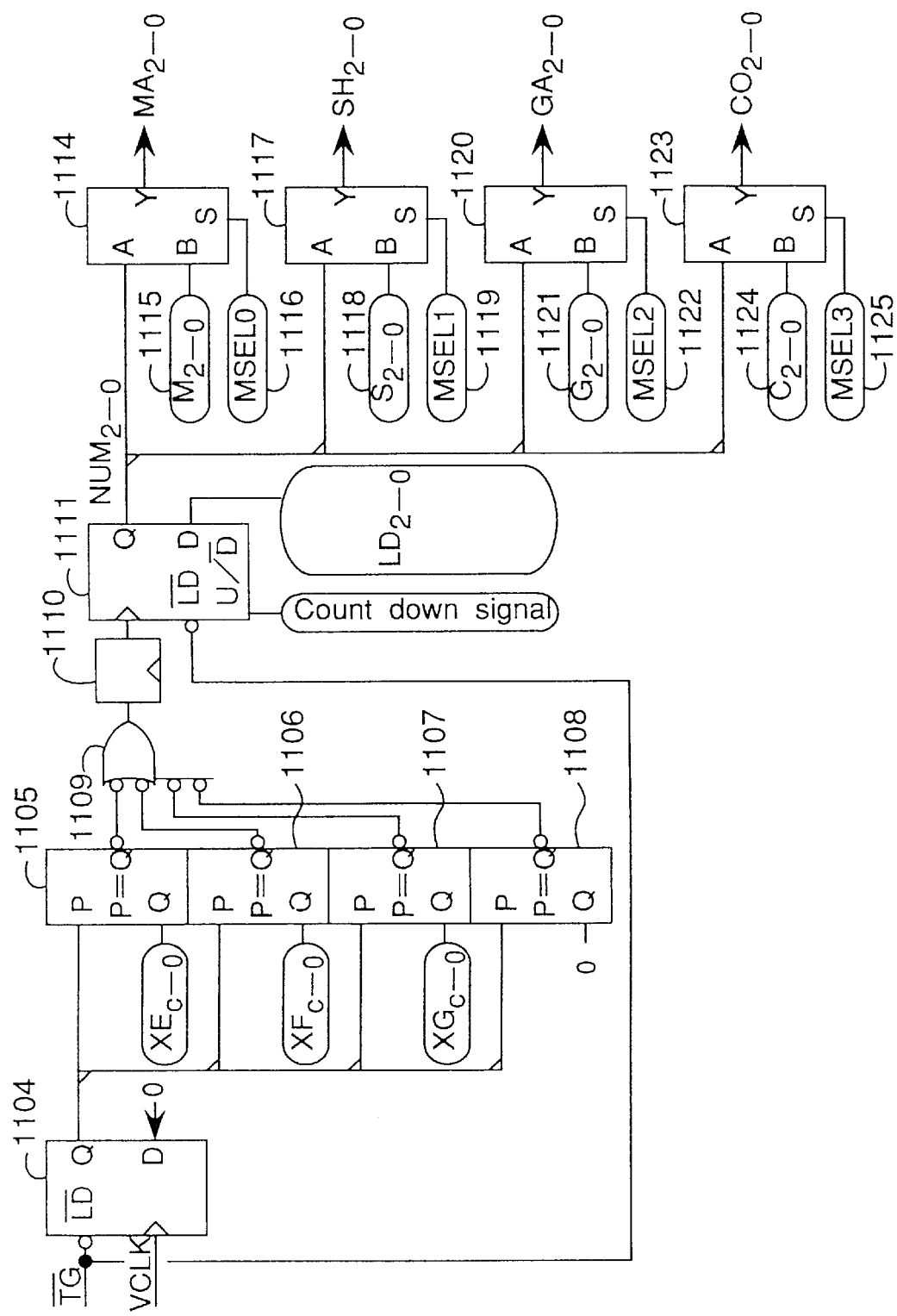
FIG. 31 is a bloc k diagram of an image quality controller 1103.
Figure 32:
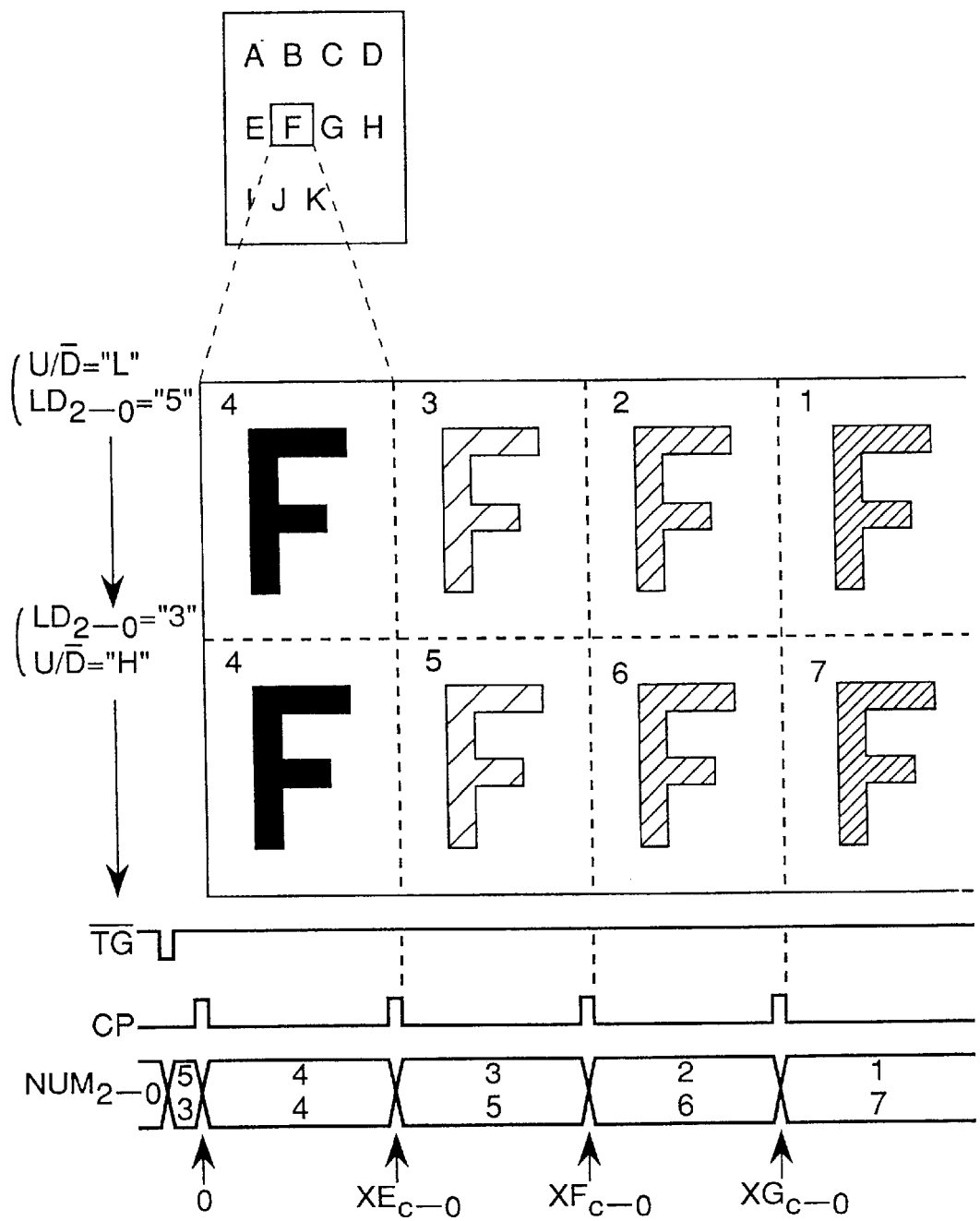
FIG. 32 is a diagram of a picture printed in image monitor mode and relevant control signals in the mode.
Figure 33:
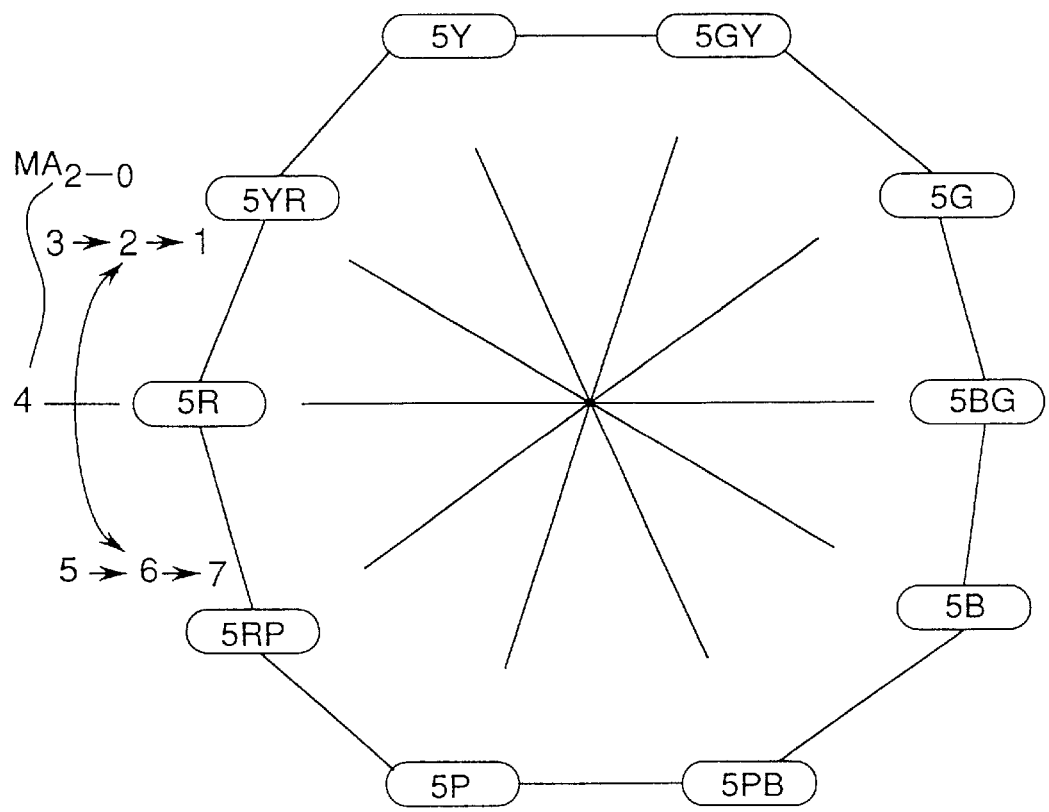
FIG. 33 is a diagram for illustrating a relation of color circulation to a value of $MA_{2-0}$ for changing masking coefficients.

FIG. 31 shows an image quality controller 1103 in the HVC converter 1100 for image monitor. In a full color copying machine, it is difficult to find what conditions a desired image is formed in. Then, the image monitor mode is provided in this embodiment. When a user presses the key 77 in the operational panel 25, as shown in FIG. 32, eight images of a part of a document image are formed on a sheet of paper under various image forming conditions of masking coefficients, sharpness, gamma curve and color balance. The magnification change and move processor 800 performs image repeat explained above eight times to form the eight images. Then, a user can select a desired image quality and enters a number in correspondence therewith on the operational panel 25. The image quality controller 1103 sends the selected image forming conditions to the printer section.

The image quality controller 1103 for the image monitor is explained in detail. A counter 1104 is reset by a line trigger signal $\overline{TG}$ along the main scan direction and starts counting in synchronization with VCLK signal. A count of the counter 1404 is sent to P inputs of the comparators 1105, 1106, 1107 and 1108, while $XE_{c-0}$, $XF_{c-0}$, $XG_{c-0}$ and 0 are sent to Q inputs thereof. The values of $XE_{c-0}$, $XF_{c-0}$, $XG_{c-0}$ represent count values along the main scan direction in correspondence to repeat points of image repeat performed by the magnification change and remove processor 800 (refer to a lower part in FIG. 32). Each comparator 1105–1108 outputs L level when the count received from the counter 1104 agrees with the value at Q input. A NOR gate 1109 receives the outputs of the comparators, and if a signal is received from one of the comparators, it sends a counter pulse (CP) signal through a delay circuit 1110 to a monitor area counter 1111. The monitor area counter 1111 counts the CP pulses and outputs $NUM_{2-0}$ signal to selectors 1114, 1117, 1120 and 1123. Signal $LC_{2-0}$ specified a discrimination number of an image to be repeated for the monitor area counter 1111, and a countdown signal $\overline{U/D}$ sets countdown or countup.

The discrimination number is changed along the main scan direction according to standard values ($XE_{c-0}$, $XF_{c-0}$ and $XG_{c-0}$, 0) supplied to the comparators 1105–1108 generating the CP pulses, while according to the countdown signal and $LD_{2-0}$ supplied to the monitor area counter 1111. For example, as shown in FIG. 32, if $LD_{2-0}$ is 5, the discrimination number has an initial number of 5. If countdown is set by the countdown signal, the monitor area counter 1111 outputs 4 for the first CP pulse as $NUM_{2-0}$. Thus, the counter 1111 supplies $NUM_{2-0}$ of 4, 3, 2, 1 successively whenever a CP signal is received. In synchronization with start of the output of the second image along the subscan direction, the countdown signal is changed to countup. Then, if $LD_{2-0}$ is set at 3, the monitor area counter 1111 supplies $NUM_{2-0}$ of 4, 5, 6, 7 successively whenever a CP signal is received. The counter 1111 supplied $NUM_{2-0}$ to the selectors 1114, 1117, 1120 and 1123 at A input. On the other hand, the selectors receive selection signals MSEL0, MSEL1, MSEL2 and MSEL3 at B input. Usually, the selection signals have H level, and the selectors selects the B inputs to supply fixed input values of $M_{2-0}$, $S_{2-0}$, $G_{2-0}$ and $C_{2-0}$ as $MA_{2-0}$, $SH_{2-0}$, $GA_{2-0}$ and $CO_{2-0}$.

When a user presses the key 74a for setting a masking coefficient in the operational panel, MSEL0 is changed to L level, so that $NUM_{2-0}$ sent to the A input of the selector 1114 is output as $MA_{2-0}$. In other words, four images having masking coefficients in correspondence to change signal $MA_{2-0}$ changing successively as 4, 3, 2 and 1 are repeated on a sheet of paper, and four images having masking coefficients in correspondence to change signal $MA_{2-0}$ changing successively as 4, 5, 6 and 7 are repeated on the sheet of paper. Then, if a discrimination number of 6 is input by a user, the fixed value $M_{2-0}$ is changed to 6. The selectors 1117, 1120 and 1123 except the selector 1114 supply the fixed values $S_{2-01}$ $G_{2-0}$ and $C_{2-0}$.

When a user presses the key 74b for setting a sharpness in the operational panel, MSEL1 is changed to L level, so that $NUM_{2-0}$ sent to the A input of the selector 1117 is output as $SH_{2-0}$. In other words, four images having sharpness in correspondence to change signal $SH_{2-0}$ changing successively as 4, 3, 2 and 1 are repeated on a sheet of paper, and four images having sharpness in correspondence to change signal $SH_{2-0}$ changing successively as 4, 5, 6 and 7 are repeated on the sheet of paper. Then, if a discrimination number of 2 is input by a user, the fixed value $S_{2-0}$ is changed to 2. The selectors 1114, 1120 and 1123 except the selector 1117 supply the fixed values $M_{2-0}$, $G_{2-0}$ and $C_{2-0}$.

Similarly, when a user presses the key 74c or 74d for setting a gamma curve or color balance in the operational panel, MSEL2 or MSEL3 is changed to L level, so that $NUM_{2-0}$ sent to the A input of the selector 1120 or 1123 is output as $GA_{2-0}$ or $CO_{2-0}$. In other words, four images having a gamma curve or color balance in correspondence to change signal $GA_{2-0}$ or $CO_{2-0}$ changing successively as 4, 3, 2 and 1 are repeated on a sheet of paper, and four images having a gamma curve or color balance in correspondence to change signal $GA_{2-0}$ or $CO_{2-0}$ changing successively as 4, 5, 6 and 7 are repeated on the sheet of paper. Then, if a discrimination number is input by a user, the fixed value $G_{2-0}$ or $C_{2-0}$ is changed to the input value.

Figure 36:
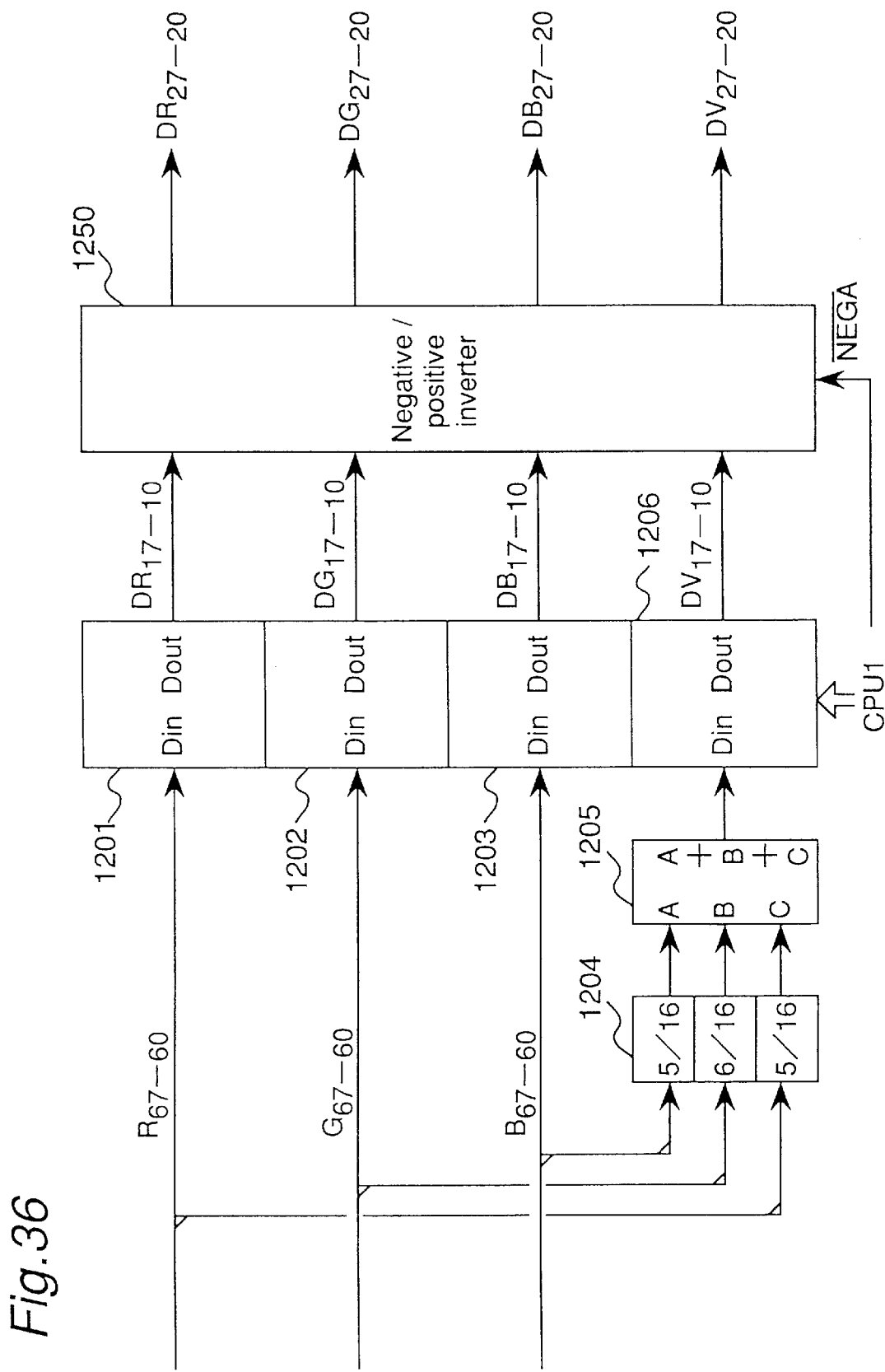
FIG. 36 is a block diagram of a density converter.

Next, the contents of the four kinds of image control change signals are explained. The change signal $MA_{2-0}$ changes masking coefficients to adjust colors in a copy. Masking coefficients are determined so that color difference does not exist between the document and a copy. As shown in FIG. 36, other six kinds of masking coefficients ($MA_{2-0}$=3, 2, 1, 5, 6, 7) are set with the above-mentioned masking coefficients ($MA_{2-0}$=4). Table 2 shows $MA_{2-0}$ and the masking coefficients.

TABLE 2

| Masking coefficients | |
|---|---|
| $MA_{2-0}$ | Masking coefficients |
| 0 (SEPIA = L) | sepia color |
| 1 | rotate along clockwise direction |
| 2 | |
| 3 | |
| 4 | color reproduction agrees with original document |

TABLE 2-continued

Masking coefficients

| $MA_{2-0}$ | Masking coefficients |
|---|---|
| 5 | rotate along counterclock- |
| 6 | wise direction |
| 7 | |

Usually, masking coefficients to produce a color of 5R is set so that the color of a copy is 5R for $MA_{2-0}=4$. As the change signal decreases to 3, 2 and 1, the masking coefficients are set to reproduce a color to a side of 5Y (clockwise) (so as to rotate the color circulation diagram). On the other hand, as the change signal increases to 5, 6 and 7, the masking coefficients are set to reproduce a color to a side of 5RP (counterclockwise). Further, when $MA_{2-0}=0$, masking coefficients for sepia are selected.

Change signal $SH_{2-0}$ adjusts sharpness of an image. The sharpness is controlled by changing edge emphasis coefficient and smoothing filter size explained later on the MTF corrector 1600. Table 3 shows a relation of $SH_{2-0}$ to edge emphasis coefficient $ED_{7-0}$ and smoothing filter size $SD_{7-0}$.

TABLE 3

Sharpness change signal

| $SH_{2-0}$ | edge emphasis coefficient ($ED_{7-0}$) | smoothing filter size |
|---|---|---|
| 1 | large | no smoothing |
| 2 | ↑ | |
| 3 | | |
| 4 | ↓ | |
| 5 | | smoothing filter 3 |
| 6 | small | smoothing filter 2 |
| 7 | | smoothing filter 1 |

As shown above, when $SH_{2-0}$ becomes 4 or less, an edge emphasis coefficient change block selects a larger edge emphasis coefficient $ED_{7-0}$. On the other hand, when $SH_{2-0}$ less than 4, the block selects data with no smoothing as $SD_{7-0}$, and $ED_{7-0}$ is decreased and smoothing filter size is increased. The first smoothing filter for $SH_{2-0}=7$ has the largest size. Thus, as $SH_{2-0}$ decreases, the image becomes sharper, while as $SH_{2-0}$ increases, the image becomes smoother.

Gamma curve change signal $GA_{2-0}$ selects a gamma curve. As will be explained on the gamma corrector 1700 later, brightness and the contrast are controlled by gradation tables shown in FIGS. 69 and 70. When $GA_{2-0}$ is 4, the brightness and the contrast are adjusted to be the same between the original document and a copy thereof. In the adjustment of brightness, a shadow type curve is selected as GA increases, while a highlight type curve is selected as GA decreases. In the adjustment of contrast, as GA increases, a highlight and shadow type is selected, while as GA decreases, a halftone emphasis type is selected.

Change signal $CO_{2-0}$ selects three kinds of color balance, chroma of image and copy density. The control of color balance includes C-R control, M-G control and Y-B control. In an example of C-R control, as $CO_{2-0}$ increases than 4, the slope correction level $GDC_{7-0}$ is changed to be larger than 128 (slope=1) for development with cyan toners and to be smaller than 128 for development with magenta and yellow toners to emphasize cyan density. On the other hand, as $CO_{2-0}$ decreases than 4, the cyan density is increased than magenta and yellow densities, to emphasize red density.

Similarly, in the M-G and Y-B controls, $GDC_{7-0}$ is adjusted as shown in Table 4. In the C-R control, if an amount of cyan toners is increased by Δ, amounts of magenta and yellow toners are decreased by Δ/2, so that a total amount of toners per unit area is not changed.

Figure 34:
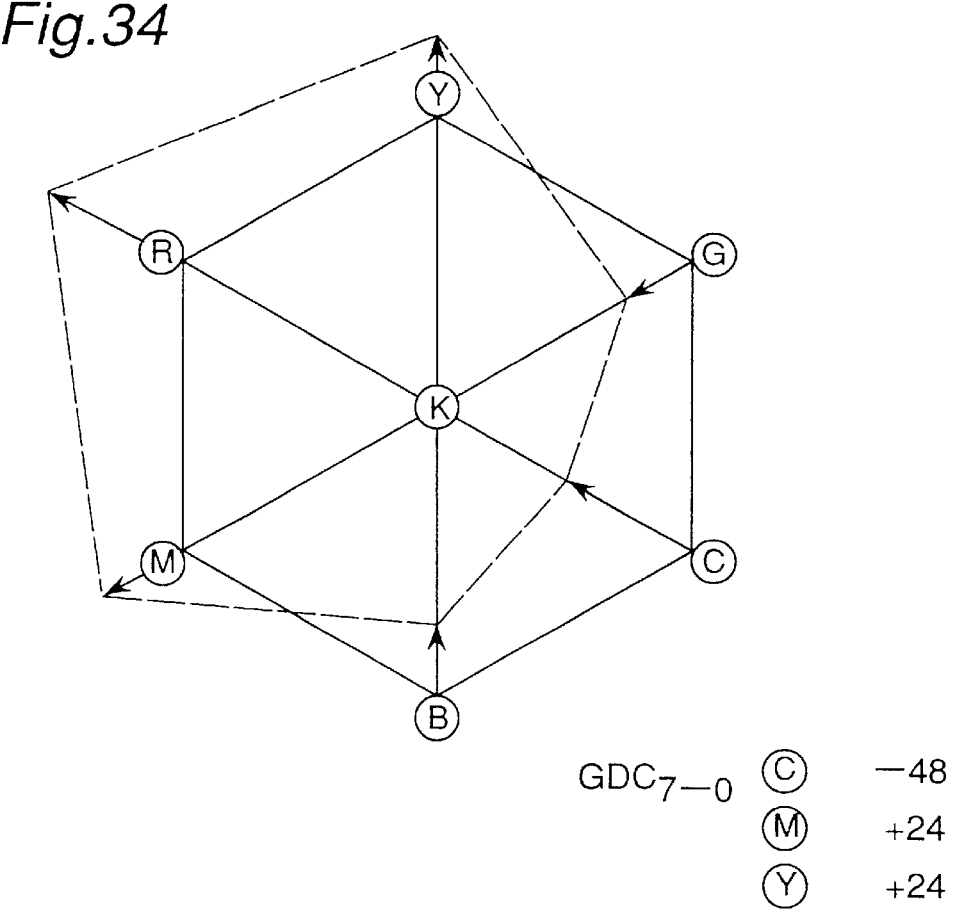
FIG. 34 is a diagram for illustrating a relation of color circulation to a value of $CO_{2-0}$ for changing color balance.

As shown in Table 4, when $CO_{2-0}$ is 4, $GDC_{7-0}=128$ for any development process including black development. This adjustment controls color circulation, as shown in FIG. 34.

Figure 35:
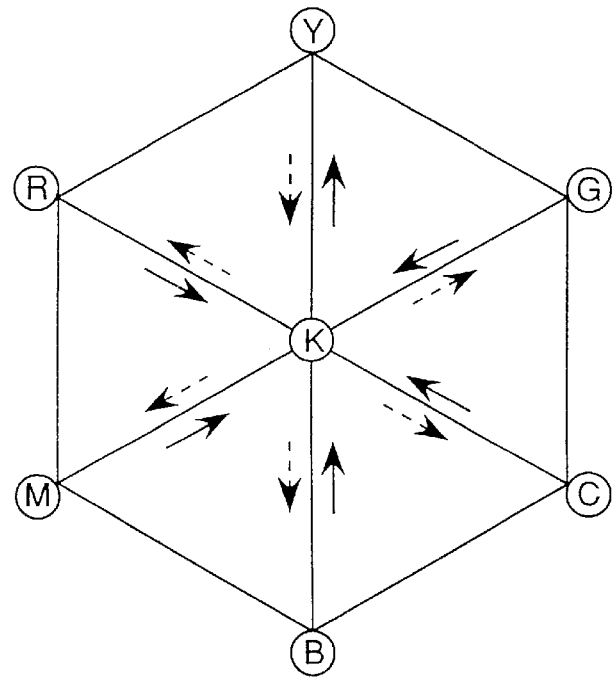
FIG. 35 is a diagram for illustrating a color circulation for chroma adjustment.

As to chroma adjustment, when $CO_{2-0}$ increases above 4, $GDC_{7-0}$ is decreased more than 128 for development of cyan, magenta and yellow toners and increased less than 128 for development of black. Thus, the density components chromatic components (C, M, Y) is weakened, while that of achromatic component (Bk) is enhanced. When $CO_{2-0}$ increases above 4, reverse processing is performed. This adjustment controls color circulation as shown in FIG. 35. It is important in color balance control that the total density per unit area is not changed. If it changes, the total density of the document changes, and the fixing temperature and the like also change. The background level $UDC_{7-0}$ is kept the same. The copy density control is performed irrespective of development processes of cyan, magenta, yellow and black. When $CO_{2-0}$ is larger than 4, the copy density becomes thicker, and when $CO_{2-0}$ is smaller than 4, the copy density becomes thinner.

TABLE 4

Image control

| | C-R control | | | | | M-G control | | | | |
|---|---|---|---|---|---|---|---|---|---|---|
| CO | C | M | Y | BK | | C | M | Y | BK | |
| 7 | +48 | −24 | −24 | ±0 | cyan | −24 | +48 | −24 | ±0 | magenta |
| 6 | +32 | −16 | −16 | ±0 | | −16 | +32 | −16 | ±0 | |
| 5 | +16 | −8 | −8 | ±0 | | −8 | +16 | −8 | ±0 | |
| 4 | 128 | 128 | 128 | 128 | | 128 | 128 | 128 | 128 | |
| 3 | −16 | +8 | +8 | ±0 | | +8 | −16 | +8 | ±0 | |
| 2 | −32 | +16 | +16 | ±0 | | +16 | −32 | +16 | ±0 | |
| 1 | +48 | +24 | +24 | ±0 | red | +24 | −48 | +24 | ±0 | green |

TABLE 4-continued

| | Y-B control | | | | | chromaticity control | | | | |
|---|---|---|---|---|---|---|---|---|---|---|
| CO | C | M | Y | BK | | C | M | Y | BK | |
| 7 | −24 | −24 | +48 | ±0 | yellow | −24 | −24 | −24 | +48 | achromatic |
| 6 | −16 | −16 | +32 | ±0 | | −16 | −16 | −16 | +32 | |
| 5 | −8 | −8 | +16 | ±0 | | −8 | −8 | −8 | +16 | |
| 4 | 128 | 128 | 128 | 128 | | 128 | 128 | 128 | 128 | |
| 3 | +8 | +8 | −16 | ±0 | | +8 | +8 | +8 | −16 | |
| 2 | +16 | +8 | −32 | ±0 | | +16 | +16 | +16 | −32 | |
| 1 | +24 | +24 | −48 | ±0 | blue | +24 | +24 | +24 | −48 | cromatic |

(J) Density Corrector

Figure 37:
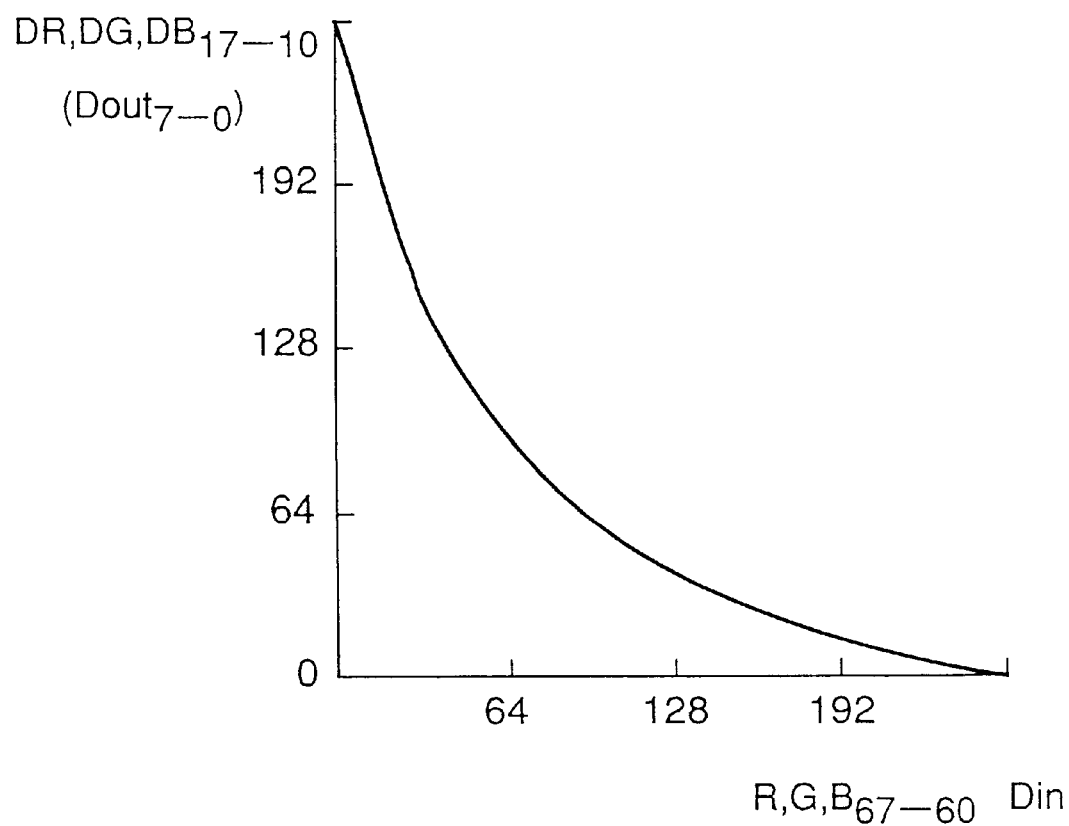
FIG. 37 is a graph of LOG table.

FIG. 36 shows the density corrector 1200 which converts $R_{67-60}$, $G_{67-60}$ and $B_{67-60}$ data proportional to a quantity of reflected light from a document to density data $DR_{17-10}$, $DG_{17-10}$ and $DB_{17-10}$. The input data $R_{67-60}$, $G_{67-60}$ and $B_{67-60}$ are received by LOG tables 1201, 1202 and 1203. The LOG tables are the same each other shown in FIG. 37. Then, density data $DR_{17-10}$, $DG_{17-10}$ and $DB_{17-10}$ are output according to Eq. (14).

$$DR=-(255/D\text{MAX})\cdot\log(R/255),$$

$$DR=-(255/D\text{MAX})\cdot\log(G/255), \quad (14)$$

and $$DR=-(255/D\text{MAX})\cdot\log(B/255),$$

wherein DMAX denotes a maximum reflected density.

Further, the input data $R_{67-60}$, $G_{67-60}$ and $B_{67-60}$ are multiplied with 5/16, 6/16 and 5/16 or weighted by 5:6:5 by a weight operator 1204, mixed by an adder 1205, and is supplied to another LOG table 1206. The output signal $DV_{17-10}$ represents a density level for a monochromatic document.

A negative/positive inverter 1250 inverts the density data $DR_{17-10}$, $DG_{17-10}$, $DB_{17-10}$ and $DV_{17-10}$ when $\overline{\text{NEGA}}$ signal is L level, otherwise it passes them without inversion. The $\overline{\text{NEGA}}$ signal is set with the key 76 in the operational panel 25. In a normal copy, it is set at H level.

(K) Undercolor-Remove/Black-Paint Processor

Figure 38:
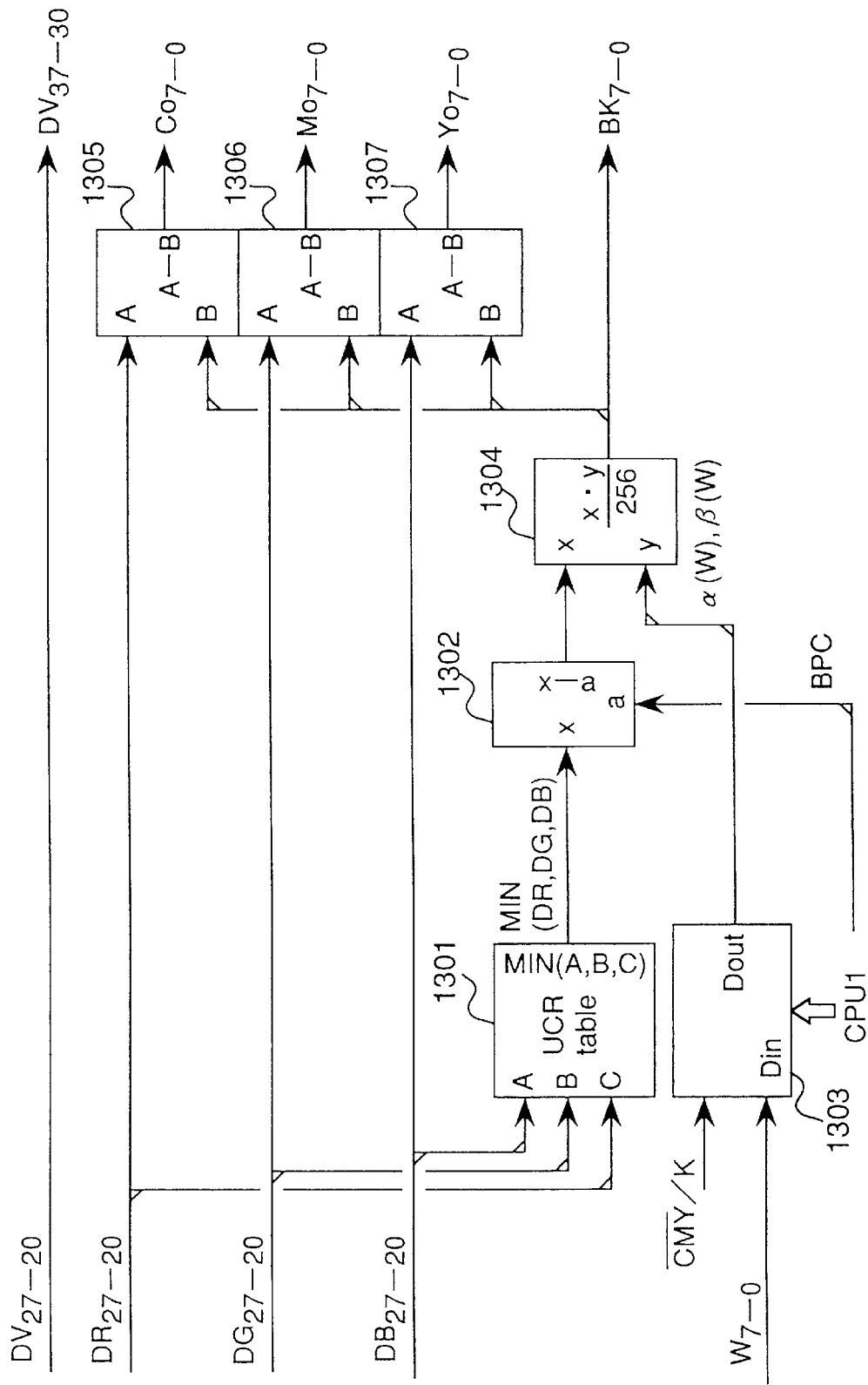
FIG. 38 is a block diagram of a UCR/BP processor.

FIG. 38 shows the UCR/BP processor 1300. In the reproduction of a full color document, black toners are used because sharp black is hard to be formed by mixing cyan, magenta and yellow toners. IN this embodiment, reproducibility of black is improved by a combination of subtractive color mixture of cyan, magenta and yellow and black painting of black toner. The UCR/BP processor 1300 calculates a minimum among the density data $DR_{7-0}$, $DG_{7-0}$ and $DB_{7-0}$ to take a part of the minimum as a black data $BK_{7-0}$ for painting black toners (BP processing). On the other hand, quantities of toners of cyan, magenta and yellow are removed in correspondence to the black data (undercolor) to supply data, $Co_{7-0}$, $Mo_{7-0}$ and $Yo_{7-0}$ (UCR processing).

First, a minimum detector 1301 receives the density data $DR_{7-0}$, $DG_{7-0}$ and $DB_{7-0}$ to detect a minimum thereof, as shown in FIG. 39A. A difference circuit 1302 subtracts the background level X sent from the CPU 1 from the minimum, as shown in FIG. 39B. In the undercolor remove processing, the value X is zero.

Figure 40:
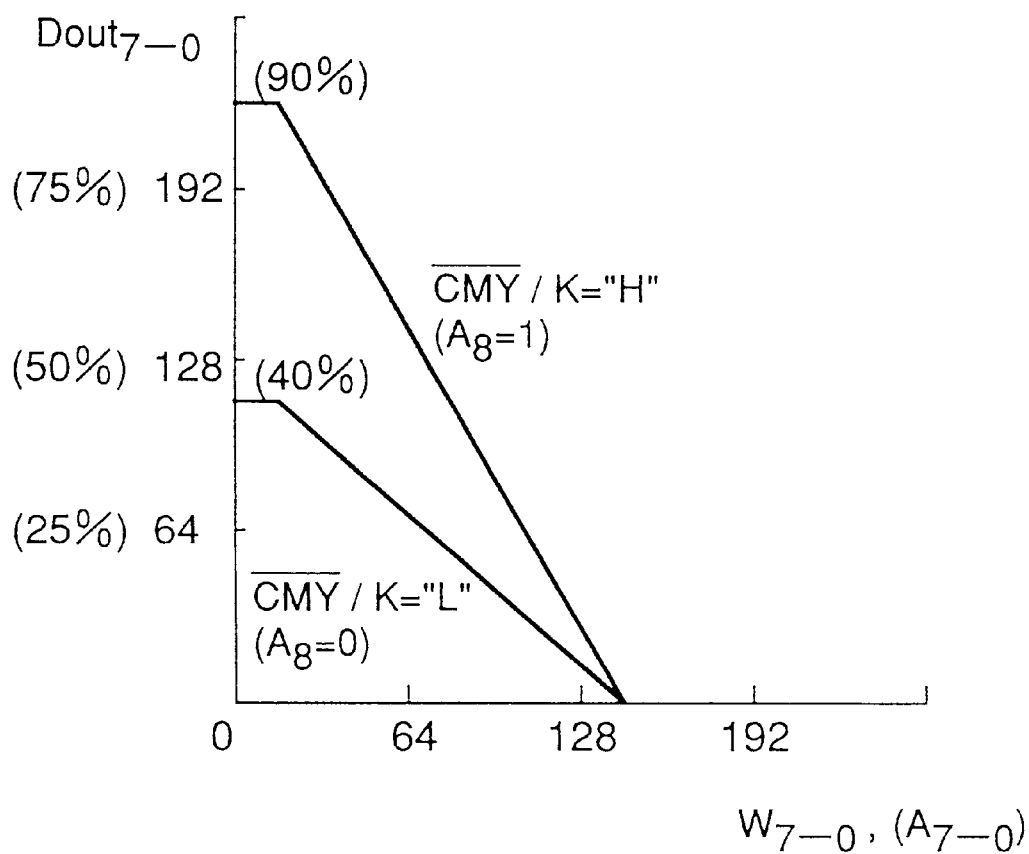
FIG. 40 is a graph of UCR table.

A UCR table 1303 receives CHROMA signal $W_{7-0}$ from the HVC converter 1100 and signal $\overline{\text{CMY}}/K$ which becomes H level when black is printed. The UCR table 1303 outputs UCR coefficient $\alpha(W)$ for UCR processing and BP coefficient $\beta(W)$ for BP processing. FIG. 40 shows the UCR table 1303. If the read image is achromatic, it is better to reproduce an image only with black toners because an amount of toners is small and black becomes sharp. Therefore, if the chroma signal $W_{7-0}$ is small, an amount of black and an amount subtracted from the three color data are increased. On the other hand, if the read color has a color, or if the chroma signal $W_{7-0}$ is large, an amount of black and an amount subtracted from the three color data are decreased in order to prevent that the reproduced color becomes impure. Thus, suitable UCR/BP processings are performed by changing $\alpha(W)$ and $\beta(W)$ according to the chroma signal $W_{7-0}$.

An operator 1304 receives $\alpha(W)$ and $\beta(W)$ from the UCR table 1303 and outputs a UCR quantity (displayed as a dashed line in FIG. 39B) on UCR processing by multiplying $\alpha(W)/256$ with the minimum MIN(DR, DG, DB) to the subtracters 1305–1307. the subtracters 1305–1307 calculates Eq. (15) and outputs $C0_{7-0}$, $G0_{7-0}$ and $B0_{7-0}$ after UCR processing.

$$C0=DR-\text{MIN}(DR, DG, DB)\cdot\alpha(W)/256,$$

$$M0=DG-\text{MIN}(DR, DG, DB)\cdot\alpha(W)/256, \quad (15)$$

and $$Y0=DB-\text{MIN}(DR, DG, DB)\cdot\alpha(W)/256,$$

On the other hand, the operator performs an operation of Eq. (16) of a quantity of black toners BK on BP processing.

$$BK=(\text{MIN}(Dr, DG, DB)-k)\cdot\beta(W)/256. \quad (16)$$

That is, the minimum is subtracted by undercolor level k (BPC) and multiplies it with $\beta(W)/256$.

(L) Color Corrector

Figure 41:
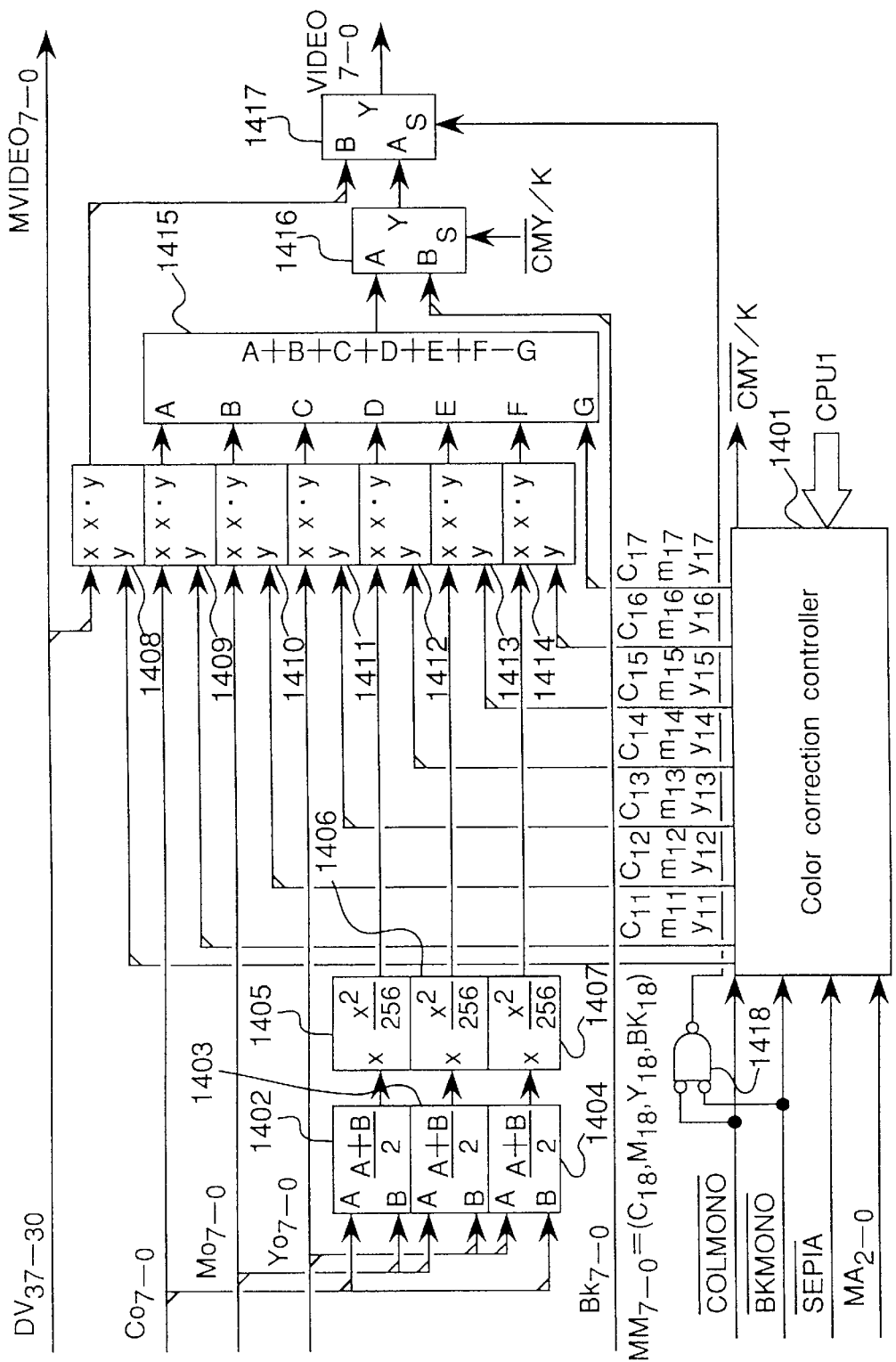
FIG. 41 is a block diagram of a color corrector 1400.

FIG. 41 shows a block diagram of the color corrector 1400 performing a following masking operation for suitable color reproduction: Eq. (17)

$$\begin{pmatrix} C \\ M \\ Y \end{pmatrix} = \begin{pmatrix} c_{11} & c_{12} & c_{13} & c_{14} & c_{15} & c_{16} & c_{17} \\ m_{21} & m_{22} & m_{23} & m_{24} & m_{25} & m_{26} & m_{27} \\ y_{31} & y_{32} & y_{33} & y_{34} & y_{35} & y_{36} & y_{37} \end{pmatrix} \begin{pmatrix} c_0 \\ m_0 \\ y_0 \\ \{(c_0+m_0)/2\}^2 \\ \{(m_0+y_0)/2\}^2 \\ \{(y_0+y_0)/2\}^2 \\ -1 \end{pmatrix} \quad (17)$$

The masking operation is performed to correct nonideal spectral characteristics of filters of the image sensor 14 and 10 toners used for printing an image on a sheet of paper, as shown in FIGS. 42 and 42. The masking coefficients $c_{11}$–$c_{17}$, $m_{11}$–$m_{17}$ and $Y_{11}$–$Y_{17}$ are determined according to following steps: First, a test print is read by the image sensor 14 and a test print thereof is formed. Next, the test print printed is read by the image sensor 14. Then, the read data of the test print are compared with those of the printed image, and the coefficients are determined so that a difference between them becomes smallest. Actually, the masking coefficients $c_{11}$–$c_{17}$ are determined when cyan image is formed, $m_{11}$–$m_{17}$ are determined when a magenta image is formed, and $Y11$–$Y_{17}$ are determined when a yellow image is forme.

In the circuit shown in FIG. 41, multipliers 1409, 1410 and 1411 receive input data of $Co_{7-0}$, $Mo_{7-0}$ and $Yo_{7-0}$ from the UCR/BP processor 1300. Further, operators 1402, 1403 and 1404 also receives the input data. The operators 1402, 1403 and 1404 receives Co, Go and Bo at A inputs thereof in this order and Mo, Bo and Co at B inputs thereof in this order. Then, the operators 1402, 1403 and 1404 average of the data received at the A and B inputs, and the averages are sent to operators 1405, 1406 and 1407 which divide a square of the input data with 256 and sent the result to multipliers 1412, 1413 and 1414. The multipliers 1408–1414 receive the masking coefficients $c_{11}$–$c_{16}$, $m_{11}$–$m_{16}$ and $y_{11}$–$y_{16}$ as shown in FIG. 41 from a controller 1401 to multiply it with the input data. Products obtained by the multipliers 1409–1414 are sent to inputs A–G of an operator 1407, while the masking coefficients $c_{17}$, $m_{17}$ and $y_{17}$ are sent directly to input F of the operator 1407. The operator 1407 sums the data at the inputs A–F and subtract the data at the input G from the sum. Thus, the matrix operation of Eq. (17) is completed.

When a cyan, magenta or yellow image is formed, the controller 1401 of color correction can set eight kinds of masking coefficients at the same time, and the masking coefficients can be changed for each pixel (in real time) by setting change signal $MA_{2-0}$ and a sepia area signal $\overline{SEPIA}$.

A selector 1416 selects the output data of the operator 1415 to a selector 1417 when H level of $\overline{CMY}$/K signal is received or cyan, magenta or yellow is printed, or it selects $BK_{7-0}$ data when L level of $\overline{CMY}$/K signal is received or black is printed.

On the other hand, the controller 1401 sends coefficients $MM_{7-0}$ in correspondence to the multiplier 1408. The coefficients MM ($C_{18}$, $M_{18}$, $Y_{18}$, $BK_{18}$) are changed in each image forming process of cyan, magenta, yellow and black according to a monochromatic color to be reproduced designated by a user with the operational panel. The multiplier 1408 multiplies it with the density data $DV_{17-10}$ for the monochromatic color to supply a monochromatic color data to the selector 1417.

The controller 1401 further receives a monochromatic color area signal $\overline{COLMONO}$ and a monochromatic area signal $\overline{BKMONO}$ for each pixel. These signals are also received by an AND gate 1418. If the signals $\overline{COLMONO}$ and $\overline{BKMONO}$ have L level, or if the pixel data is a data in a full color mode area, the AND gate 1418 outputs a signal of L level to the selector 1417. Then, the selector 1417 selects a full color data received from the selector as an output data $VIDEO_{7-0}$. On the other hand, if at least one of the signals $\overline{COLMONO}$ and $\overline{BKMONO}$ has H level, or if the pixel data is a data in a monochromatic color mode area or in a monochromatic mode area, the AND gate 1418 outputs a signal of H level to the selector 1417. Then, the selector 1417 selects the monochromatic color data received from the multiplier 1418 as an output data $VIDEO_{7-0}$.

(M) Region Discriminator

Figure 44A:
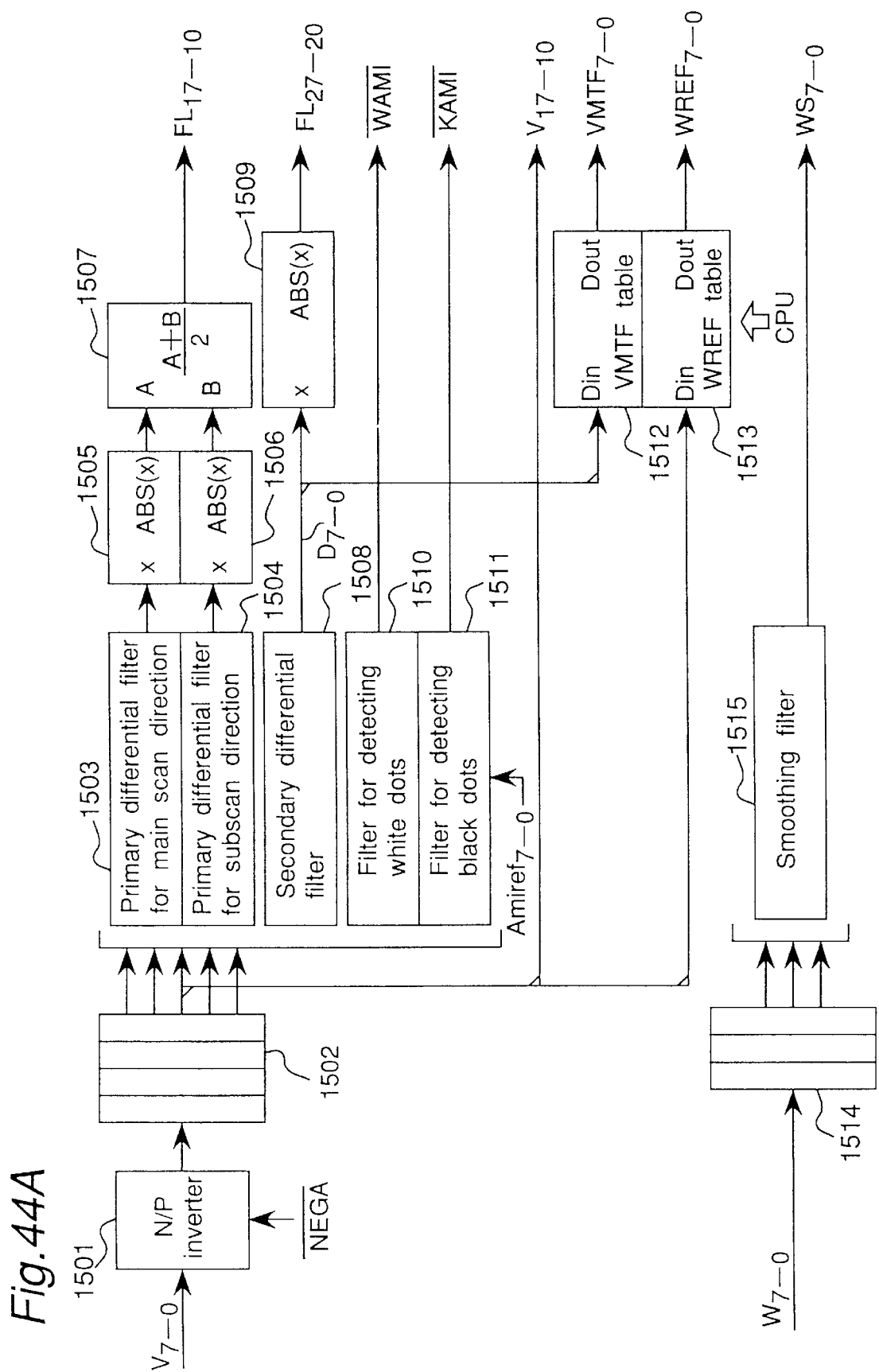
FIGS. 44A and 44B are block diagrams of a region discriminator.
Figure 44B:
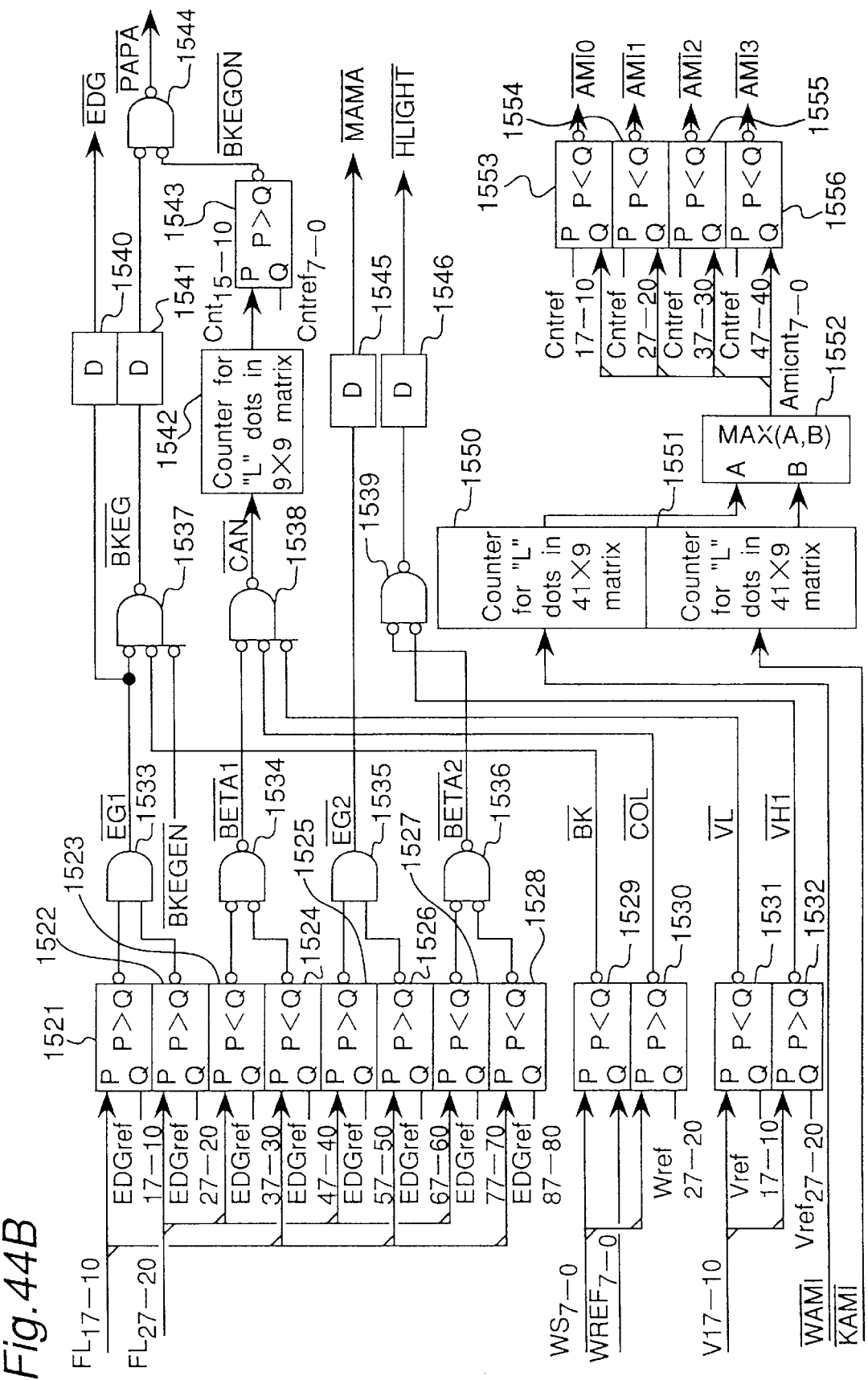

FIGS. 44A and 44B are block diagrams of the region discriminator 1500 which discriminates black character areas and dot image areas in a document image. The discrimination of black characters comprises four steps of (a) detection of a character (edge), (b) detection of black pixel, (c) detection of a region which is liable to be detected as black, and (d) generation of black edge reproduction signal which is performed by the MTF corrector 1600. The first to third steps are explained below in detail.

(M-1) Detection of Character (Edge)

First, detection of a character (edge) is explained in detail. A character has two elements of edge parts and uniform parts interposed by edge parts. If a character is thin, it has only edge portions. Then, the existence of a character is decided by detecting edges.

In the region discriminator 1500 shown in FIG. 44A, the lightness signal $V_{7-0}$ generated by the HVC converter 1100 is received through a negative/positive inverter 1501 to a line memory 1502. If $\overline{NEGA}$ signal set by an operator with the operational panel is L level, the inverter 1501 inverts the input data.

Figures 47, 49:
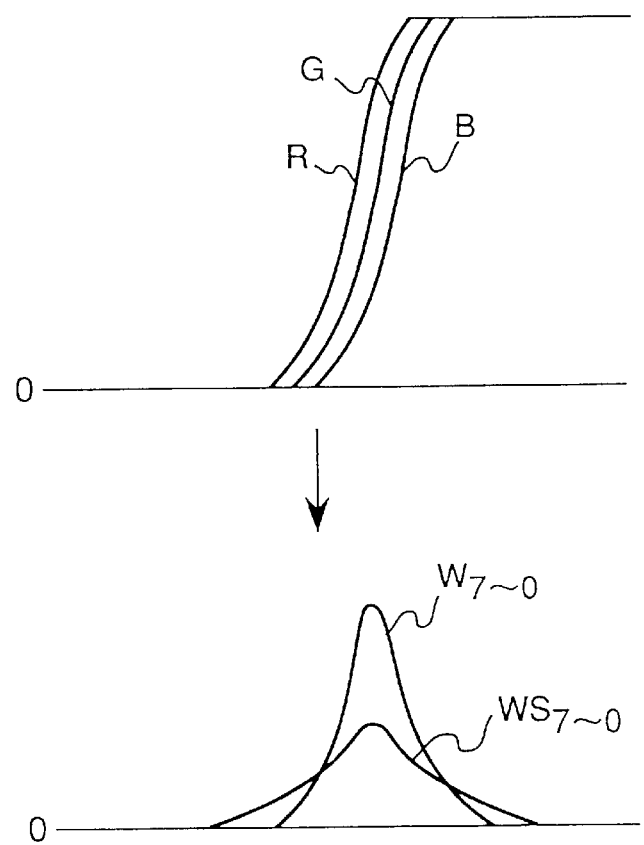
FIG. 47 is a diagram of a secondary differential filter.
FIG. 49 is a diagram for illustrating an increase in chroma data W due to phase differences among R, G and B data, and WS obtained by smoothing.

The data in the line memory is sent to primary differential filters 1503 and 1504 shown in FIGS. 45 and 46 for the main scan direction and for the subscan direction each having a 5*5 matrix and to a secondary differential filter 1508 shown in FIG. 47. In this embodiment, edges are detected with two kinds of differential filter because each has a feature. FIG. 48A shows lightness distribution of five lines with different size from each other. Further, FIG. 483 shows primary differentials for the five lines, and FIG. 48C shows secondary differentials for the five lines. The primary differential filter outputs a higher detection value than the secondary one at an edge of a thick line (of a width of four pixels or larger). That is, the primary differential filter is suitable for detecting a thick edge of a width of four pixels or larger, while the secondary differential filter is suitable for detecting a thin edge of a width less than four pixels. In the region discriminator 1500, an edge of a character is detected if at least one of the primary and secondary filters outputs a value larger than a threshold value. Then, the detection precision of edge can be maintained irrespective of a width of a line.

The primary differential filters 1503 and 1504 along the main scan direction and along the subscan direction receive data read from the line memory 1502. The obtained differentials are sent to absolute value circuits 1505 and 1506 to obtain absolute values thereof. The absolute values are needed because the primary differential filters 1403 and 1504 have negative coefficients. Then, an operator 1507 receives the absolute values and outputs an average $FL_{17-10}$ thereof. The average is used to take two differentials along the two directions into account. The average $FL_{17-10}$ of the first differentials is sent to comparators 1521, 1523, 1525 and 1527 for edge decision.

Figure 55:
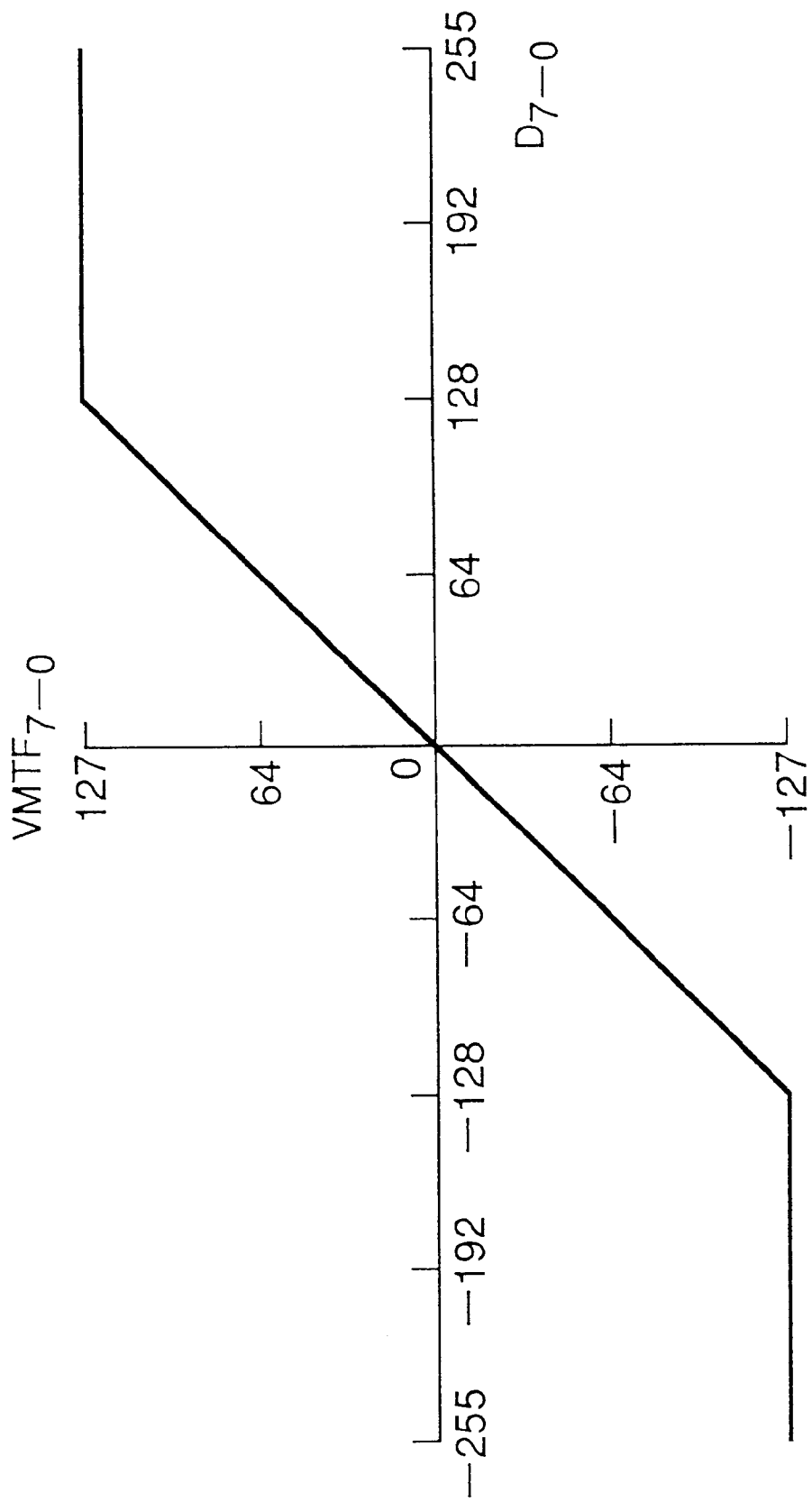
FIG. 55 is a graph of an MTF table.

The secondary differential filter 1508 receives data from the line memory 1502 and an obtained second differential $D_{7-0}$ is output to an absolute value circuit 1509 to output an absolute value $FL_{27-20}$ thereof. The absolute value is needed because the secondary differential filter 1408 also have negative coefficients. The absolute value $FL_{27-20}$ of the secondary differential is sent to comparators 1522, 1524, 1526 and 1528 for edge decision. The secondary differential $D_{7-0}$ is also sent to a VMTF table 1512 shown in FIG. 55. The VMTF table 1512 outputs lightness edge component $VMTF_{7-0}$ in correspondence to the secondary differential $D_{7-0}$.

The comparator 1521 for edge decision shown in FIG. 44B compares the first differential $FL_{17-10}$ with a first edge reference level $EDGREF_{17-10}$, and it outputs a signal of L level if the first differential $FL_{17-10}$ is larger than the first edge reference level $EDGREF_{17-10}$. On the other hand, the comparator 1522 for edge decision compares the second differential $FL_{27-20}$ with a second edge reference level $EDGREF_{27-20}$, and it outputs a signal of L level if the second differential $FL_{27-20}$ is larger than the second edge reference level $EDGREF_{27-20}$. An AND gate 1533 receives the results of the comparison by the comparators 1521, 1522 and it outputs an $\overline{EG}$ signal if a signal of L level is received from at least one of the comparators 1521 and 1522. The $\overline{EG}$ signal means an edge.

(M-2) Decision of Black Pixel

Next, decision of black pixel is explained in detail. Black is detected based on chroma $W_{7-0}$, or if the chroma $W_{7-0}$ is smaller than a reference value, the pixel is decided as black. However, the value of chroma $W_{7-0}$ may become high for a black pixel. For example, when the image sensor 14 vibrates when the image is read, the phases of data of red, green and blue may shift slightly relative to each other, as shown at a graph at an upper part in FIG. 49. In this case, the chroma $W_{7-0}$ becomes large as shown in another graph at a lower part in FIG. 49. If the pixel is decided if the chroma $W_{7-0}$ is smaller than a reference value, the pixel is erroneously decided as a color pixel. Then, in this embodiment, erroneous decision can be prevented by smoothing the chroma data before the decision. That is, the chroma data $W_{7-0}$ is first received from the HVC converter 1100 by another line memory 1514, and it is smoothed by a filter 1515 of 3*3 matrix shown in FIG. 50. Chroma data $WS_{7-0}$ after smoothing has a more gradual value, as shown in the lower part in FIG. 49. Then, the above-mentioned type of erroneous decision can be prevented.

Figures 50, 51:
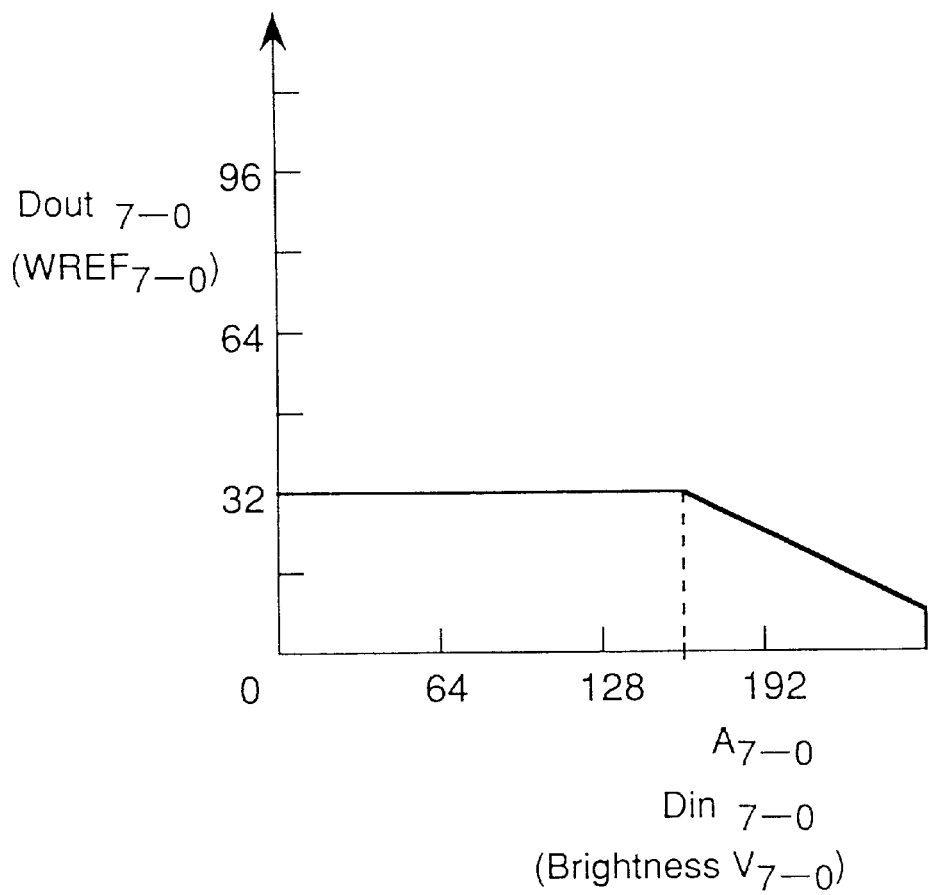
FIG. 50 is a diagram of a smoothing filter.
FIG. 51 is a graph of a WREF table.

A comparator 1529 receives the chroma data $WS_{7-0}$ and compares it with a chroma reference data $WREF_{7-0}$. If the chroma data $WS_{7-0}$ is smaller than the chroma reference data $WREF_{7-0}$, the pixel is decided to be black, and the comparator 1529 sends $\overline{BK}$ signal to an AND gate 1537. The chroma reference data $WREF_{7-0}$ is determined by the WREF table 1513 according to the lightness data $V_{7-0}$. As shown in FIG. 51, the WREF table 1513 has a feature that if the lightness data $V_{7-0}$ is larger than a predetermined value, $WREF_{7-0}$ is decreased linearly with the lightness $V_{7-0}$. This takes into account that black pixels determined erroneously will become evident. The AND gate 1537 outputs $\overline{BKEG}$ which means an edge of a black pixel if the pixel is a pixel at an edge ($\overline{EG}$=L), it is a black pixel ($\overline{BK}$=L) and $\overline{BKEGEN}$=L.

(M-3) Decision of a Region Liable to be Detected as Black Character

Figure 52A:
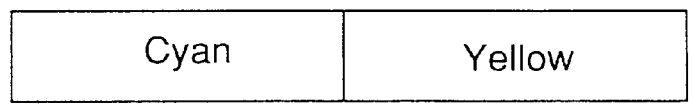
FIG. 52A is a diagram an image consisting of cyan and magenta.
Figure 52B:
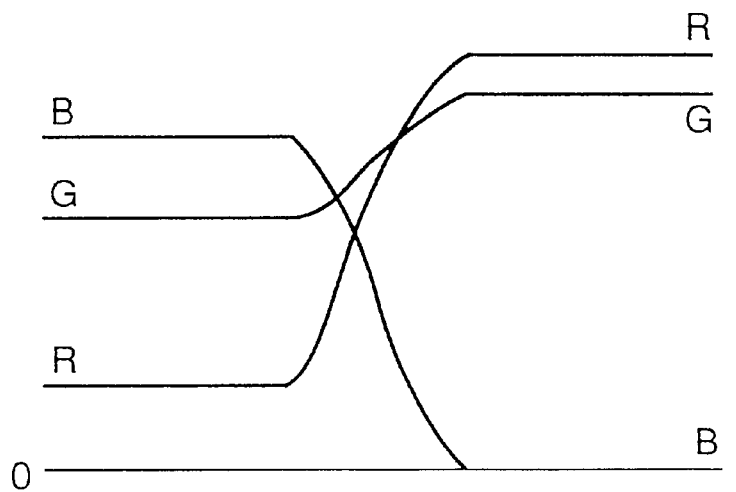
FIG. 52B is a graph of image data of red, green and blue of the image shown in FIG. 52A.
Figure 52C:
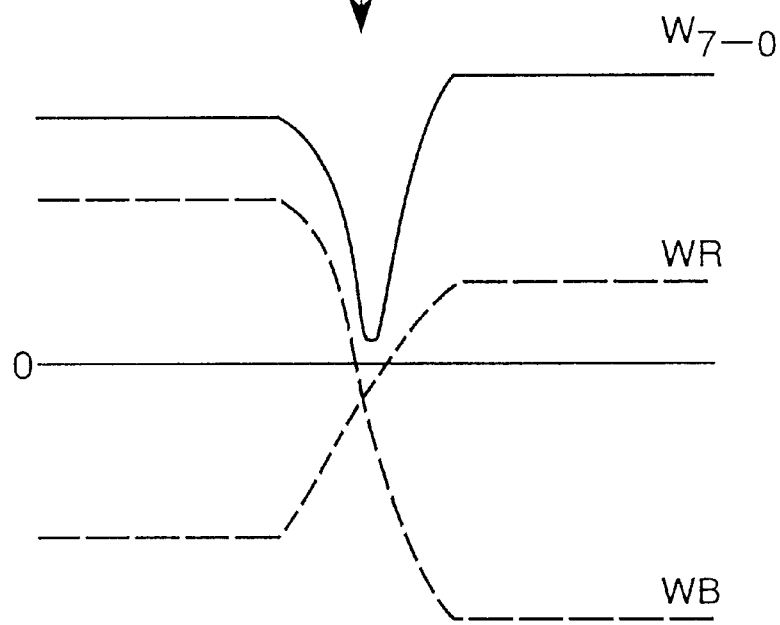
FIG. 52C is a graph of chroma and color difference data for explaining erroneous detection of black at a boundary between cyan and yellow.

Next, the detection of a region which is liable to be detected as black character is explained in detail. If only the detection of a character (edge) and the detection of black pixel mentioned above are performed, a character having a low lightness $V_{7-0}$ and a low chroma $WS_{7-0}$ such as dark blue and deep green is liable to be decided erroneously as an edge of a black character. Further, if a color and its complementary color, such as cyan and yellow, as shown in FIG. 52A, are adjacent to each other, and image data of red, green and blue are read as shown in FIG. 52B, the chroma $WS_{7-0}$ may become low at the boundary between them or change to black there, as shown in FIG. 52C. Such a point is also liable to be decided erroneously as an edge of a black character. For example, such an erroneous decision may happen when a blue character is printed on a background of yellow.

In order to solve the problem, a uniform color part is detected in the embodiment. Then, even if the pixel is decided a black pixel, the decision is canceled if it is located in a region of uniform color part. Thus, a black character can be decided more precisely.

The uniform color part has features that it is not an edge, that it is a pixel in a color mode area and that a number of pixel having low lightness exceeds a certain number within a prescribed area. Then, the uniform color part is detected as follows: The comparators 1523 and 1524 decide that the outputs $FL_{17-10}$ and $FL_{27-20}$ of the primary and secondary differential filters are lower than third and fourth edge reference levels $EDGREF_{37-30}$ and $EDREF_{47-40}$, an AND gate 1534 outputs signal $\overline{BETA1}$ which means a pixel not existing at an edge. Further, if a comparator 1530 decides that the chroma data $WS_{7-0}$ is smaller than a reference value $WREF_{27-20}$, it outputs a signal $\overline{COL}$ which means a color data. Further, if a comparator 1531 decides that the lightness data $V_{17-10}$ is smaller than a reference value $VREF_{17-10}$, it outputs a signal $\overline{VL_1}$. Then, the AND gate 1538 receives the signals $\overline{BETA1}$, $\overline{COL}$ and $\overline{VL_1}$ and outputs a signal CAN which means that the pixel is not at an edge, that the pixel is in a color mode area and that the pixel has a low lightness. Then, the pixel is taken as a uniform part having a chromatic color not located in a background. A counter 1542 counts the number of the signals $\overline{CAN}$ in the unit of 9*9 pixels. If the number $Cnt_{17-10}$ of the signals $\overline{CAN}$ is smaller than a reference value $Cntref_{7-0}$, a comparator 1542 outputs a signal $\overline{BKEGON}$.

An AND gate 1544 receives the above-mentioned signal $\overline{BKEG}$ delayed by a delay circuit 1541 and the above-mentioned signal $\overline{BKEGON}$. That is, even when the signal $\overline{BKEG}$ on the decision of a black edge is received, if the signal $\overline{BKEGON}$ is not received or if the pixel is located in a uniform color part, the decision of black edge is canceled, and the AND gate 1544 does not output a signal $\overline{\text{PAPA}}$. In other words, edge emphasis is performed only for a black character in a monochromatic background. On the other hand, the number of pixels of a uniform color part is less than the prescribed reference value, the decision of black edge is kept to be valid.

(M-4) Decision of Dot Area

Figures 53, 54:
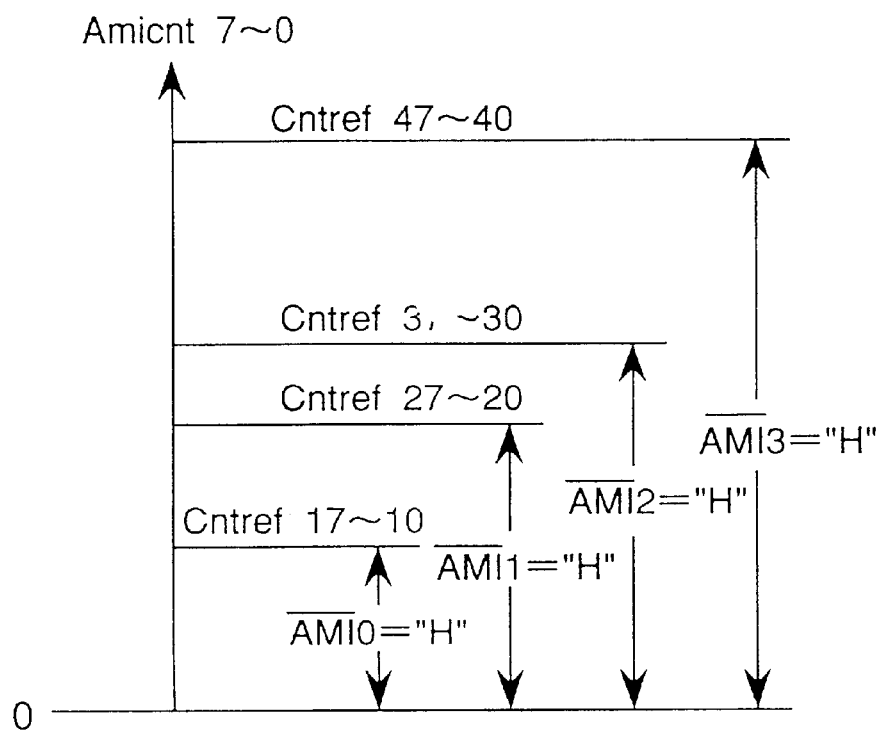
FIG. 53 is a diagram for showing two adjacent pixels along eight directions with respect to an interest pixel (X) in filters for detecting white and black dot.
FIG. 54 is a diagram of four steps of reference levels for detecting dots and signals $\overline{AMI0}$–$\overline{AMI3}$.

Next, decision of dot area is explained in detail. Dot area means an area of an image composed of dots. As shown in FIG. 44A, the filters 1510 and 1511 for detection white dots and black dots receive data output from the line memory 1502. Each filter decides if a pixel under interest is larger (white dots) or smaller (black dots) than a level $\text{AMIREF}_{7-0}$ along the all directions with respect to an average of two pixels surrounding the pixel under interest along eight directions, as shown in FIG. 53. Further, if the pixel under interest is larger than the eight adjacent pixels, it is decided as a white dot ($\overline{\text{WAMI}}$=L), while if the pixel under interest is smaller than the eight adjacent pixels, it is decided as a black dot ($\overline{\text{KAMI}}$=L).

In concrete, the filter 1510 for detecting white dots shown in FIG. 44A outputs a signal $\overline{\text{WAMI}}$ of L level when each condition of Eq. (18) is satisfied and each condition of Eq. (19) is satisfied. Further, the filter 1511 for detecting black dots shown in FIG. 44A also outputs a signal $\overline{\text{KAMI}}$ of L level when each condition of Eq. (18) is satisfied and each condition of Eq. (19) is satisfied.

$$\begin{aligned}
& X - (a_{11} + a_{22})/2 > \text{AMIREF}_{7-0'} \\
& X - (a_{31} + a_{32})/2 > \text{AMIREF}_{7-0'} \\
& X - (a_{51} + a_{42})/2 > \text{AMIREF}_{7-0'} \\
& X - (a_{53} + a_{43})/2 > \text{AMIREF}_{7-0'} \quad (18) \\
& X - (a_{55} + a_{44})/2 > \text{AMIREF}_{7-0'} \\
& X - (a_{35} + a_{34})/2 > \text{AMIREF}_{7-0'} \\
& X - (a_{15} + a_{24})/2 > \text{AMIREF}_{7-0'}
\end{aligned}$$

and $$\begin{aligned}
& X - (a_{13} + a_{23})/2 > \text{AMIREF}_{7-0'} \\
& X > a_{22'} \\
& X > a_{32'} \\
& X > a_{42'} \\
& X > a_{43'} \quad (19) \\
& X > a_{44'} \\
& X > a_{34'} \\
& X > a_{24'}
\end{aligned}$$

and $$X > a_{23}.$$

Further, the filter 1511 for detecting black dots shown in FIG. 44A also outputs a signal $\overline{\text{KAMI}}$ of L level when each condition of Eq. (20) is satisfied and each condition of Eq. (21) is satisfied.

$$\begin{aligned}
& X - (a_{11} + a_{22})/2 < \text{AMIREF}_{7-0'} \\
& X - (a_{31} + a_{32})/2 < \text{AMIREF}_{7-0'} \\
& X - (a_{51} + a_{42})/2 < \text{AMIREF}_{7-0'} \\
& X - (a_{53} + a_{43})/2 < \text{AMIREF}_{7-0'} \quad (20) \\
& X - (a_{55} + a_{44})/2 < \text{AMIREF}_{7-0'} \\
& X - (a_{35} + a_{34})/2 < \text{AMIREF}_{7-0'} \\
& X - (a_{15} + a_{24})/2 < \text{AMIREF}_{7-0'}
\end{aligned}$$

and $$\begin{aligned}
& X - (a_{13} + a_{23})/2 < \text{AMIREF}_{7-0'} \\
& X < a_{22'} \\
& X < a_{32'} \\
& X < a_{42'} \\
& X < a_{43'} \quad (21) \\
& X < a_{44'} \\
& X < a_{34'} \\
& X < a_{24'}
\end{aligned}$$

and $$X < a_{23}.$$

The counters 1550 and 1551 receive signals $\overline{\text{WAMI}}$ and $\overline{\text{KAMI}}$ output by the filters 1510 and 1511, and they count a number of signals of L level in a 41*9 pixel matrix. The counts thereof are sent to a maximum detector 1552 which outputs a maximum thereof $\text{Amicnt}_{7-0}$ to four comparators 1553–1556. The comparators 1553–1556 compare it with four steps of reference levels $\text{CNTREF}_{17-10}$, $\text{CNTREF}_{27-20}$, $\text{CNTREF}_{37-30}$ and $\text{CNTREF}_{47-40}$ to quantize it, and they output $\overline{\text{AMI0}}$, $\overline{\text{AMI1}}$, $\overline{\text{AMI2}}$ and $\overline{\text{AMI3}}$ if it is larger than the reference signals (refer to FIG. 54).

(M-5) Other Types of Decision

The region discriminator 1500 further decides some points explained below. A comparator 1532 is provided to decide a high light area. It compares the lightness data $V_{7-0}$ with a second reference level $\text{VREF}_{27-20}$, and if the lightness data $V_{7-0}$ is larger than the second reference level $\text{VREF}_{27-20}$, it outputs a signal $\overline{\text{VH1}}$ which means that the pixel exists in a highlight area. The comparators 1527 and 1528 are provided to decide an area not located at an edge. They compare the first differential $\text{FL}_{17-10}$ and the second differential $\text{FL}_{27-20}$ with seventh and eighth reference levels $\text{EDGref}_{77-70}$ and $\text{EDGref}_{87-80}$. If the first differential $\text{FL}_{17-10}$ and the second differential $\text{FL}_{27-20}$ are smaller than seventh and eighth reference levels $\text{EDGref}_{77-70}$ and $\text{EDGref}_{87-80}$, a signal $\overline{\text{BETA2}}$ which means a pixel not located at an edge is sent to an AND gate 1536. The AND gate 1536 also receives the above-mentioned $\overline{\text{VH1}}$ signal from the comparator 1531, and it outputs a signal $\overline{\text{HLIGHT}}$ which means a highlight area through a delay circuit 1546.

The comparators 1525 and 1526 also receive the first differential $\text{FL}_{17-10}$ and the second differential $\text{FL}_{27-20}$ and compare them with fifth and sixth reference levels $\text{EDGref}_{57-50}$ and $\text{EDGref}_{67-60}$. If the first differential $\text{FL}_{17-10}$ and the second differential $\text{FL}_{27-20}$ are larger than the reference levels $\text{EDGref}_{57-50}$ and $\text{EDGref}_{67-60}$, signals of L level are sent to an NOR gate 1525. If a signal is received from either of the comparators 1525 and 1526, the NOR gate 1525 outputs a signal $\overline{\text{EG2}}$ which means an edge highlight area through a delay circuit 1546 as a signal MAMA.

(N) MTF Corrector

Figure 56A:
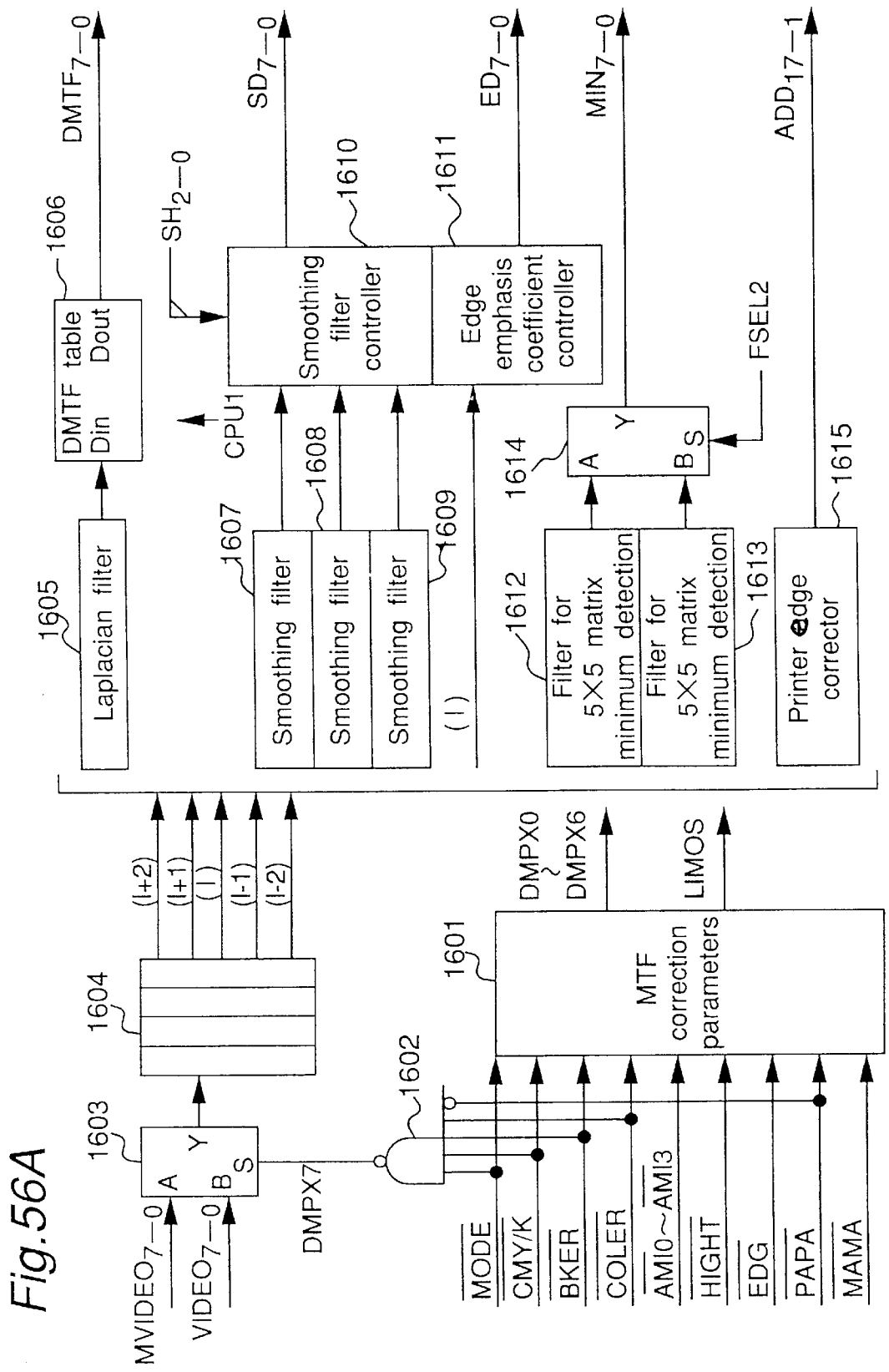
FIGS. 56A and 56B are block diagrams of an MTF correction section.
Figure 56B:
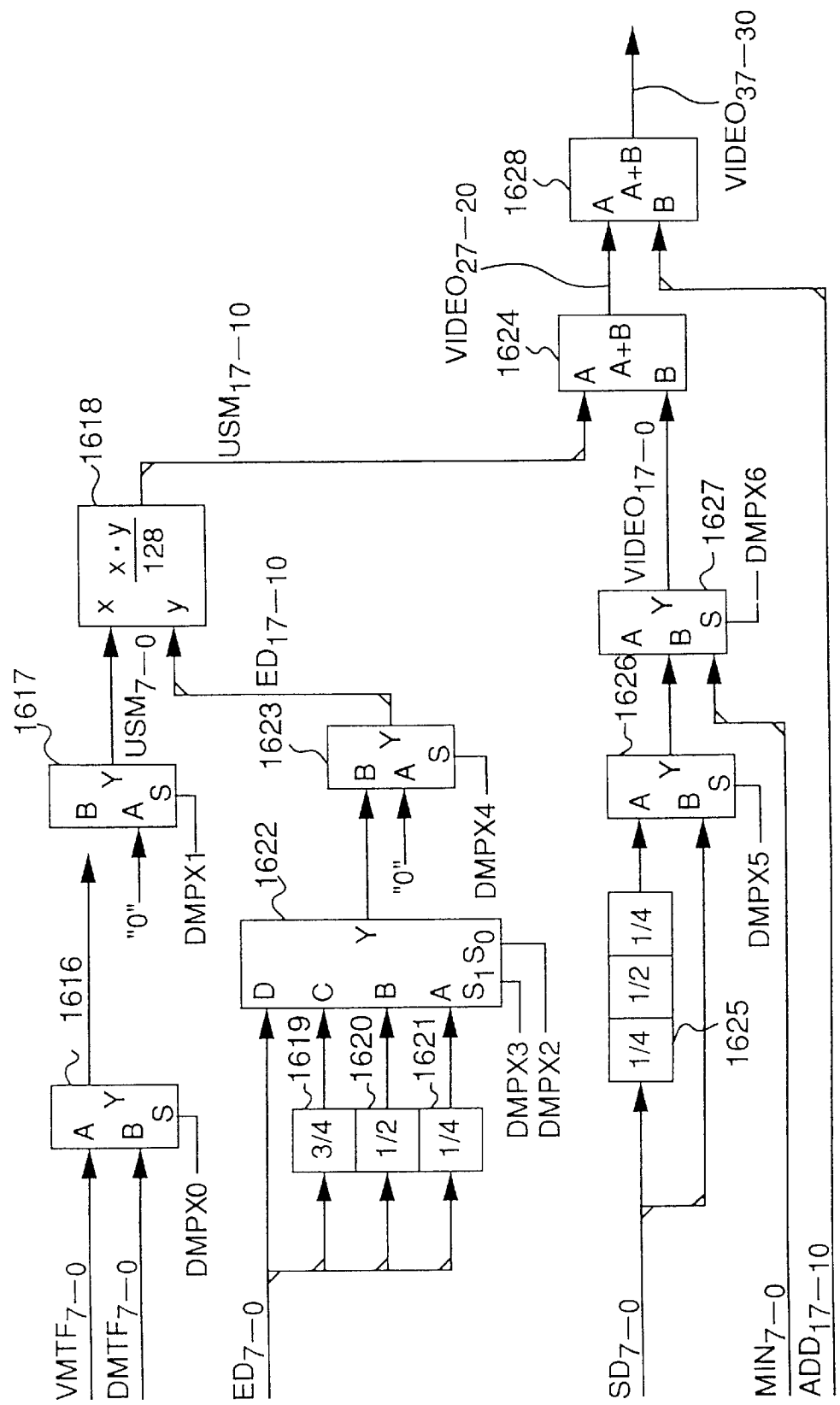

FIGS. 56A and 56B show block diagrams of the MTF corrector 1600 which performs edge emphasis and smoothing most suitable for the image data $\text{VIDE}_{7-0}$ and $\text{MVIDE}_{7-0}$ received from the color corrector 1400 according to the kind of pixels recognized by the signals ($\overline{\text{AMI0}}$–$\overline{\text{AMI3}}$, $\overline{\text{MAMA}}$, $\overline{\text{PAPA}}$, $\overline{\text{EDG}}$ and $\overline{\text{HLIGHT}}$) and printing situation recognized by status signals ($\overline{\text{MODE}}$, $\overline{\text{CMY/K}}$, $\overline{\text{BKER}}$, $\overline{\text{COLER}}$). Further, a duty ratio of laser emission is changed according to the kind of image recognized by the region discriminator 1500. Still further, a prescribed value is added to pixel data at edges to correct amounts of excess or deficient toners.

The MTF corrector 1600 recognizes the color of toners based on $\overline{\text{CMY/K}}$ signal. If the signal is L level, toners of cyan, magenta or yellow is printed. It also recognizes one of following modes by using three signals $\overline{\text{MODE}}$, $\overline{\text{BKER}}$ and $\overline{\text{COLER}}$: Full color standard mode ($\overline{\text{BKER}}$=H, $\overline{\text{COLER}}$=L and $\overline{\text{MODE}}$=H), full color photographic mode ($\overline{\text{BKER}}$=H, $\overline{\text{COLER}}$=H and $\overline{\text{MODE}}$=L), monochromatic color standard mode ($\overline{\text{KER}}$=H, $\overline{\text{COLER}}$=L and $\overline{\text{MODE}}$=H), monochromatic color photograph mode ($\overline{\text{BKER}}$=H, $\overline{\text{COLER}}$=L and $\overline{\text{MODE}}$=L), monochromatic standard mode ($\overline{\text{BKER}}$=L, $\overline{\text{COLER}}$=L and $\overline{\text{MODE}}$=H), and monochromatic photographic mode ($\overline{\text{BKER}}$=L, $\overline{\text{COLER}}$=L and $\overline{\text{MODE}}$=L). Further, it recognizes the kind of a pixel to be printed by using the result of region discrimination as follows: A highlight region of uniform density ($\overline{\text{HLIGHT}}$=L), a non-edge region ($\overline{\text{HLIGHT}}$=H, $\overline{\text{EDG}}$=H, $\overline{\text{PAPA}}$=H), a color edge region ($\overline{\text{HLIGHT}}$=H, $\overline{\text{EDG}}$=L, $\overline{\text{PAPA}}$=H), and a black edge region ($\overline{\text{HLIGHT}}$=H. $\overline{\text{EDG}}$=L, $\overline{\text{PAPA}}$=L).

(N-1) Explanation of Various Modes

Before explaining the MTF corrector 1600, MTF correction in each mode mentioned above is explained. First, $\overline{\text{MTF}}$ correction in the full color standard mode ($\overline{\text{MODE}}$=H, $\overline{\text{BKER}}$=H and $\overline{\text{COLER}}$=L) is explained. Table 5 compiles signal levels of various signals received by a controller 1601, printing situations represented by the levels and signals of DMPX0, DMPX1, DMPX5 and DMPX6.

Figure 64A:
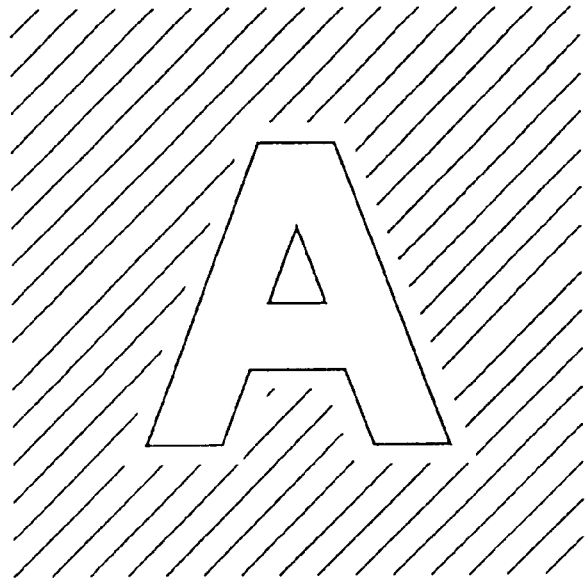
FIGS. 64A and 64B are diagrams of examples of images in correspondence to FIGS. 63A and 63B.
Figure 64B:
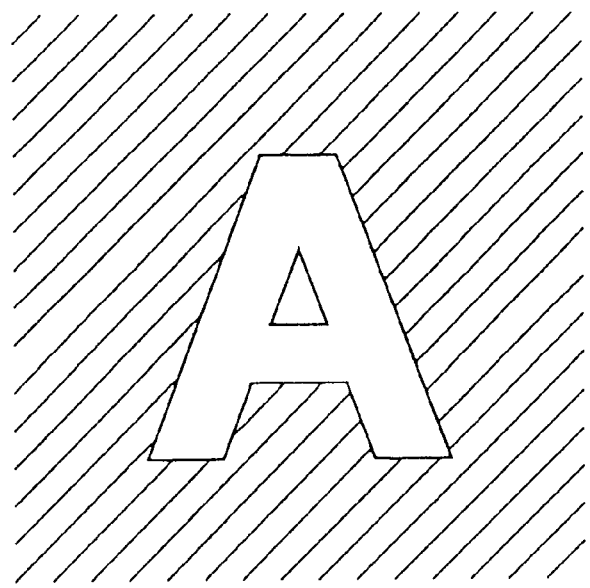

When cyan, magenta or yellow toners are used for printing ($\overline{\text{CMY/K}}$=L), edge emphasis is not performed on a pixel at a black edge, and a minimum data $\text{MIN}_{7-0}$ is obtained in a 5*5 or 3*3 matrix as output data $\text{VIDEO}_{37-30}$. That is, the minimum data is obtained in a prescribed area including the pixel. Then, a very narrow extended line at an edge as shown in FIG. 63A in an area represented with a dashed circle can be removed as shown in FIG. 63B. By using the minimum data $\text{MIN}_{7-0}$, image data can be decreased to zero only inside a black character. Then, the black character can be printed with edge emphasis without white peripheral lines as shown in FIG. 64A. If image data of cyan, magenta or yellow is subtracted by, for example, an edge detection quantity (such as $\text{FL}_{17-10}$ or $\text{FL}_{27-20}$ in this embodiment), white peripheral lines as shown in FIG. 64A are observed.

For a pixel in a color edge region ($\overline{\text{HLIGHT}}$=H, $\overline{\text{EDG}}$=L, $\overline{\text{PAPA}}$=H), edge emphases is not performed when black toners are used in printing ($\overline{\text{PAPA}}$=H), and ordinary pixel data $\text{SD}_{7-0}$ is used as $\text{VIDEO}_{37-30}$. In other words, edge emphasis is not performed for an edge of a color character for black printing so that black fringe of a color character can be prevented. On the other hand, when cyan, magenta or yellow toners are used for printing, density edge component $\text{DTMF}_{7-0}$ is added to the ordinary pixel data $\text{SD}_{7-0}$ as $\text{VIDEO}_{37-30}$.

TABLE 5

| | | | | Full color standard mode | | | | | | |
|---|---|---|---|---|---|---|---|---|---|---|
| $\overline{\text{CMY/K}}$ | $\overline{\text{HLIGHT}}$ | $\overline{\text{EDG}}$ | $\overline{\text{PAPA}}$ | | DMPX1 | DMPX0 | USM | DMPX6 | DMPX5 | VIDEO |
| L (CMY mode) | L | — | — | highlight | L | H | 0 | H | L | FSD |
| | H | H | H | non-edge | L | H | 0 | H | H | SD |
| | H | L | H | color edge | H | H | DMTF | H | H | SD |
| | H | L | L | black edge | L | L | 0 | L | H | MIN |
| H (BK mode) | L | — | — | highlight | L | H | 0 | H | L | FSD |
| | H | H | H | non-edge | L | H | 0 | H | H | SD |
| | H | L | H | color edge | L | H | 0 | H | H | SD |
| | H | L | L | black edge | H | L | VMTF | H | H | SD |

First, MTF correction of a pixel at a black edge ($\overline{\text{HLIGHT}}$=H, $\overline{\text{EDG}}$=L, $\overline{\text{PAPA}}$=L) is explained. When black toners are used for printing ($\overline{\text{CMY/K}}$=H), $\text{VIDEO}_{37-30}$ is obtained by adding edge component $\text{VMTF}_{7-0}$ of lightness to ordinary image data $\text{SD}_{7-0}$ for edge emphasis. The edge component $\text{VMTF}_{7-0}$ of lightness is used instead of an edge component $\text{DMTF}_{7-0}$ of density because the former is more sensitive than the latter on an edge due to background. If the pixel composes a dot image, the edge emphasis component (or $\text{VMTF}_{7-0}$) is limited according to the degree or density of dots. For example, the edge emphasis component is limited to decrease linearly or stepwise. Thus, a Moire pattern is prevented to occur.

For a pixel in a highlight region of uniform density ($\overline{\text{HLIGHT}}$=L), edge emphasis is not performed, and $\text{FSD}_{7-0}$, subjected to smoothing is used as image data $\text{VIDEO}_{37-30}$. Then, noises in the highlight region becomes not noticeable.

For a pixel in a non-edge region ($\overline{\text{HLIGHT}}$=H, $\overline{\text{EDG}}$=H, $\overline{\text{PAPA}}$=H), edge emphasis is not performed and ordinary image data $\text{SD}_{7-0}$ is used as image data $\text{VIDEO}_{37-30}$.

Next, MTF correction in the full color photographic mode ($\overline{\text{BKER}}$=H, $\overline{\text{COLER}}$=H and $\overline{\text{MODE}}$=L) is explained. Table 6 compiles signal levels of various signals received by the controller 1601, printing situations represented by the levels and signals of DMPX0, DMPX1, MDMPX5 and DMPX6.

TABLE 6

| | | | | Full color standard mode | | | | | | |
|---|---|---|---|---|---|---|---|---|---|---|
| $\overline{\text{CMY/K}}$ | $\overline{\text{HLIGHT}}$ | $\overline{\text{EDG0}}$ | $\overline{\text{PAPA}}$ | | DMPX1 | DMPX0 | USM | DMPX6 | DMPX5 | VIDEO |
| L (CMY mode) | L | — | — | highlight | L | H | 0 | H | L | FSD |
| | H | H | H | non-edge | L | H | 0 | H | L | FSD |
| | H | L | H | color edge | H | H | DMTF | H | L | FSD |
| | H | L | L | black edge | H | H | DMTF | H | L | FSD |
| H (BK mode) | L | — | — | highlight | L | H | 0 | H | L | FSD |

TABLE 6-continued

| | | | Full color standard mode | | | | | | |
|---|---|---|---|---|---|---|---|---|---|
| $\overline{CMY/K}$ | $\overline{HLIGHT}$ | $\overline{EDG0}$ | $\overline{PAPA}$ | | DMPX1 | DMPX0 | USM | DMPX6 | DMPX5 | VIDEO |
| | H | H | H | non-edge | L | H | 0 | H | L | FSD |
| | H | L | H | color edge | H | H | DMTF | H | L | FSD |
| | H | L | L | black edge | H | H | DMTF | H | L | FSD |

For a pixel in a black edge region ($\overline{HLIGHT}$=H, $\overline{EDG}$=L, $\overline{PAPA}$=L) and in a color edge region ($\overline{HLIGHT}$=H $\overline{EDG}$=L, $\overline{PAPA}$=H), edge emphases is performed by adding density edge component $DMTF_{7-0}$ to $FSD_{7-0}$ subjected to smoothing to output the sum as $VIDEO_{37-30}$ so as not to deteriorate gradation characteristics of half-tone pixels. Thus, edge emphasis is performed suitably without deteriorating gradation characteristics For a pixel in a highlight region of uniform density ($\overline{HLIGHT}$=L), edge emphasis is not performed, and $FSD_{7-0}$ subjected to smoothing is used as image data $VIDEO_{37-30}$. Then, noises in the highlight region becomes not noticeable.

For a pixel in a non-edge region ($\overline{HLIGHT}$=H, $\overline{EDG}$=H, $\overline{PAPA}$=H), edge emphasis is not performed and image data $FSD_{7-0}$ subjected to smoothing is used as image data $VIDEO_{37-30}$. Thus, the gradation characteristics of a photography image can be maintained.

Next, MTF correction in the monochromatic color standard mode ($\overline{BKER}$=H, $\overline{COLER}$=L and $\overline{MODE}$=H) is explained. Table 7 compiles signal levels of various signals received by the controller 1601, printing situations represented by the levels and signals of DMPX0, DMPX1, MDMPX5 and DMPX6.

data SD7-0to output the sum as $VIDEO_{37-30}$. Thus, black fringe can be prevented.

For a pixel in a highlight region of uniform density ($\overline{HLIGHT}$=L), edge emphasis is not performed, and $FSD_{7-0}$ subjected to smoothing is used as image data $VIDEO_{37-30}$. Then, noises in the highlight region becomes not noticeable.

For a pixel in a non-edge region ($\overline{HLIGHT}$=H, $\overline{EDG}$=H, $\overline{PAPA}$=H), edge emphasis is not performed and image data $FSD_{7-0}$ subjected to smoothing is used as image data $VIDEO_{37-30}$ Next, MTF correction in the monochromatic color photography mode ($\overline{BKER}$=H, $\overline{COLER}$=L and $\overline{MODE}$=L) is explained. Table 8 compiles signal levels of various signals received by the controller 1601, printing situations represented by the levels and signals of DMPX0, DMPX1, MDMPX5 and DMPX6.

TABLE 7

| | | | Monochromatic color standard mode | | | | | | |
|---|---|---|---|---|---|---|---|---|---|
| $\overline{CMY/K}$ | $\overline{HLIGHT}$ | $\overline{EDG0}$ | | DMPX1 | DMPX0 | USM | DMPX6 | DMPX5 | VIDEO |
| — | L | — | highlight | L | H | 0 | H | L | FSD |
| | H | H | non-edge | L | H | 0 | H | H | SD |
| L | H | L | CMY mode, edge | L | L | DMTF | H | H | SD |
| H | H | L | BK mode, edge | L | H | 0 | H | H | SD |

For a pixel in a black edge region ($\overline{HLIGHT}$=H, $\overline{EDG}$=L, $\overline{PAPA}$=L) and in a color edge region ($\overline{HLIGHT}$=H, $\overline{EDG}$=L,

TABLE 8

| | | | Monochromatic color photography mode | | | | | | |
|---|---|---|---|---|---|---|---|---|---|
| $\overline{CMY/K}$ | $\overline{HLIGHT}$ | $\overline{EDG0}$ | | DMPX1 | DMPX0 | USM | DMPX6 | DMPX5 | VIDEO |
| — | L | — | highlight | L | H | 0 | H | L | FSD |
| | H | H | non-edge | L | H | 0 | H | L | FSD |
| L | H | L | CMY mode, edge | L | L | DMTF | H | L | FSD |
| H | H | L | BK mode, edge | L | H | 0 | H | L | FSD |

$\overline{PAPA}$=H), edge emphasis is not performed when black toners are used in printing, and ordinary image data $SD_{7-0}$ is used as $VIDEO_{37-30}$, while edge emphasis is performed when cyan, magenta or yellow toners are used in printing, by adding density edge component $DMTF_{7-0}$ to ordinary pixel For a pixel in a black edge region ($\overline{HLIGHT}$=H, $\overline{EDG}$=L, $\overline{PAPA}$=L) and in a color edge region ($\overline{HLIGHT}$=H, $\overline{EDG}$=L, $\overline{PAPA}$=H), edge emphases is performed only when cyan, magenta or yellow toners are used in printing, by adding density edge component $DMTF_{7-0}$ to $FSD_{7-0}$ subjected to smoothing to output the sum as $VIDEO_{37-30}$ so as not to deteriorate gradation characteristics of half-tone pixels. Thus, a black fringe of a color character can be prevented.

For a pixel in a highlight region of uniform density ($\overline{HLIGHT}$=L), edge emphasis is not performed, and $FSD_{7-0}$ subjected to smoothing is used as image data $VIDEO_{37-30}$. Then, noises in the highlight region becomes not noticeable.

For a pixel in a non-edge region ($\overline{HLIGHT}$=H, $\overline{EDGH}$, $\overline{PAPA}$=H), edge emphasis is not performed and image data $FSD_{7-0}$ subjected to smoothing is used as image data $VIDEO_{37-30}$. Next, MTF correction in the monochromatic standard mode ($\overline{BKER}$=L, $\overline{COLER}$=L and $\overline{MODE}$=H) is explained. Table 9 compiles signal levels of various signals received by the controller 1601, printing situations represented by the levels and signals of DMPX0, DMPX1, MDMPX5 and DMPX6.

$\overline{PAPA}$=H), edge emphases is performed by adding density edge component $DMTF_{7-0}$ to $FSD_{7-0}$ subjected to smoothing to output the sum as $VIDEO_{37-30}$ so as not to deteriorate gradation characteristics of half-tone pixels.

For a pixel in a highlight region of uniform density ($\overline{HLIGHT}$=L), and for a pixel in a non-edge region ($\overline{HLIGHT}$=H, $\overline{EDGH}$, $\overline{PAPA}$=H), edge emphasis is not performed and image data $FSD_{7-0}$ subjected to smoothing is used as image data $VIDEO_{37-30}$.

(N-2) MTF Correction

Next, MTF (mutual transfer) correction performed by the MTF corrector 1600 shown in FIGS. 56A and 56B is explained. A controller 1601 for MTF correction parameters receives control signals $\overline{AMI0}$–$\overline{AMI3}$, $\overline{HLIGHT}$, $\overline{EDG}$, $\overline{PAPA}$ and $\overline{MAMA}$ from the region discriminator 1500. Further, the controller receives control signals $\overline{MODE}$,

TABLE 9

Monochromatic standard mode

| $\overline{CMY/K}$ | $\overline{HLIGHT}$ | $\overline{EDG0}$ |  | DMPX1 | DMPX0 | USM | DMPX6 | DMPX5 | VIDEO |
|---|---|---|---|---|---|---|---|---|---|
| — | L | — | highlight | L | H | 0 | H | L | FSD |
|  | H | H | non-edge | L | H | 0 | H | H | SD |
| L | H | L | CMY mode, edge | L | L | 0 | H | H | SD |
| H | H | L | BK mode, edge | H | L | VMTF | H | H | SD |

For a pixel in a black edge region ($\overline{HLIGHT}$=H, $\overline{EDG}$=L, $\overline{PAPA}$=L) and in a color edge region ($\overline{HLIGHT}$=H, $\overline{EDG}$=L, $\overline{PAPA}$=H), edge emphasis is performed when black toners are used in printing, by adding lightness edge component $VMTF_{7-0}$ to ordinary pixel data $SD_{7-0}$ to output the sum as $VIDEO_{37-30}$, while edge emphasis is not performed when cyan, magenta or yellow toners are used in printing, and ordinary image data $SD_{7-0}$ is used as $VIDEO_{37-30}$.

For a pixel in a highlight region of uniform density ($\overline{HLIGHT}$=L), edge emphasis is not performed, and $FSD_{7-0}$ subjected to smoothing is used as image data $VIDEO_{37-30}$. Then, noises in the highlight region becomes not noticeable.

For a pixel in a non-edge region ($\overline{HLIGHT}$=H, $\overline{EDG}$=H, $\overline{PAPA}$=H), edge emphasis is not performed and ordinary image data SD7-0 is used as image data $VIDEO_{37-30}$.

Finally, MTF correction in the monochromatic photography mode ($\overline{BKER}$=L, $\overline{COLER}$=L and $\overline{MODE}$=L) is explained. Table 10 compiles signal levels of various signals received by the controller 1601, printing situations represented by the levels and signals of DMPX0, DMPX1, MDMPX5 and DMPX6.

$\overline{CMY/K}$, $\overline{BKER}$ and $\overline{COLER}$. The signal $\overline{MODE}$ represents a kind of a document set by the key 78 in the operational panel, and it is set to be L level in the photography modes and H level in the standard modes. The signal $\overline{CMY/K}$ is a status signal representing a printing situation, and it is set to be L level for printing with cyan, magenta or yellow toners and H level for printing with black toners. The signal $\overline{BKER}$ requires signal processing in the monochromatic modes. The signal $\overline{COLER}$ requires signal processing in the monochromatic color modes. The signals $\overline{BKER}$ and $\overline{COLER}$ are signals on a region. The controller 1601 supplies DMPX0–DMPX6 shown in Tables 5–10 and a signal LIMOS shown in Table 11.

TABLE 11

Setting of duty ratio

| MODE | $\overline{MAMA}$ | $\overline{AMI0}$ | LIMOS |
|---|---|---|---|
| H | L | — | L |
|  | — | L | L |

TABLE 10

Monochromatic photography mode

| $\overline{CMY/K}$ | $\overline{HLIGHT}$ | $\overline{EDG0}$ |  | DMPX1 | DMPX0 | USM | DMPX6 | DMPX5 | VIDEO |
|---|---|---|---|---|---|---|---|---|---|
| — | L | — | highlight | L | H | 0 | H | L | FSD |
|  | H | H | non-edge | L | H | 0 | H | L | FSD |
| L | H | L | CMY mode, edge | L | L | 0 | H | L | FSD |
| H | H | L | BK mode, edge | H | H | DMTF | H | L | FSD |

For a pixel in a black edge region ($\overline{HLIGHT}$=H, $\overline{EDG}$=L, $\overline{PAPA}$=L) and in a color edge region ($\overline{HLIGHT}$=H, $\overline{EDG}$=L, TABLE 11-continued Setting of duty ratio

| MODE | $\overline{\text{MAMA}}$ | $\overline{\text{AMI0}}$ | LIMOS |
|------|------|------|-------|
|      | H    | H    | H     |
| L    | —    | —    | H     |

The signal LIMOS changes a duty ratio of the laser diode emitting according to the image data. A period when the laser diode does not emit may be provided in one pixel clock cycle. In such a case, the duty ratio is defined as a ratio of the laser emission period in one pixel clock cycle. FIG. 57 shows a timing chart on driving the laser diode wherein two types of a driving signal for the laser diode (LD) having duty ratios of 100% and 80% are shown. If the signal LIMOS=L, the duty ratio is set to be 100% in order to prevent a Moire pattern. If the signal LIMOS=H, the duty ratio is set to be 80% to reduce noises between lines along the main scan direction. If $\overline{\text{MODE}}$=H or the pixel is at an edge or in a dot image in the standard modes, the signal LIMOS is set to be L in order to improve the reproducibility at an edge and in a dot image. On the other hand, in the photography modes and at a non-edge region in the standard modes, the signal LIMOS=H to provide non-emitting periods in order to make noises between lines unnoticeable.

The signals $\overline{\text{MODE}}$, $\overline{\text{CMY/K}}$, $\overline{\text{BKER}}$ and $\overline{\text{COLER}}$ and an inverted signal of the signal $\overline{\text{PAPA}}$ are also sent to a NAND gate 1602. Then, the NAND gate 1602 outputs a signal DMPX7 to a selector 1603 only when black is printed at a black edge in the full color standard copy mode. The selector 1603 selects the lightness data MVIDE0$_{7-0}$ subjected to the masking processing or the density data VIDEO$_{7-0}$ according as the signal DMPX7 is L level or not.

The selector 1603 receives image data MVIDE0$_{7-0}$ subjected to masking processing at A input and image data VIDEO$_{7-0}$ converted to density at B input in the order of cyan, magenta, yellow and black. The data selected by the selector 1603 is supplied, through a line memory 1604 storing data of 5*5 matrix to a Laplacian filter, to a Laplacian filter 1605, smoothing filters 1607, 1608 and 1609, a filter 1612 for detecting a minimum in a 5*5 matrix, a filter 1613 for detecting a minimum in a 3*3 matrix, and a print edge corrector 1615.

Figure 58:
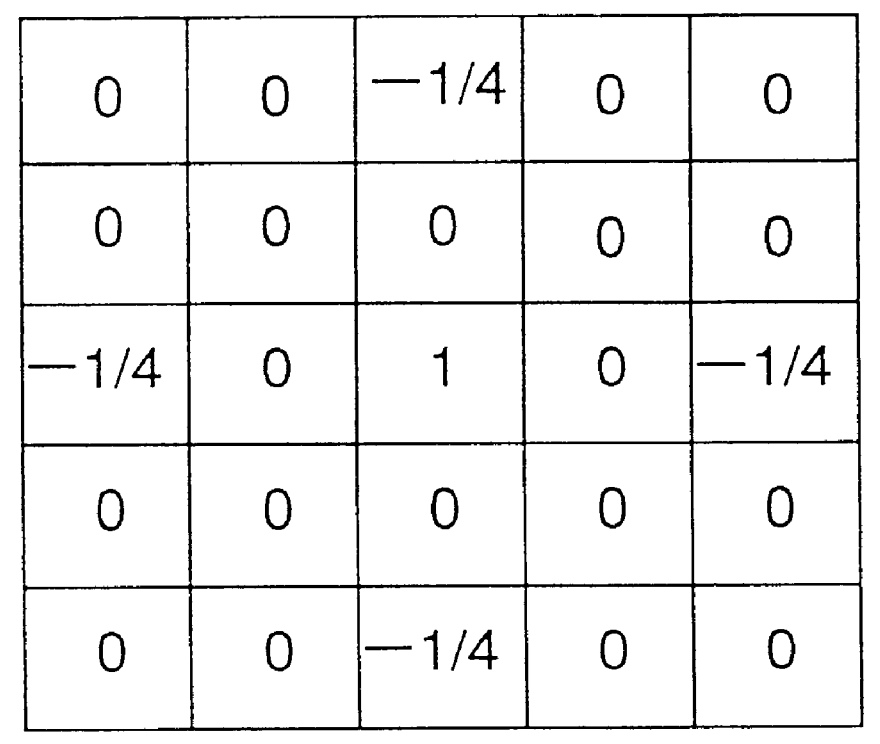
Figure 59:
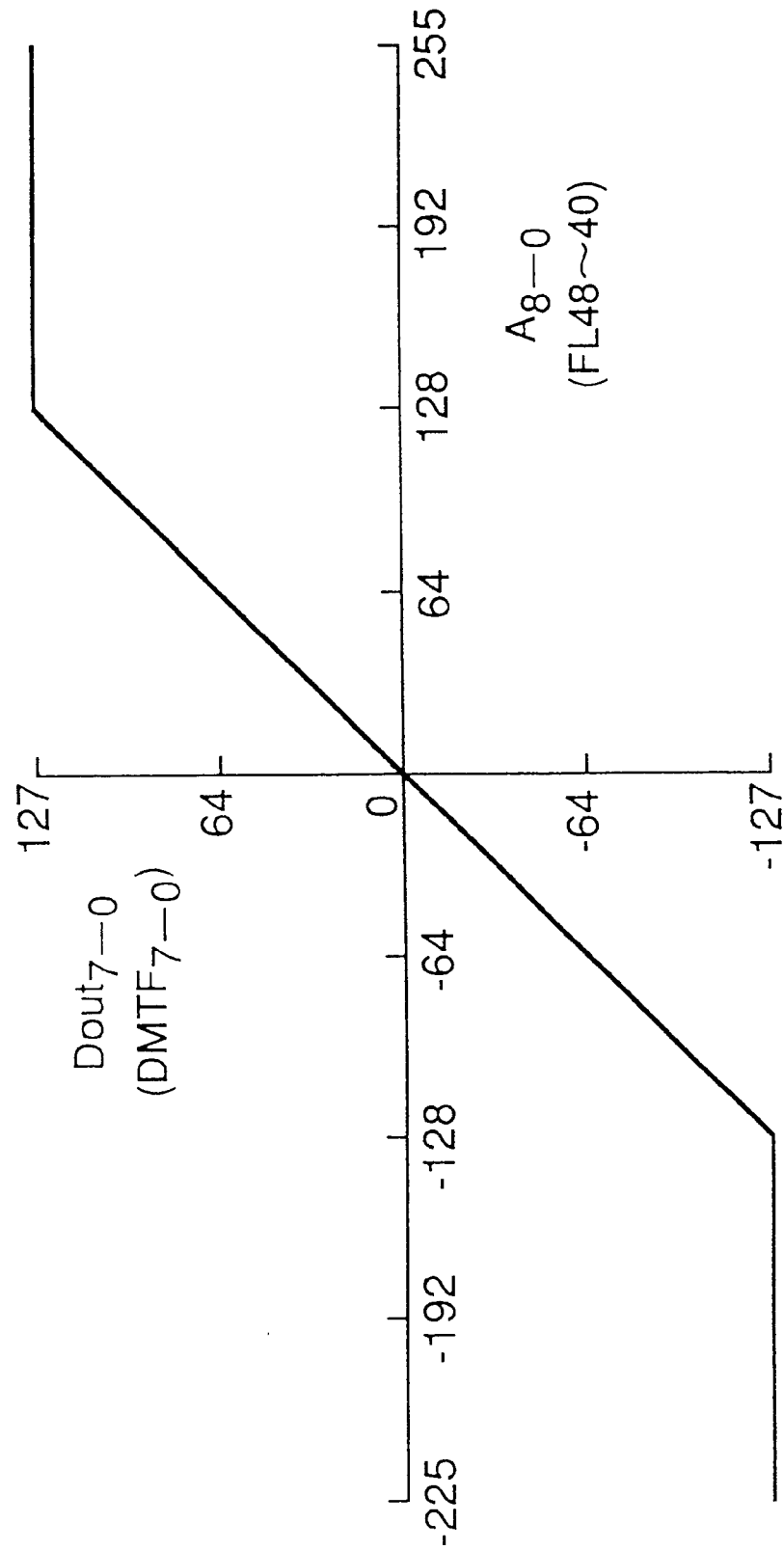
FIG. 59 is a graph of DMTF table.

The Laplacian filter 1605, shown in FIG. 58, converts a data on a pixel under interest at the center to an enhanced data, and sends it to a DMTF table 1606. The DMTF table performs conversion shown in FIG. 59 and sends a conversion data as density edge emphasis component data DMTF$_{7-0}$.

The smoothing filters 1607, 1608 and 1609 smoothens the input data to 300, 200 and 100 dpi, and FIGS. 60–62 show examples of the three filters. The data subjected to smoothing as well as the data without subjected to smoothing is sent to a controller 1610 for smoothing filters. The controller 1610 also receives the change signal SH$_{2-0}$ from the is HVC converter 1100 set by the image quality controller 1103 shown in FIG. 31. The controller 1610 selects one of the input data according to the change signal SH$_{2-0}$ and sends it as SD$_{7-0}$. The change signal SH$_{2-0}$ is also received by another controller 1611 of edge emphasis coefficient to select one of eight kinds of the edge emphasis coefficients as ED$_{7-0}$ per each pixel (in real time), and change a plurality of sharpness up to eight areas simultaneously.

The filters 1612 and 1613 detect a minimum in a 5*5 matrix and in a 3*3 matrix if a pixel under interest is placed at the center of the matrices and they sent the results to a selector 1614. The selector 1614 selects one of them according to a selection signal FSEL2, and it sends it as MIN$_{7-0}$. The selection signal FSEL2 has been determined experimentally. As explained above, by using the minimum data MIN$_{7-0}$, image data can be decreased to zero only inside a black character, and the black character can be printed with edge emphases without white peripheral lines as shown in FIG. 64A. On the other hand, if image data of cyan, magenta or yellow is subtracted by, for example, an edge detection quantity (such as FL$_{17-10}$ or FL$_{27-20}$ in this embodiment), undesired white peripheral lines as shown in FIG. 64A are observed.

Figure 65A:
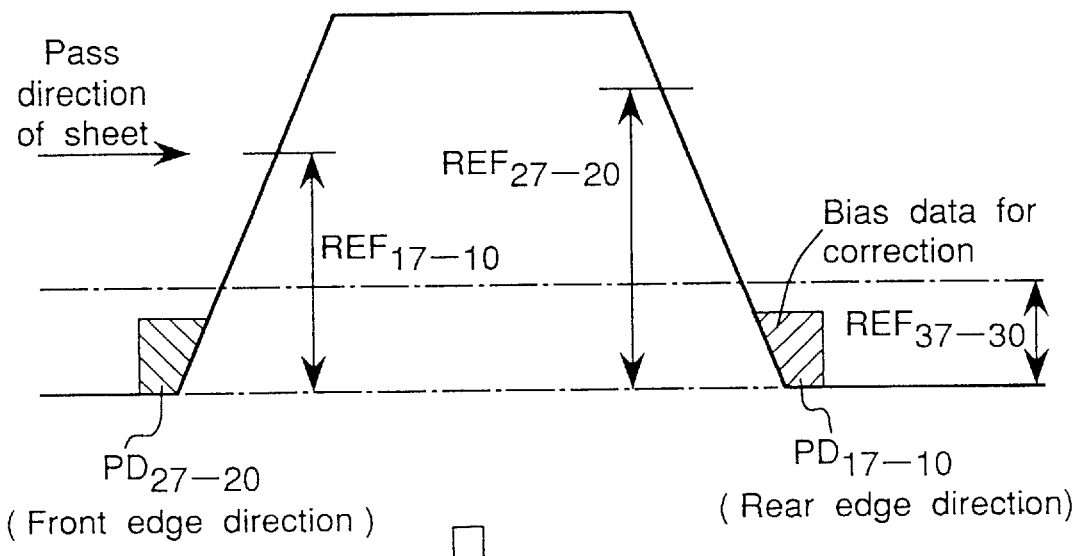
FIG. 65A is a diagram of addition of correction data (hatched area) to an edge of an image.
Figure 65B:
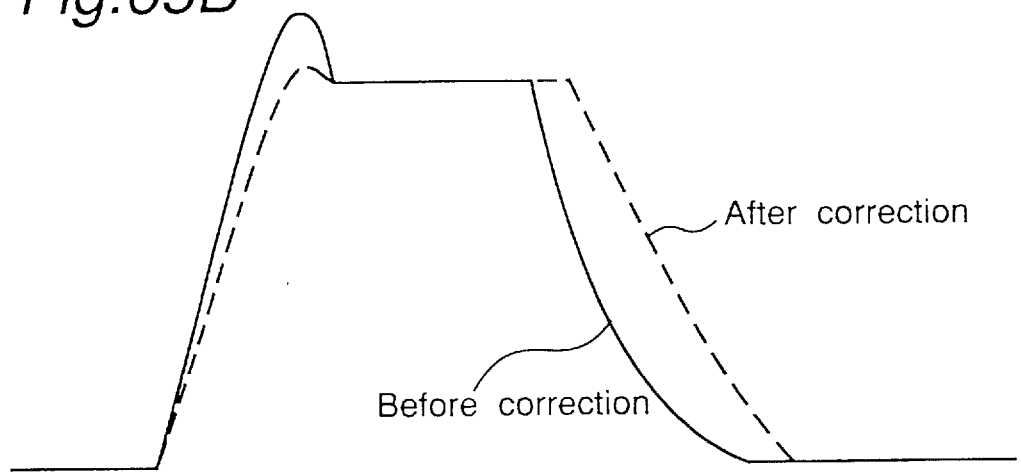
FIG. 65B is a diagram of an amount of toners before correction (solid line) and after correction (dashed line)

The print edge corrector 1615 performs edge correction by taking into account a print characteristic on transferring a toner image onto a sheet of paper. The print characteristic means that more toners adhere to a start position while less toners adhere to an end position, as shown in FIG. 65B with a solid line. However, it is desirable that equal quantities of toners adhere to the start and end and positions. Such print characteristic occurs when image data changes largely at edges while a data near the edges is about zero. Then, the corrector 1615 corrects the data shown in FIG. 65A as shown in FIG. 65B. Then, as shown in FIG. 65B with a dashed line, the inequality can be reduced.

Figure 66:
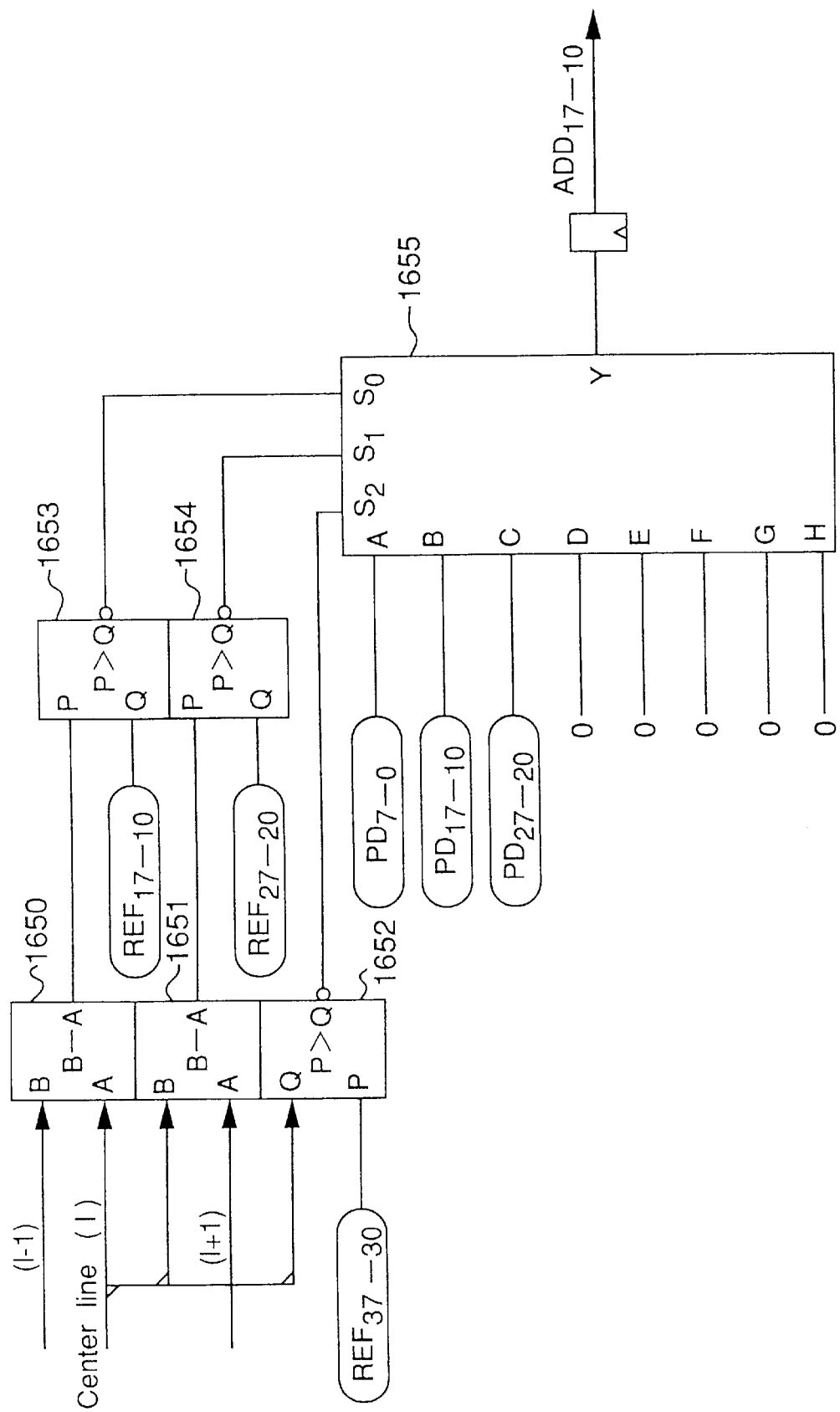
FIG. 66 is a block diagram of a printer edge correction section.

FIG. 66 shows the print edge corrector 1615in detail. If a data under interest is a data of an l-th pixel, a subtractor 1650 subtracts a data of (l+1)-th pixel from the data of the l-th pixel and sends the result to a comparator 1553. If the result is larger than a threshold value REF$_{7-10}$, the comparator 1653 sends a signal to input S$_0$ of a selector 1655. A subtractor 1651 subtracts a data of the l-th pixel from the data of the (l−1)-th pixel and sends the result to a comparator 1554. If the result is larger than a threshold value REF$_{27-20}$, the comparator 1654 sends a signal to input S$_1$ of the selector 1655. Further, if the data of the l-th data is smaller than a threshold value REF$_{37-30}$, a comparator 1652 sends a signal to input S$_2$ of the selector 1655.

If the selector 1655 receives L level at the input S$_2$–S$_0$, the pixel under interest is considered to exist between edges as shown in FIG. 67B. In this case, the selector 1655 selects PD$_{7-0}$ after addition as ADD$_{17-10}$. If the selector 1655 receives H level at the input S$_1$ and L level at the inputs S$_0$ and S$_2$, the pixel under interest is considered to exist at a leading edge and below a reference level as shown in FIG. 67A. In this case, the selector 1655 selects PD$_{17-10}$ as ADD$_{17-10}$. Further, if the selector 1655 receives H level at the input S0$_0$ and L level at the inputs S$_1$–S$_2$, the pixel under interest is considered to exist at a trailing edge and below a reference level as shown in FIG. 67C. In this case, the selector 1655 selects PD$_{27-20}$ as ADD$_{17-10}$.

Next, the MTF correction performed by the MTF corrector shown in FIG. 56B is explained. As explained previously, selectors 1616 and 1617 select one of lightness edge component VMTF$_{7-0}$, density edge component DMTF$_{7-0}$ and edge emphasis quantity of zero according to the signals DMPX0 and DMPX1 on the kind of pixel DMPX0 and DMPX1. The signals DMPX0 and DMPX1 are defined in Tables 5–10 in the various modes and output by the controller 1610 of the MTF correction parameters.

A selector 1622 receives $ED_{7\text{-}0}$ set by the CPU 1 directly and through multipliers 1619–1621 which multiply it with ¾, ½ and ¼, and selects one of the four inputs according to parameters DMPX3 and DMPX2. Another selector 1623 receives the output of the selector 1622 and the zero, and selects one of the two inputs according to a parameter DMPX4. As shown in Table 12, the parameters DMPX4–DMPX2 are determined according to values of $\overline{AMI3}$–$\overline{AMI0}$. If all of $\overline{AMI3}$–$\overline{AMI0}$ are H level or the pixel is not in a dot image, the edge emphasis coefficient $ED_{7\text{-}0}$ is sent readily as $ED_{17\text{-}10}$ to an operator 1618. As explained previously, the region discriminator 1500 changes $\overline{AMI0}$–$\overline{AMI3}$ to L level successively as the degree of dot image increases. Then, the controller 1601 for the MTF correction parameters changes DMPX4–DMPX1 according to the degree of dot image, and the selectors 1622 and 1623 suppress edge emphasis coefficients $ED_{7\text{-}0}$ according to results of dot detection $\overline{AMI0}$–$\overline{AMI3}$. The operator 1618 multiplies the edge emphasis quantity $USM_{7\text{-}0}$ with the edge emphasis coefficient $ED_{17\text{-}10}$ and divides the product with 128 to output $USM_{17\text{-}10}$.

TABLE 12

Decision of dot image

| $\overline{AMI3}$ | $\overline{AMI2}$ | $\overline{AMI1}$ | $\overline{AMI0}$ | DMPX4 | DMPX3 | DMPX2 | ED |
|---|---|---|---|---|---|---|---|
| L | L | L | L | L | — | — | 0 |
| H | L | L | L | H | L | L | ED/4 |
| H | H | L | L | H | L | H | ED/2 |
| H | H | H | L | H | H | L | 3ED/4 |
| H | H | H | H | H | H | H | ED |

A selector 1626 receives data $SD_{7\text{-}0}$ directly and through a smoothing filter 1625 and selects one of the inputs according to DMPX5. Further, another selector 1627 selects one of the output of the selector 1627 and $MIN_{7\text{-}0}$ according to DMPX6 to output $VIDEO_{17\text{-}10}$. The control signals DMPX5 and DMPX6 are determined as shown in Tables 5–10.

An adder 1624 adds the edge emphasis quantity $USM_{17\text{-}10}$ to the pixel data $VIDEO_{27\text{-}20}$. Another adder 1628 adds $VIDEO_{27\text{-}20}$ to $ADD_{17\text{-}10}$ to output as $VIDEO_{37\text{-}30}$. As explained above, the addition data $ADD_{17\text{-}10}$ is provided to add a pixel data at a leading edge or at a trailing edge.

(0) Gamma Corrector

Figure 69:
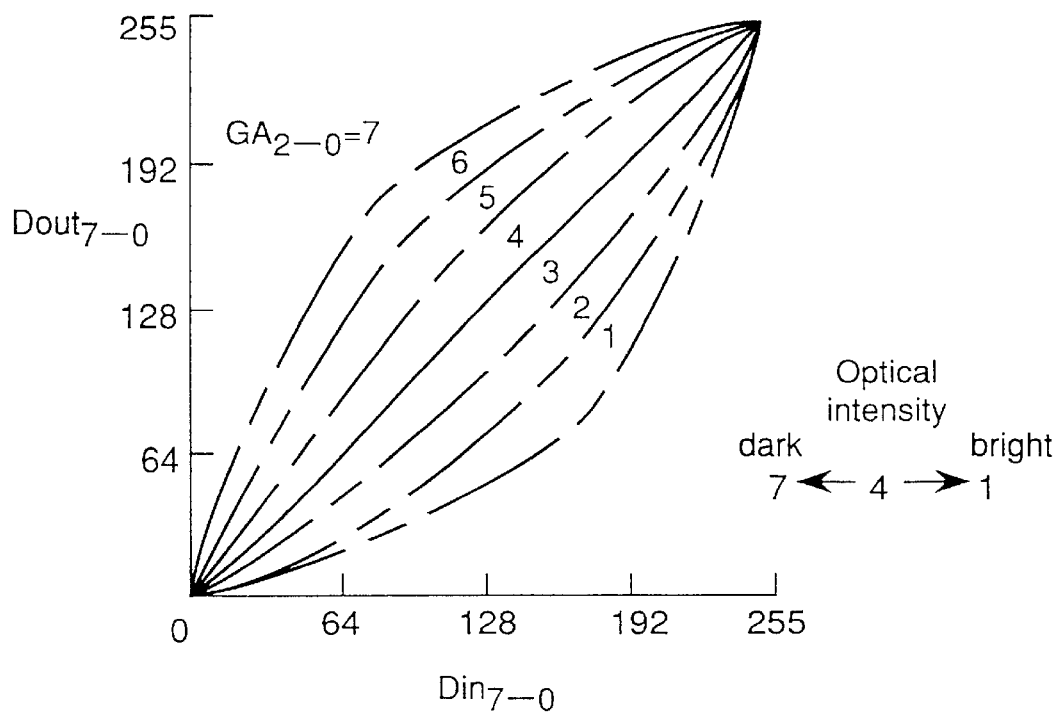
FIG. 69 is a graph of gamma correction table in brightness control mode.
Figure 70:
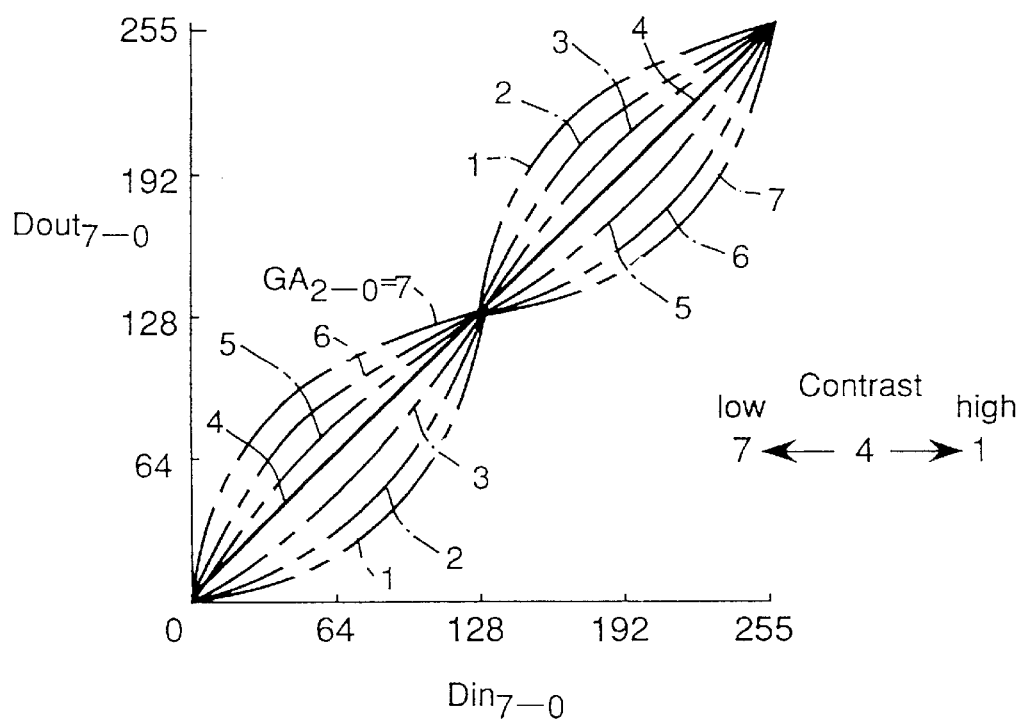
FIG. 70 is a graph of gamma correction table in contrast control mode.

The gamma corrector 1700 shown in FIG. 68 receives the image data $VIDEO_{37\text{-}30}$ after the MTF correction, and it changes gamma correction curve according to an instruction by a user and corrects the image data to data of desired image quality. The image data $VIDEO_{37\text{-}30}$ and the change signal $GA_{2\text{-}0}$ for changing the gamma correction table are received by a gamma correction table 1702. The change signal $GA_{2\text{-}0}$ are set by the image quality controller 1103 shown in FIG. 31. The table 1702 changes eight gradation curves shown in FIGS. 69 and 70 in real time according to the change signal $GA_{2\text{-}0}$ as a BANK signal of the table. FIG. 69 shows gradation curves in correspondence to the change signal $GA_{2\text{-}0}$ in the brightness control mode, while FIG. 70 shows gradation curves in correspondence to the change signal $GA_{2\text{-}0}$ in the contrast control mode. The gamma correction table 1702 changes input data $Din_{7\text{-}0}$ ($VIDEO_{37\text{-}30}$) to output data $Dout_{7\text{-}0}$ ($VIDEO_{47\text{-}40}$).

An operator 1703 operates Eq. (22) based on the data $VIDEO_{47\text{-}40}$ output from the gamma correction table 1702:

$$VIDEO_{77\text{-}70} = (VIDEO_{47\text{-}40} - UDC_{7\text{-}0}) \cdot GDC_{7\text{-}0} / 128, \quad (22)$$

$$\leq 256.$$

That is $VIDEO_{77\text{-}70} = 256$ if the operation at the left side exceeds 256. As shown in Table 13, background clearance data $UDC_{7\text{-}0}$ and slope correction data $GDC_{7\text{-}0}$ have eight kinds of data.

TABLE 13

Background clearance data UDC and slope correction data GDC

|  | $GDC_{7\text{-}0}$ | $UDC_{7\text{-}0}$ |
|---|---|---|
| 7 | 152 | 0 |
| 6 | 144 | 0 |
| 5 | 136 | 0 |
| 4 | 128 | 0 |
| 3 | 136 | 16 |
| 2 | 128 | 16 |
| 1 | 120 | 16 |

Figure 71:
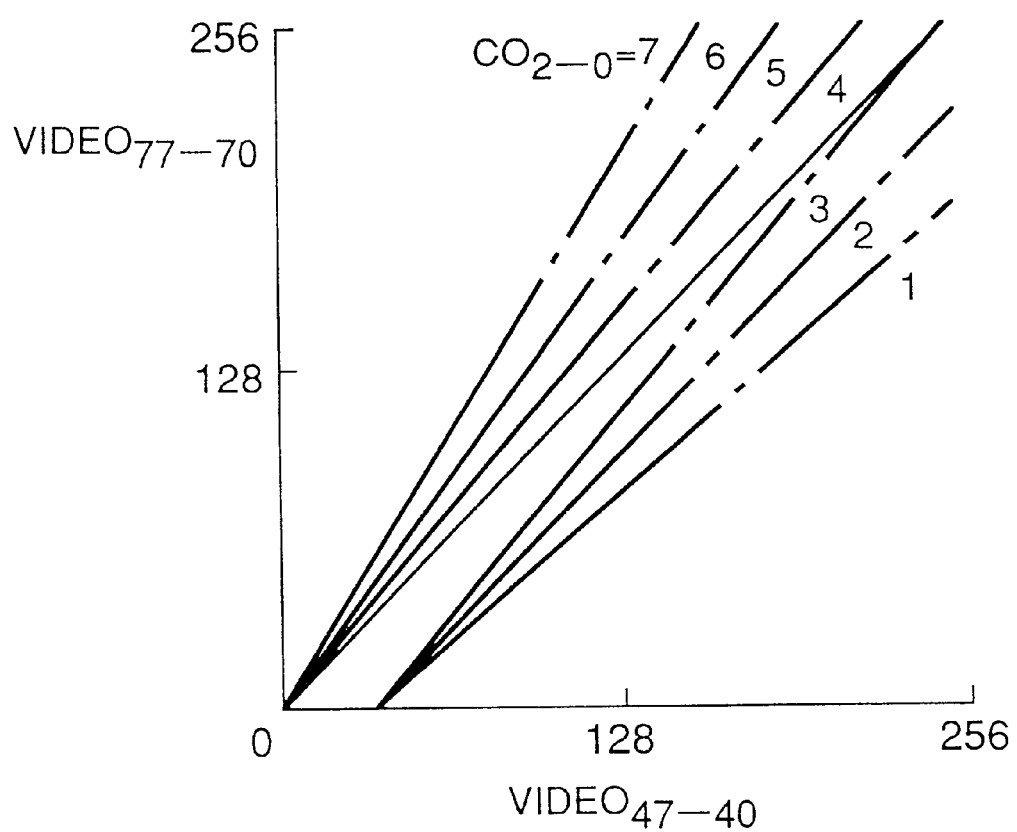
FIG. 71 is a graph of a relation of $VIDEO_{77-70}$ to $VIDEO_{47-40}$ for values of 1–7 of $CO_{2-0}$.
Figure 72:
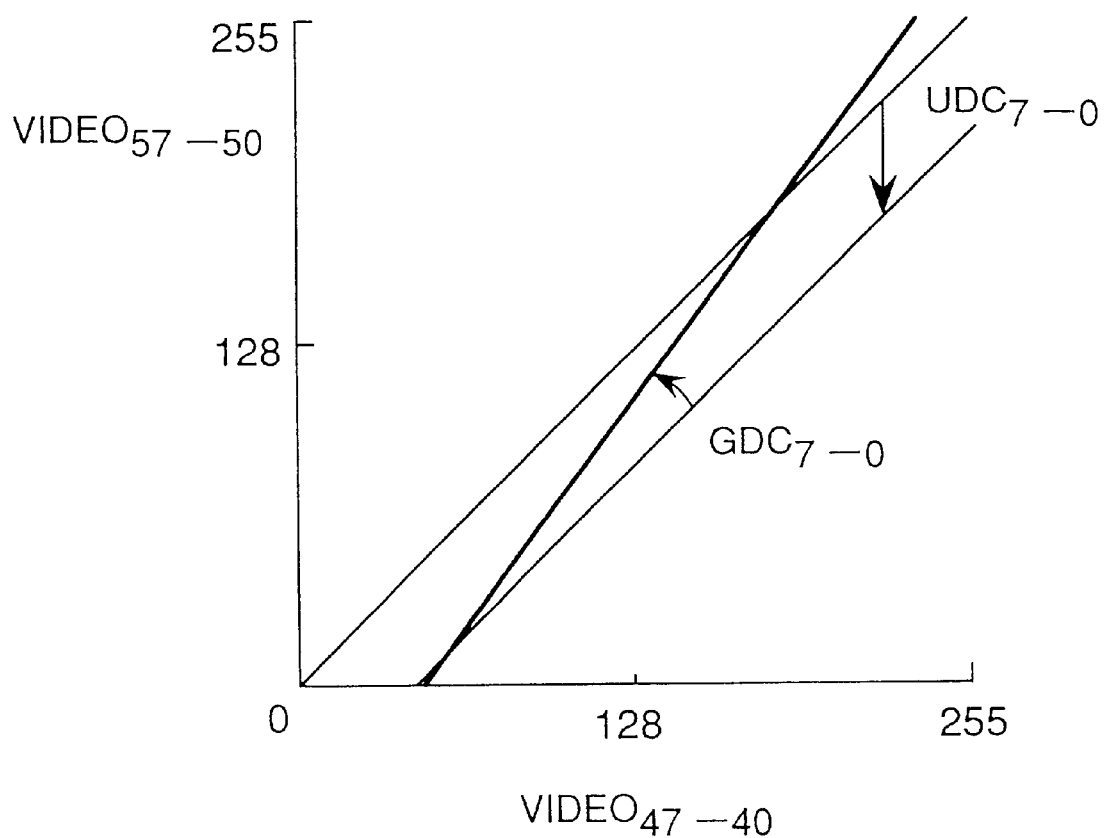
FIG. 72 is a graph of a relation of $VIDEO_{57-50}$ to $VIDEO_{47-40}$ subtracted by background clearance data $UDC_{7-0}$ and corrected on slope by $GDC_{7-0}$.

FIG. 71 shows a graph of $VIDEO_{77\text{-}70}$ plotted against $VIDEO_{47\text{-}40}$ for various values of $CO_{2\text{-}0}$ from 7 to 1. As shown in FIG. 72, background data $UDC_{7\text{-}0}$ is subtracted from $VIDEO_{47\text{-}40}$ and the slope is corrected by slope correction data $GDC_{7\text{-}0}$.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processing apparatus comprising,
    a scanner which reads a color document to provide color data;
    a means for obtaining lightness data and chroma data of an interest pixel from the color data obtained by said scanner;
    a decision means for deciding from the lightness data if the interest pixel exists at an edge and for deciding from the chrome data if an image at the interest pixel is black or not,
    a first data operation means for increasing the data of black of the interest pixel by a prescribed amount when said decision means decides that the interest pixel exists at the edge and that the image at the interest pixel is black;
    a color conversion means for converting the color data received from said scanner to data of cyan, magenta, yellow and black; and
    a second data operation means for replacing the data of cyan, magenta and yellow of the interest pixel which is decided to exist at the edge and to have the image thereof of black with minima of data of cyan, magenta and yellow of pixels in a prescribed region around the interest pixel.

2. The apparatus according to claim 1, further comprising:

a detection means for detecting an isolation pixel which has a difference of the lightness data of the pixel from those of the pixels in the prescribed region more than a prescribed value;

a counter for counting a number of isolation pixels detected by said detection means in a second region wider than the prescribed region; and a limit means for decreasing the prescribed amount to be added by said first data operation means according to a number counted by said counter.

3. An image processing apparatus comprising:

a scanner which reads a color document to provide color document to provide color data;

a means for determining lightness data and chroma data of an interest pixel from the color data obtained by said scanner;

a decision means for deciding from the lightness data if the interest pixel exists at an edge or not and for deciding from the chroma data if an image at the interest pixel is black or not, so as to detect a pixel at a black edge;

a detection means for detecting pixels in a prescribed region, the pixels having a lightness data smaller than a first prescribed value, a chroma data larger than a second prescribed value and not existing at the edge, the prescribed region having at a center thereof the interest pixel decided to exist at the black edge by said decision means;

a counter for counting a number of the pixels detected by said detection means; and a correction means for invalidating a result of said decision means as the pixel at the black edge when the number counted by said counter means exceeds a threshold value.

4. An image processing apparatus comprising:

a scanner which reads a color document to provide color data;

a means for determining lightness data and chroma data of an interest pixel from the color data obtained by said scanner;

a decision means for deciding from the lightness data if the interest pixel exists at an edge and for deciding from the chroma data if an image at the interest pixel is black or not, so as to detect a pixel at a black edge;

a determination means for determining a type of the document; and an operation means for replacing the data of cyan, magenta, yellow and black of the interest pixel with minima of data of cyan, magenta, yellow and black of pixels in a prescribed region around the interest pixel when said determination means determines that the document is a full color document and said decision means decides that the pixel exists at the black edge.

5. The apparatus according to claim 4, further comprising a color conversion means for converting the color data received from said scanner to color data of cyan, magenta, yellow and black, and an input means for inputting area information of a monochromatic color or black.

6. The apparatus according to claim 5, wherein when said operation means replaces the data of cyan, magenta, yellow and black of the interest pixel with minima of data of cyan, magenta, yellow and black of pixels in a prescribed region around the interest pixel when said determination means determines that the document is a full color document and said decision means decides that the pixel exists at the black edge.

7. The apparatus according to claim 5, further comprising a data emphasis means for emphasizing the black data of the interest pixel is decided by said decision means and said determination means to exist at the black edge of a full color document or a monochromatic color document.

8. The apparatus according to claim 5, further comprising a data emphasis means for emphasizing the data of cyan, magenta and yellow of the interest pixel if the interest pixel is decided by said decision means and said determination means to exist at a color edge of a full color document or at an edge of a monochromatic color document.

9. An image processing apparatus comprising:

a scanner which reads a color document to provide color data;

a means for determining lightness data and chroma data of an interest pixel from the color data obtained by said scanner;

a decision means for deciding from the lightness data if the interest pixel exists at an edge and for deciding from the chroma data if an image at the interest pixel is black or not, so as to detect a pixel at a black edge;

a determination means for determining a type of the document;

an operation means for changing the data of the interest pixel according to the type of the document determined by said determination means and a result of decision of said decision means;

a color conversion means for converting the color data received from said scanner to color data of cyan, magenta, yellow and black, and an input means for inputting area information of a monochromatic color or black; and a data emphasis means for emphasizing the black data of the interest pixel if the interest pixel is decided by said decision means and said determination means to exist at the black edge of a full color document or a monochromatic color document.

10. An image processing apparatus comprising:

a scanner which reads a color document to provide color data;

a means for determining lightness data and chroma data of an interest pixel from the color data obtained by said scanner;

a decision means for deciding from the lightness data if the interest pixel exists at an edge and for deciding from the chroma data if an image at the interest pixel is black or not, so as to detect a pixel at a black edge;

a determination means for determining a type of the document;

an operation means for changing the data of the interest pixel according to the type of the document determined by said determination means and a result of decision of said decision means;

a color conversion means for converting the color data received from said scanner to color data of cyan, magenta, yellow and black, and an input means for inputting area information of a monochromatic color or black; and a data emphasis means for emphasizing the data of cyan, magenta and yellow of the interest pixel if the interest pixel is decided by said decision means and said determination means to exists at a color edge of a full color document or at an edge of a monochromatic color document.

* * * * *

UNITED STATES PATENT AND TRADEMARK OFFICE
CERTIFICATE OF CORRECTION

PATENT NO. : 6,064,494
DATED : May 16, 2000
INVENTOR(S) : Y. HIROTA, et al.

It is certified that error appears in the above-identified patent and that said Letters Patent is hereby corrected as shown below:

The following corrections are made:

[63] Continuation-in-part of application No. 08/559,313, Nov. 15, 1995.

Column 1, line 4, "08/859,313" is changed to --08/559,313--.

Signed and Sealed this

Fifteenth Day of May, 2001

Attest:

NICHOLAS P. GODICI

Attesting Officer

Acting Director of the United States Patent and Trademark Office